(12) United States Patent
Yie et al.

(10) Patent No.: US 8,995,778 B2
(45) Date of Patent: Mar. 31, 2015

(54) METHOD AND APPARATUS FOR ENCODING/DECODING HIGH RESOLUTION IMAGES

(75) Inventors: Alex Chungku Yie, Incheon (KR); Joon Seong Park, Yongin-si (KR); Ul Ho Lee, Hwaseong-si (KR)

(73) Assignee: Humax Holdings Co., Ltd., Yongin-Si, Gyeonggi-Do (KR)

( * ) Notice: Subject to any disclaimer, the term of this patent is extended or adjusted under 35 U.S.C. 154(b) by 289 days.

(21) Appl. No.: 13/513,122

(22) PCT Filed: Dec. 1, 2010

(86) PCT No.: PCT/KR2010/008563
§ 371 (c)(1),
(2), (4) Date: May 31, 2012

(87) PCT Pub. No.: WO2011/068360
PCT Pub. Date: Jun. 9, 2011

(65) Prior Publication Data
US 2013/0129237 A1 May 23, 2013

(30) Foreign Application Priority Data

Dec. 1, 2009 (KR) .................. 10-2009-0117919
Dec. 15, 2009 (KR) .................. 10-2009-0124334
Jun. 7, 2010 (KR) .................. 10-2010-0053186
Jul. 2, 2010 (KR) .................. 10-2010-0064009

(51) Int. Cl.
*G06K 9/36* (2006.01)
*G06T 9/00* (2006.01)
(Continued)

(52) U.S. Cl.
CPC .............. *G06T 9/004* (2013.01); *H04N 19/176* (2014.11); *H04N 19/119* (2014.11); *H04N 19/46* (2014.11);
(Continued)

(58) Field of Classification Search
USPC .................................. 382/233, 238
See application file for complete search history.

(56) References Cited

U.S. PATENT DOCUMENTS 4,831,659 A * 5/1989 Miyaoka et al. .............. 382/240
5,799,110 A * 8/1998 Israelsen et al. .............. 382/253
(Continued)

FOREIGN PATENT DOCUMENTS

| CN | 101273641 A | 9/2008 |
|---|---|---|
| KR | 1996-0012933 B1 | 9/1996 |
| KR | 10-0565066 B1 | 3/2006 |
| KR | 10-0999091 B1 | 12/2010 |
| WO | 2009051719 A2 | 4/2009 |
| WO | WO 2009/051719 A2 | 4/2009 |

OTHER PUBLICATIONS

"Samsung's Response to the Call for Proposals on Video Compression Technology", Joint Collaborative Team on Video Coding (JCT-VC) of ITU-T SG16 WP3 and ISO/IEC JTC1/SC29/WG11 1st Meeting: Dresden, DE, Apr. 15-23, 2010.*

(Continued)

*Primary Examiner* — Yon Couso
(74) *Attorney, Agent, or Firm* — Lowe Hauptman & Ham, LLP

(57) ABSTRACT

The invention relates to methods and apparatuses for encoding/decoding high resolution images, which involve setting the size of the prediction unit to be encoded to an expanded macro-block size in accordance with the temporal frequency characteristics or spatial frequency characteristics among pictures to be encoded, and performing motion prediction motion compensation, and transformation on the basis of a set prediction unit size. In addition, the methods and the apparatuses of the present invention involve dividing a macro-block having a pixel size of 32*32 or 64*64 into at least one partition on the basis of an edge, and performing encoding processes for each partition. Accordingly, encoding efficiency can be improved for high definition (HD) or higher resolution high-resolution images.

20 Claims, 42 Drawing Sheets

(51) Int. Cl.
*H04N 19/176* (2014.01)
*H04N 19/119* (2014.01)
*H04N 19/46* (2014.01)
*H04N 19/61* (2014.01)
*H04N 19/11* (2014.01)
*H04N 19/14* (2014.01)
*H04N 19/137* (2014.01)
*H04N 19/593* (2014.01)
*H04N 19/91* (2014.01)
*H04N 19/107* (2014.01)
*H04N 19/124* (2014.01)
*H04N 19/50* (2014.01)
*H04N 19/60* (2014.01)

(52) U.S. Cl.
CPC ............... *H04N 19/61* (2014.11); *H04N 19/11* (2014.11); *H04N 19/14* (2014.11); *H04N 19/137* (2014.11); *H04N 19/00763* (2013.01); *H04N 19/00781* (2013.01); *H04N 19/00951* (2013.01); *H04N 19/0003* (2013.01); *H04N 19/0009* (2013.01); *H04N 19/00569* (2013.01); *H04N 19/00775* (2013.01); *H04N 19/00042* (2013.01); *H04N 19/00072* (2013.01); *H04N 19/00145* (2013.01); *H04N 19/00157* (2013.01); *H04N 19/00278* (2013.01); *H04N 19/00545* (2013.01)
USPC ......................................................... 382/233

(56) References Cited

U.S. PATENT DOCUMENTS

| | | | | |
|---|---|---|---|---|
| 6,347,157 | B2* | 2/2002 | Chui | 382/240 |
| 7,409,093 | B2* | 8/2008 | Ju | 382/232 |
| 8,666,177 | B2* | 3/2014 | Chen et al. | 382/232 |
| 2005/0129125 | A1* | 6/2005 | Cha et al. | 375/240.16 |
| 2005/0175102 | A1 | 8/2005 | Ha | |
| 2006/0098881 | A1* | 5/2006 | Kim | 382/238 |
| 2008/0089418 | A1* | 4/2008 | Kim et al. | 375/240.16 |
| 2008/0166059 | A1* | 7/2008 | Baik et al. | 382/236 |
| 2008/0240246 | A1 | 10/2008 | Lee et al. | |
| 2009/0046781 | A1 | 2/2009 | Moriya et al. | |
| 2013/0101232 | A1* | 4/2013 | Cohen et al. | 382/233 |

OTHER PUBLICATIONS

Escoda et al., "Geometry-Adaptive Block Partitioning for Video Coding," 2007 IEEE International Conference on Acoustics, Speech, and Signal Processing, Apr. 15-20, 2007, Honolulu, Hawaii, 4 pages.

Kim et al., "Enlarging MB Size for High Fidelity Video Coding Beyond HD," 36. VCEG Meeting, Video CodingExperts Group of ITU-T SG.16, Oct. 8-10, 2008, San Diego, California, 6 pages.

CN Office Action of CN 201080054678.8 issued Jul. 7, 2014.

Ken McCann, "Samsung's Response to the Call for Proposals on Video Compression Technology", JCTVC-A124, Apr. 15-23, 2010, 1-53 pages.

Chinese Office Action for application No. 201080054678.8 dated Dec. 15, 2014.

\* cited by examiner

FIG. 25
16X4
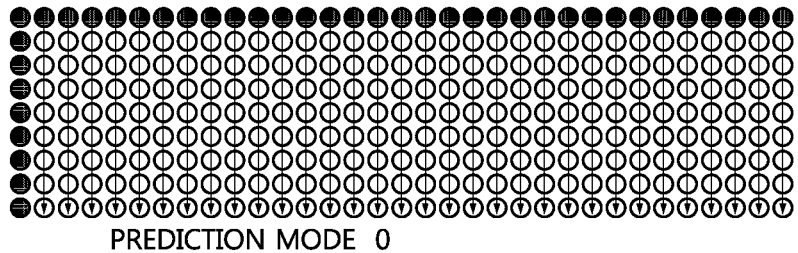
PREDICTION MODE 0
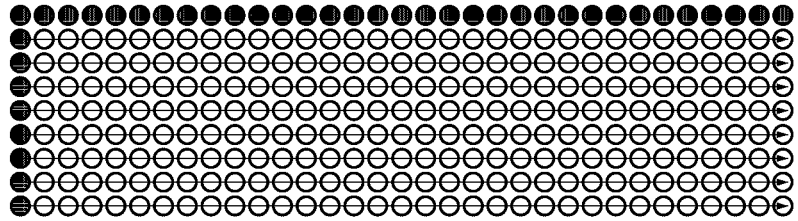
PREDICTION MODE 1
AVERAGE VALUE
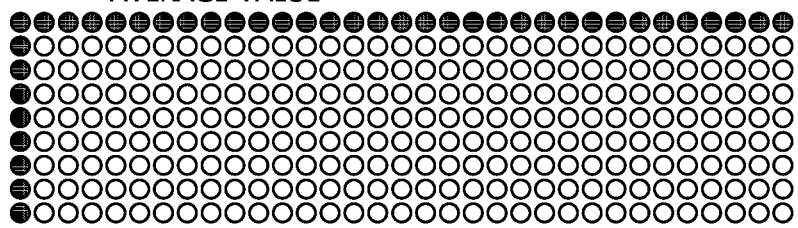
PREDICTION MODE 2
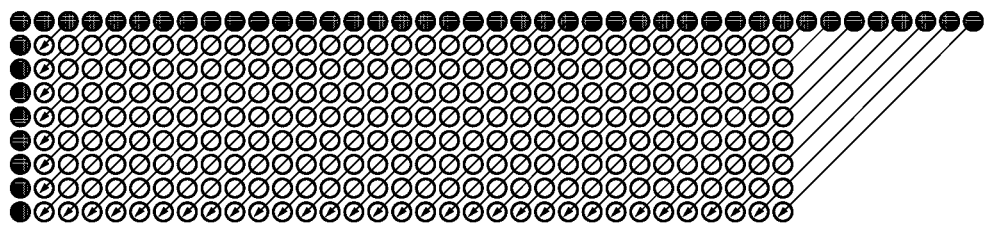
PREDICTION MODE 3
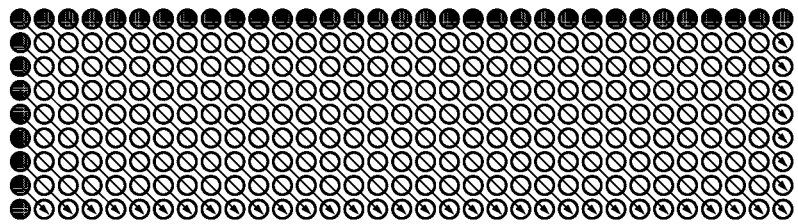
PREDICTION MODE 4

METHOD AND APPARATUS FOR ENCODING/DECODING HIGH RESOLUTION IMAGES

TECHNICAL FIELD

The present invention is directed to encoding and decoding images, and more specifically to an encoding method that may apply to high definition (HD) images and an encoding apparatus of performing the encoding method, a decoding method and a decoding apparatus of performing the decoding method.

RELATED ART

In general image compression methods, one picture is separated into multiple blocks each having a predetermined size. Inter-prediction and infra-prediction technologies are used to remove redundancy between pictures so as to increase compression efficiency.

An inter-prediction encoding method, which is represented by a motion compensation prediction encoding method, compresses images by eliminating redundancy between pictures.

In the motion compensation prediction encoding method, a region similar to a block being currently encoded is searched from at least one reference picture positioned before or behind a currently encoded picture to generate a motion vector (MV) which is then used for motion compensation, thereby generating a prediction block, and a differential value between the generated prediction block and the current block is then subjected to discrete cosine transform (DCT) and quantized. The quantized result is entropy encoded and transmitted.

Conventionally, for motion compensation prediction, macro-blocks having various sizes, such as 16×16, 8×16, or 8×8 pixels, are used, and for transform and quantization, macro-blocks of 8×8 or 4×4 pixels are used.

However, the above-mentioned existing block size is not appropriate for encoding high-resolution images having an HD-level or higher.

The block size used for general inter prediction includes 4×4, 8×8, or 16×16 pixels.

Generally, among the intra and inter prediction methods, a prediction method with higher encoding efficiency is selected and used. The conventional block-based prediction methods rid only one of the temporal and spatial redundancies included in an image, whose removal provides more encoding efficiency than removal of the other. However, even though one of the inter and intra prediction methods is used to remove one type of redundancy included in an image, the other type of redundancy still remains in the image, so that it is not likely to contribute to an enhancement in encoding efficiency.

For example, the conventional block-based prediction methods would not greatly work on images including both temporal and spatial redundancies.

Further, the above-mentioned block-based prediction methods are not appropriate for encoding HD or higher images.

Specifically, in the case of a low-resolution small image to be encoded, it may be efficient in terms of accuracy of motion prediction and bit rate to perform motion prediction and compensation with a small size of block. However, in the case of a high-resolution large image, when its motion prediction and compensation are conducted in the unit of a block having a size of 16×16 or less, the number of blocks included in one picture may be exponentially increased, thus resulting in an increase in encoding processing load and the amount of data compressed. Thus, the bit rate increases.

Further, as the resolution of an image increases, a region with no detail or no deviation becomes broader. Accordingly, when motion prediction and compensation are conducted with a block having a size of 16×16 pixels as in the conventional methods, encoding noise may increase.

Meanwhile, the method of encoding images using inter prediction predicts pixel values based on pixel correlation between blocks from pixel values in the blocks surrounding a current block, which have been already encoded, such as an upper block, a left block, an upper and left block, and an upper and right block in a current frame (or picture), and transmits their prediction errors.

In the inter-prediction encoding, among several prediction directions (horizontal, vertical, diagonal, or average, etc.), an optimal prediction mode (prediction direction) is selected to be suited for characteristics of an image to be encoded.

In the existing H.264/AVC standards, in the case that the inter-prediction encoding applies to a 4×4 pixel unit block, among nine prediction modes (prediction modes 0 to 8), one most appropriate prediction mode is selected every 4×4 pixel blocks, and the selected prediction mode (prediction direction) is encoded on a per-4×4 pixel block basis. Further, in the case that the inter-prediction encoding applies to a 16×16 pixel unit block, among four prediction modes (vertical prediction, horizontal prediction, average prediction, and planar prediction), one most appropriate prediction mode is selected every 16×16 pixel blocks, and the selected prediction mode (prediction direction) is encoded on a per-16×16 pixel block basis.

In the existing intra-prediction encoding, a predetermined number of prediction directions are predefined only for M×M square-type symmetrical pixel blocks (M=4, 8, or 16) to perform the intra-prediction encoding. That is, conventionally, M×M-size symmetrical partitioning only is applied for inter-prediction encoding so that a square-type symmetrical block is used as a basic unit for the intra-prediction encoding.

In the case of fulfilling the intra-prediction encoding using only the existing symmetrical pixel blocks, there is a limit to raising coding efficiency, so a method to enhance coding efficiency is required. In particular, when it comes to high-resolution images having the high definition (HD) or higher resolution, the intra-prediction encoding which uses only the symmetrical pixel blocks has a limit as to increasing encoding efficiency. Therefore, a need exists which can increase encoding efficiency.

DISCLOSURE

Technical Problem

A first object of the present invention is to provide an image encoding and decoding method that can increase encoding efficiency for high-resolution images having an HD or higher resolution.

A second object of the present invention is to provide an image encoding and decoding apparatus that can increase encoding efficiency for high-resolution images having an HD or higher resolution.

A third object of the present invention is to provide an intra-prediction encoding method and apparatus that can apply to high-resolution images having an HD or higher resolution.

A fourth object of the present invention is to provide an intra-prediction decoding method and apparatus that can apply to high-resolution images having an HD or higher resolution.

A fifth object of the present invention is to provide an image encoding and decoding method that can increase encoding efficiency while maintaining quality of high-resolution images having an HD or higher resolution.

A sixth object of the present invention is to provide an image encoding and decoding apparatus that can increase encoding efficiency while maintaining quality of high-resolution images having an HD or higher resolution.

Technical Solution

To achieve the first object, according to an aspect of the present invention, there is provided a method of encoding an image, the method comprising the steps of receiving at least one picture to be encoded, determining a size of a block to be encoded based on a temporal frequency characteristics between the received at least one picture, and encoding a block having the determined size.

To achieve the first object, according to another aspect of the present invention, there is provided a method of encoding an image having an HD or higher resolution, the method comprising the steps of generating a prediction block by performing motion compensation on a prediction unit having a size of N×N pixels, wherein N is a power of two and N is equal to or more than 32, obtaining a residue by comparing the prediction unit with the prediction block, and transforming the residue. The image has a resolution which is an HD (High Definition) or higher resolution, and wherein the prediction unit has a size of an extended macro-block. The step of transforming the residue includes performing DCT (Discrete Cosine Transform) on the extended macro-block. The prediction unit has a size of N×N pixels, wherein N is a power of two and N is equal to or more than 128. The size of the prediction unit may be restricted to 64×64 pixels or less in consideration of complexity of an encoder and decoder.

To achieve the first object, according to another aspect of the present invention, there is provided a method of encoding an image, the method comprising the steps of receiving at least one picture to be encoded, determining a size of a prediction unit to be encoded based on a spatial frequency characteristics of the received at least one picture, wherein the size of the prediction unit has a size of N×N pixels, wherein N is a power of two and N is equal to or more than 32, and encoding the prediction unit having the determined size.

To achieve the first object, according to another aspect of the present invention, there is provided a method of encoding an image, the method comprising the steps of receiving an extended macro-block having a size of N×N pixels, wherein N is a power of two and N is equal to or more than 32, detecting a pixel belonging to an edge among blocks adjacent to the received extended macro-block, splitting the extended macro-block into at least one partition based on the pixel belonging to the edge, and performing encoding on a predetermined partition of the split at least one partition.

To achieve the first object, according to an aspect of the present invention, there is provided a method of decoding an image having a HD or higher resolution, the method comprising the steps of receiving an encoded bit stream, obtaining size information of a prediction unit to be decoded from the received bit stream, wherein a size of the prediction unit is N×N pixels, wherein N is a power of two and N is equal to or more than 32, inverse-quantizing and inverse-transforming the received bit stream to obtain a residue, performing motion compensation on a prediction unit having a size corresponding to the obtained size information of the prediction unit to generate a prediction block, and adding the generated prediction block to the residue to restore the image. The prediction unit has a size of an extended macro-block. The step of transforming the residue includes performing inverse DCT (Discrete Cosine Transform) on the extended macro-block. The prediction unit has a size of N×N pixels, wherein N is a power of two, and wherein the size of the prediction unit is restricted to 64×64 pixels or less in consideration of complexity of an encoder and a decoder. The prediction unit corresponds to a leaf coding unit when a coding unit having a variable size is hierarchically split and reaches a maximum permissible level or level depth. The method further comprises the step of obtaining partition information of the prediction unit to be decoded from the received bit stream. The step of performing motion compensation on a prediction unit having a size corresponding to the obtained size information of the prediction unit to generate a prediction block includes splitting the prediction unit into partitions based on the partition information of the prediction unit to perform the motion compensation on the split partitions. The partition splitting is achieved by an asymmetric partitioning method. The partition splitting is achieved by a geometrical partitioning method with a shape other than a square shape. The partition splitting is achieved by a partitioning method along a direction of an edge. The partitioning method along the edge direction includes the steps of detecting a pixel belonging to the edge among blocks adjacent to the prediction unit and splitting the prediction unit into at least one partition based on the pixel belonging to the detected edge. The partitioning method along the edge direction applies to intra prediction.

To achieve the first object, according to another aspect of the present invention, there is provided a method of decoding an image, the method comprising the steps of receiving an encoded bit stream, obtaining size information and partition information of a macro-block to be decoded from the received bit stream, obtaining a residue by inverse-quantizing and inverse-transforming the received bit stream, splitting an extended macro-block having a size of 32×32, 64×64, and 128×128 pixels based on the obtained size information and partition information of the macro-block into at least one partition, performing motion compensation on a predetermined partition of the split at least one partition to generate a prediction partition, and adding the generated prediction partition to the residue thereby restoring the image.

To achieve the second object, according to an aspect of the present invention, there is provided an apparatus of encoding an image comprising a prediction unit determining unit configured to receive at least one picture to be encoded and to determine a size of a prediction unit to be encoded based on a temporal frequency characteristics between the received at least one picture and a spatial frequency characteristics of the received at least one picture and an encoder configured to encode the prediction unit having the determined size.

To achieve the second object, according to another aspect of the present invention, there is provided an apparatus of encoding an image comprising an entropy decoding unit configured to decode a received bit stream to generate header information, a motion compensating unit configured to perform motion compensation on the prediction unit based on size information of the prediction unit obtained from the header information, wherein the size of the prediction unit is N×N pixels, wherein N is a power of two and N is equal to or more than 32, thereby generating a prediction block, an inverse-quantizing unit configured to inverse-quantize the received bit stream, an inverse-transforming unit configured to inverse-transform the inverse-quantized data to obtain a residue, and an adder configured to add the reside to the prediction block to restore the image. The prediction unit has a size of an extended macro-block. The inverse-transforming unit is configured to perform inverse DCT on the extended macro-block. The prediction unit has a size of N×N pixels, wherein N is a power of two, and wherein the size of the prediction unit is restricted to 64×64 pixels or less in consideration of complexity of an encoder and a decoder. The prediction unit corresponds to a leaf coding unit when a coding unit having a variable size is hierarchically split and reaches a maximum permissible level or level depth. The motion compensating unit is configured to split the prediction unit into partitions based on partition information of the prediction unit and to perform the motion compensation on the split partitions. The partition splitting is achieved by an asymmetric partitioning method. The partition splitting is achieved by a geometrical partitioning method with a shape other than a square shape. The partition splitting is achieved by a partitioning method along a direction of an edge.

To achieve the third object, according to an aspect of the present invention, there is provided a method of encoding an image, the method comprising the steps of performing intra-prediction encoding by selectively using one of a plurality of prediction modes on a prediction unit split by applying at least one of asymmetric partitioning and geometrical partitioning to an input image so as to prediction-encode the input image and performing transform, quantization, and entropy encoding on a residue which is a difference between a prediction unit predicted by the intra prediction and a current prediction unit. The pixel value in the asymmetric-partitioned prediction unit may be predicted from the pixel value in the encoded block earlier than the prediction unit along one prediction direction of vertical direction, horizontal direction, average prediction, diagonal down-right, and diagonal down-right.

To achieve the fourth object, according to an aspect of the present invention, there is provided a method of decoding an image, the method comprising the steps of restoring a residue by entropy-decoding a received bit stream and by performing inverse quantization and inverse transform on the residue, generating a prediction unit by performing intra-prediction encoding that selectively uses one of a plurality of prediction modes on a prediction unit split by applying at least one of asymmetric partitioning and geometrical partitioning, and restoring the image by adding the residue to the prediction.

The pixel value in the asymmetric-partitioned prediction unit may be predicted from the pixel value in the encoded block earlier than the prediction unit along one prediction direction of vertical direction, horizontal direction, average prediction, diagonal down-right, and diagonal down-right. The pixel value in the asymmetric-partitioned prediction unit may be predicted from the pixel value in the block encoded earlier than the prediction unit along the line made at a predetermined even interval in all over the direction of 360°. The pixel value in the asymmetric-partitioned prediction unit may be subjected to intra prediction along the line having an angle corresponding to a slope based on dx and dy which define the slope with dx along the horizontal direction and dy along the vertical direction. The prediction pixel value of the rightmost and lowermost pixel in the prediction unit may be obtained based on the vertically and horizontally corresponding pixels in the left and upper blocks encoded earlier than the prediction unit. The prediction pixel value of the rightmost and lowermost pixel in the prediction unit may be obtained by linear interpolation and using vertically and horizontally corresponding inner pixels in the left and upper blocks earlier than the prediction unit. The prediction pixel value of the rightmost and lowermost pixel in the current prediction unit of the Nth picture may be obtained through linear interpolation between or based on an average value between vertically and horizontally corresponding pixels in the previously encoded left and upper blocks adjacent to the current unit and vertically and horizontally corresponding pixels in the previously encoded left and upper blocks adjacent to the prediction unit corresponding to the N−1th picture.

To achieve the fourth object, according to another aspect of the present invention, there is provided an apparatus of decoding an image comprising an inverse-transforming unit configured to restore a residue by entropy-decoding a received bit stream and by performing inverse quantization and inverse transform on the residue, an intra predicting unit configured to generate a prediction unit by performing intra-prediction encoding that selectively uses one of a plurality of prediction modes on a prediction unit split by applying at least one of asymmetric partitioning and geometrical partitioning, and an adder configured to restore the image by adding the residue to the prediction.

To achieve the fifth object, according to an aspect of the present invention, there is provided a method of decoding an image, the method comprising the steps of receiving a bit stream in which an intra prediction mode on a current block is encoded, wherein the intra prediction mode is determined based on a residue between a pixel adjacent to the current block having a second size in an Nth picture and a pixel adjacent to a reference block in an N−1th picture temporally positioned before the Nth picture, obtaining a motion vector, the intra prediction mode and a quantized residue by entropy-decoding the bit stream, obtaining the residue by inverse-quantizing and inverse-transforming the quantized residue, determining a reference block of the current block having the second size in at least one picture by using the motion vector, and restoring the current block by applying the intra prediction mode to a result of an operation between a pixel adjacent to the determined reference block and the residue. The step of determining the reference block of the current block having the second size in the at least one picture using the motion vector includes determining a reference macro-block of the current macro-block having the first size including the current block having the second size using the motion vector and determining the reference block included in the reference macro-block based on the position of the current block included in the current macro-block. The current macro-block having the first size may have a size of 32×32 pixels or more, and the current block having the second size may have one of 4×4 and 8×8 pixels.

To achieve the fifth object, according to another aspect of the present invention, there is provided a method of decoding an image, the method comprising the steps of receiving a bit stream in which an intra prediction mode on a current block is encoded, wherein the intra prediction mode is determined based on a residue between a pixel adjacent to the current block having a second size in an Nth picture and a pixel adjacent to a reference block in an N+1th picture temporally positioned behind the Nth picture, obtaining a motion vector, the intra prediction mode and a quantized residue by entropy-decoding the bit stream, obtaining the residue by inverse-quantizing and inverse-transforming the quantized residue, determining a reference block of the current block having the second size in at least one picture by using the motion vector, and restoring the current block by applying the intra prediction mode to a result of an operation between a pixel adjacent to the determined reference block and the residue.

To achieve the fifth object, according to another aspect of the present invention, there is provided a method of decoding an image, the method comprising the steps of receiving a bit stream in which an intra prediction mode on a current block is encoded, wherein the intra prediction mode is determined based on a residue determined based on a forward residue between a pixel adjacent to the current block having a second size in an Nth picture and a pixel adjacent to a reference block in an N−1th picture temporally positioned before the Nth picture and a reverse residue between a pixel adjacent to the current block having a second size in an Nth picture and a pixel adjacent to a reference block in an N+1th picture temporally positioned behind the Nth picture, obtaining a motion vector, the intra prediction mode and a quantized residue by entropy-decoding the bit stream, obtaining the residue by inverse-quantizing and inverse-transforming the quantized residue, determining a reference block of the current block having the second size in at least one picture by using the motion vector, and restoring the current block by applying the intra prediction mode to a result of an operation between a pixel adjacent to the determined reference block and the residue.

To achieve the fifth object, according to another aspect of the present invention, there is provided a method of decoding an image, the method comprising the steps of receiving a bit stream in which an intra prediction mode on a current block is encoded, wherein the intra prediction mode is determined based on a residue determined based on a first residue between a pixel adjacent to the current block having a second size in an Nth picture and a pixel adjacent to a reference block in an N−1th picture temporally positioned before the Nth picture and a second residue between a pixel adjacent to the current block having a second size in an Nth picture and a pixel adjacent to a reference block in an N−2th picture temporally positioned before the N−1th picture, obtaining a motion vector, the intra prediction mode and a quantized residue by entropy-decoding the bit stream, obtaining the residue by inverse-quantizing and inverse-transforming the quantized residue, determining a reference block of the current block having the second size in at least one picture by using the motion vector, and restoring the current block by applying the intra prediction mode to a result of an operation between a pixel adjacent to the determined reference block and the residue.

To achieve the sixth object, according to an aspect of the present invention, there is provided an apparatus of decoding an image comprising an entropy decoding unit configured to generate a motion vector, an intra prediction mode, and a quantized residue by entropy-decoding a bit stream in which the intra prediction mode is encoded, wherein the intra prediction mode is determined based on a residue between a pixel adjacent to the current block having a second size in an Nth picture and a pixel adjacent to a reference block in at least one reference picture, a decoding controller configured to obtain a block size and reference picture information from entropy-decoded information, an inverse-quantizing unit configured to inverse-quantize the quantized residue, an inverse-transforming unit configured to inverse-transform the inverse-quantized reside, and a predicting unit configured to determine a reference block of the to-be-decoded current block having the second size based on the motion vector and the reference picture information, to operate a pixel adjacent to the determined reference block with the residue, and to apply the intra prediction mode to a result of the operation, thereby restoring the current block.

Advantageous Effects

As described above, the method of encoding/decoding high-resolution images and apparatus of performing the method set the size of a prediction unit to be encoded to 32×32 pixels, 64×64 pixels, or 128×128 pixels, performing motion prediction, motion compensation, and transformation on the basis of a set prediction unit size. In addition, the method and apparatus of the present invention divide a macro-block having a pixel size of 32×32, 64×64, or 128×128 into at least one partition on the basis of an edge and perform encoding processes for each partition.

In the case of a high-homogeneity or high-uniformity region which has the same color or has energy concentrated toward the low-frequency, the size of the prediction unit is expanded to a size of 32×32 pixels, 64×64 pixels, or 128×128 pixels, which corresponds to the size of an extended macro-block, for application to encoding/decoding, thereby increasing encoding/decoding efficiency of large-size images having an HD or ultra HD or higher resolution.

Further, according to the temporal frequency characteristics (shift between previous and current screen images or degree of motion) for large-size images, the size of the extended macro-block is increased or decreased by using the size of the extended macro-block as the size of the prediction unit, thus enhancing encoding/decoding efficiency.

Accordingly, it can be possible to enhance efficiency of encoding large-size images having an HD or ultra HD or higher resolution as well as to reduce encoding noise in a high-homogeneity, high-uniformity region.

The intra-prediction encoding/decoding method and apparatus can enhance encoding efficiency for high-resolution images having an HD or ultra HD resolution by applying intra-prediction encoding/decoding to pixels blocks having an asymmetrical shape or any geometrical shape with a size of M×N.

According to the above-described image encoding/decoding method and apparatus performing the same, a residue between a pixel adjacent to the current block having the second size in the Nth picture to be encoded and a pixel adjacent to the reference block having the second size included in at least one reference picture of the N−2th, N−1th, N+1th, and N+2th reference pictures is obtained, and based on the obtained residue, an inter prediction mode is determined, and transform, quantization, and entropy encoding are performed, and the result is then transferred. Header information such as block size information and reference picture information is also encoded and transferred, thereby enhancing encoding efficiency.

The above-described encoding/decoding method applies to encoding/decoding of each extended macro-block having a size of 32×32 pixels, thereby enhancing encoding/decoding efficiency for large-size images having an ultra HD or higher resolution.

DESCRIPTION OF DRAWINGS

FIGS. 23 to 25 are conceptual views illustrating an intra-prediction encoding method using an asymmetrical pixel block according to another embodiment of the present invention.

DESCRIPTION OF KEY ELEMENTS IN DRAWINGS

Figure 1:
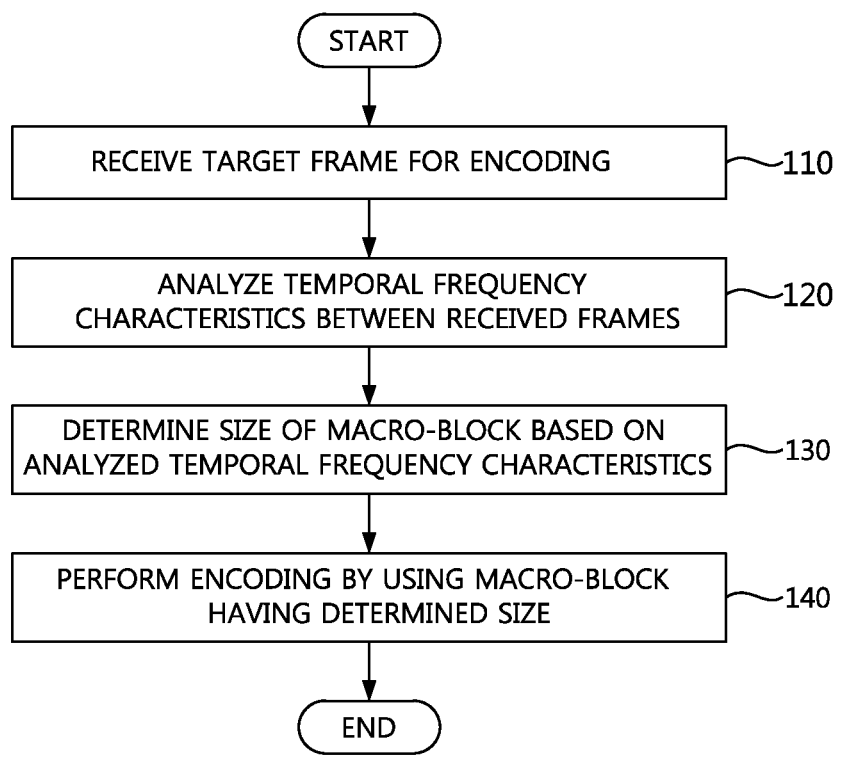
FIG. 1 is a flowchart illustrating an image encoding method according to an embodiment of the present invention.

1810, 1910: prediction unit determining unit 1820, 1920, 2110: prediction unit partitioning unit
1830: encoder
1930: decoder

BEST MODE

Various modifications and variations may be made to the present invention. Hereinafter, some particular embodiments will be described in detail with reference to the accompanying drawings.

However, it should be understood that the present invention is not limited to the embodiments and all the variations or replacements of the invention or their equivalents are included in the technical spirit and scope of the present invention.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings, wherein the same reference numerals may be used to denote the same or substantially the same elements throughout the specification and the drawings, and description on the same elements will be not repeated.

FIG. 1 is a flowchart illustrating an image encoding method according to an embodiment of the present invention. FIG. 1 illustrates a method of determining the size of a macro-block according to temporal frequency characteristics of an image and of then performing motion compensation encoding by using the determined size of macro-block.

Referring to FIG. 1, the encoding apparatus receives a target frame (or picture) to be encoded (step S110). The received target frame may be stored in a buffer which may store a predetermined number of frames. For example, the buffer may store at least four (n−3th, n−2th, n−1th, and nth) frames.

Subsequently, the encoding apparatus analyzes temporal frequency characteristics of the received frame (or picture) (step S120). For example, the encoding apparatus detects a variance between the n−3th frame (or picture) and the n−2th frame (or picture), a variance between the n−2th frame (or picture) and the n−1th frame (or picture), and a variance between the n−1th frame (or picture) and the nth frame (or picture) to analyze the temporal frequency characteristics between frames (or pictures).

Thereafter, the encoding apparatus compares the analyzed temporal frequency characteristics with a preset threshold value, and based on a result of the comparison, determines the size of a macro-block to be encoded (step S130). Here, the encoding apparatus may determine the size of the macro-block based on a variance between two temporally adjacent frames (for example, n−1th and nth frames) among the frames stored in the buffer or may determine the size of the macro-block based on characteristics of changes in a predetermined number of frames (for example, n−3th, n2-th, n−1th, and nth frames) to reduce overhead for information on the size of the macro-block.

For example, the encoding apparatus analyzes the temporal frequency characteristics of the n−1th frame (or picture) and the nth frame (or picture), and if the analyzed temporal frequency characteristics value is less than a preset first threshold value, determines the size of the macro-block as 64×64 pixels. If the analyzed temporal frequency characteristics value is equal to and more than the preset first threshold value and less than a second threshold value, the size of the macro-block is determined as 32×32 pixels, and if the analyzed temporal frequency characteristics value is equal to or more than the preset second threshold value, the size of the macro-block is determined as 16×16 pixels or less. Here, the first threshold value refers to a temporal frequency characteristics value when a variance between frames (or pictures) is smaller than the second threshold value. Hereinafter, the extended macro-block is defined as a macro-block having a size of 32×32 pixels or more. The extended macro-block may have a size of 32×32 pixels or more, such as 64×64 pixels or 128×128 pixels, to be suited for high resolution including ultra HD or higher resolution. In case of ultra HD or higher resolution, the extended macro-block may be restricted to the maximum size of 64×64 pixels or less in consideration of complexity of the encoder and decoder.

The size of the macro-block to be encoded may have a predetermined value for each picture or each GOP (Group of Pictures) based on the result of analysis of the temporal frequency characteristics of the received picture.

Or, irrespective of the result of analysis of the temporal frequency characteristics of the received picture, the size of the macro-block to be encoded may have a predetermined value for each picture or each GOP.

If the size of the macro-block is determined in step S130, the encoding apparatus performs encoding on the basis of the determined size of macro-block (step S140).

For example, if the size of the macro-block is determined to be 64×64 pixels, the encoding apparatus performs motion prediction on a current macro-block whose size is 64×64 pixels to obtain a motion vector which is then used to conduct motion compensation to generate a prediction block, and transforms, quantizes and performs entropy encoding on a residue, which is a difference between the generated prediction block and the current macro-block, then transmits the result. Further, information on the determined size of the macro-block and information on the motion vector are also encoded and then transmitted.

In the following embodiments, per-extended macro-block encoding may be fulfilled depending on the size of the macro-block which is determined by an encoding controller (not shown) or a decoding controller (not shown), and as described above, ma y apply to all of the motion compensation encoding, transform, and quantization. However, it may apply to at least one of the motion compensation encoding, transform, or quantization. Further, the per-extended macro-block encoding may apply likewise to decoding according to the following embodiments.

As shown in FIG. 1, in the image encoding method according to an embodiment, when a variance between input frames is small (i.e., when the temporal frequency is low), the size of the macro-block increases and when the variance between frames is large (i.e., when the temporal frequency is high), the size of the macro-block decreases, thereby enhancing encoding efficiency.

The above-described image encoding/decoding method according to temporal frequency characteristics may apply high-resolution images having HD or ultra HD or higher resolution. Hereinafter, the "macro-block" refers to an extended macro-block or an existing macro-block that has a size of 32×32 pixels or less.

According to another embodiment of the present invention, instead of performing encoding/decoding based on the extended macro-block or its size, a recursive coding unit (CU) may be used to perform encoding and decoding. Hereinafter, a recursive coding unit structure according to an embodiment is described with reference to FIG. 2.

Figure 2:
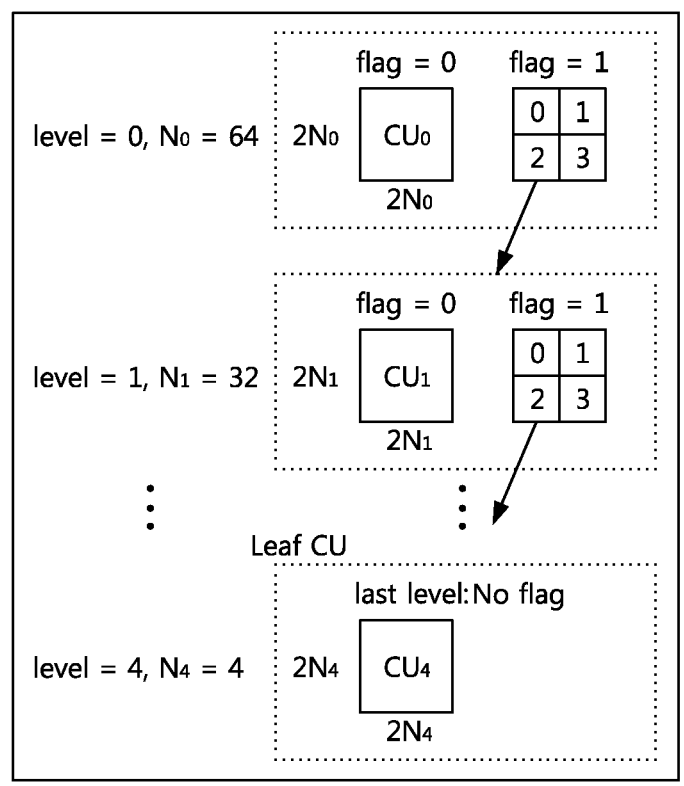
FIG. 2 is a conceptual view illustrating a recursive coding unit structure according to another embodiment of the present invention.

FIG. 2 is a conceptual view illustrating a recursive coding unit structure according to an embodiment of the present invention.

Referring to FIG. 2, each coding unit CU has a square shape and may have a variable size of 2N×2N (unit: pixels). Inter prediction, intra prediction, transform, quantization, and entropy encoding may be performed on a per-coding unit basis. The coding unit CU may include a maximum coding unit LCU and a minimum coding unit SCU. The size of the maximum or minimum coding unit LCU or SCU may be represented by powers of 2 which are 8 or more.

Figure 4:
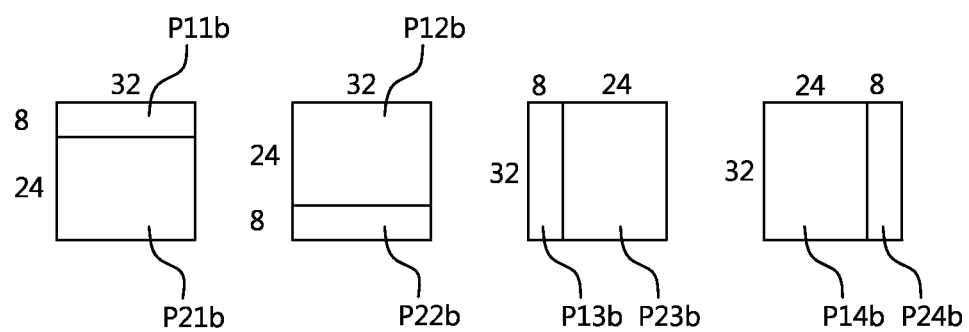

According to an embodiment, the coding unit CU may have a recursive tree structure. FIG. 2 illustrates an example where a side of the maximum coding unit LCU (or $CU_0$) has a size of $2N_0$ which is 128 ($N_0$=64) while the maximum level or level depth is 5. The recursive structure may be represented by a series of flags. For example, in the case that a coding unit $CU_k$ whose level or level depth is k has a flag value of 0, coding on the coding unit $CU_k$ is performed on the current level or level depth. When the flag value is 1, the coding unit $CU_k$ is split into four independent coding units $CU_{k+1}$ having a level or level depth of k+1 and a size of $N_{k+1} \times N_{k+1}$. In this case, the coding unit $CU_{k+1}$ may be recursively processed until its level or level depth reaches the permissible maximum level or level depth. When the level or level depth of the coding unit $CU_{k+1}$ is the same as the permissible maximum level or level depth (which is, e.g., 4 as shown in FIG. 4), any further splitting is not permissible.

The size of the maximum coding unit LCU and the size of the minimum coding unit SCU may be included in a sequence parameter set (SPS). The sequence parameter set SPS may include the permissible maximum level or level depth of the maximum coding unit LCU. For example, in the example illustrated in FIG. 2, the permissible maximum level or level depth is 5, and when the side of the maximum coding unit LCU has a size of 128 pixels, five coding unit sizes, such as 128×128 (LCU), 64×64, 32×32, 16×16, and 8×8 (SCU), may be possible. That is, given the size of the maximum coding unit LCU and the permissible maximum level or level depth, the permissible size of the coding unit may be determined.

The size of the coding unit, in the case of high resolution, such as ultra HD, may be restricted to the maximum size of 64×64 in consideration of complexity of the encoder and decoder.

Use of the above-described recursive coding unit structure may provide the following advantages.

First, a size larger than that of the existing 16×16 macro-block may be supported. If an image region of interest is homogeneous, the maximum coding unit LCU may express the image region of interest with a smaller number of symbols than when using a number of small blocks.

Second, compared to when using a fixed size of macro-block, any size of maximum coding unit LCU may be supported, so that the codec may be easily optimized to various contents, applications, and apparatuses. That is, the size of the maximum coding unit LCU, the maximum level or level depth may be properly selected so that the hierarchical block structure may be optimized further than the target application.

Third, irrespective of whether it is a macro-block, sub-macro-block, or extended macro-block, a single unit type of a coding unit LCU is used so that the multilevel hierarchical structure may be simply represented by using the size of the maximum coding unit LCU, the maximum level (or the maximum level depth), and a series of flags. When used together with size-independent syntax representation, the coding unit LCU is enough to indicate one generalized size of syntax item for the remaining coding tools, and such conformity may simplify actual parsing processes. The maximum level value (or maximum level depth value) may be any value and may have a value larger than a value permitted in the existing H.264/AVC encoding scheme. All syntax elements may be indicated in a consistent manner independent from the size of the coding unit CU by using the size-independent syntax representation. The splitting process for the coding unit may be recursively indicated, and syntax elements for the leaf coding unit (the last coding unit in the level) may be defined to the same size regardless of the size of the coding unit. The above representation is very effective in reducing parsing complexity and may make the representation further clarified when a high level or level depth is allowed.

If the hierarchical splitting process is complete, inter prediction or intra prediction may be performed on the leaf node of the coding unit hierarchical unit without being further split. This leaf coding unit is used as the prediction unit PU which is a basic unit of the inter prediction or intra prediction.

For inter prediction or intra prediction, partitioning is fulfilled on the leaf coding unit. That is, partitioning is performed on the prediction unit PU. Here, the prediction unit PU is a basic unit for inter prediction or intra prediction and may be an existing macro-block unit or sub-macro-block unit, or an extended macro-block unit having a size of 32×32 pixels or more or a coding unit.

Partitioning includes asymmetrical partitioning, geometrical partitioning in any shape other than square, and partitioning along an edge direction, which are now described in greater detail.

FIGS. 3 to 6 are conceptual views illustrating asymmetric partitioning according to an embodiment.

Figure 3:
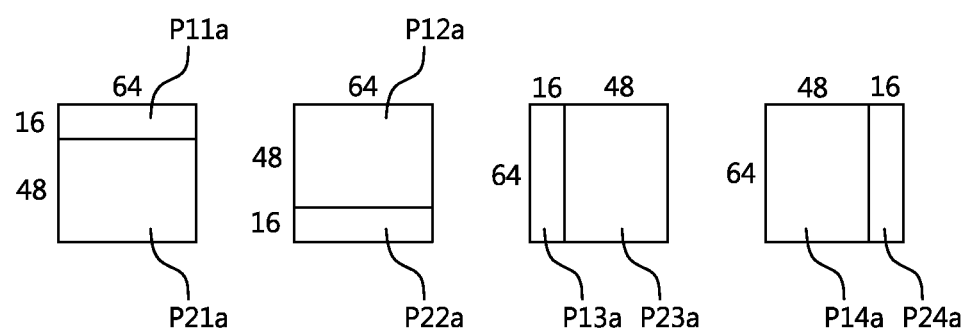
FIGS. 3 to 6 are conceptual views illustrating an asymmetric partitioning method according to an embodiment of the present invention.

When the prediction unit PU for inter prediction or intra prediction has a size of M×M (M is a natural number. The unit of the size is pixel), asymmetric partitioning is performed along a horizontal or vertical direction of the coding unit. FIG. 3 illustrates an example where the size of the prediction unit PU is 64×64 pixels.

Referring to FIG. 3, asymmetric partitioning is conducted along a horizontal direction to split the prediction unit into a partition P11a having a size of 64×16 and a partition P21a having a size of 64×48 or into a partition P12a having a size of 64×48 and a partition P22a having a size of 64×16. Or, asymmetric partitioning is performed along a vertical direction to split the prediction unit into a partition P13a having a size of 16×64 and a partition P23a having 48×64 or into a partition P14a having a size of 48×64 and a partition P24a having a size of 16×64.

Referring to FIG. 4, in the case of having a size of 32×32, the prediction unit may be subjected to horizontal-direction asymmetric partitioning to be split into a partition P11b having a size of 32×8 and a partition P21b having a size of 32×24 or into a partition P12b having a size of 32×24 and a partition P22b having a size of 32×8. Or, the prediction unit may be subjected to vertical-direction asymmetric partitioning to be split into a partition P13b having a size of 8×32 and a partition P23b having a size of 24×32 or into a partition P14b having a size of 24×32 and a partition P24b having a size of 8×32.

Figure 5:
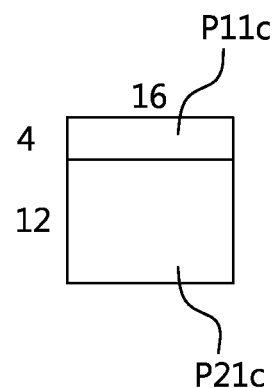

Referring to FIG. 5, in the case of having a size of 16×16, the prediction unit PU may be subjected to horizontal-direction asymmetric partitioning to be split into a partition P11c having a size of 16×4 and a partition P21c having a size of 16×12 or (although not shown in the drawings) into an upper partition having a size 16×12 and a lower partition having a size of 16×4. Further, although not shown in the drawings, the prediction unit PU may be subjected to vertical-direction asymmetric partitioning to be split into a left partition having a size of 4×16 and a right partition having a size of 12×16 or into a left partition having a size of 12×16 and a right partition having a size of 4×16.

Figure 6:
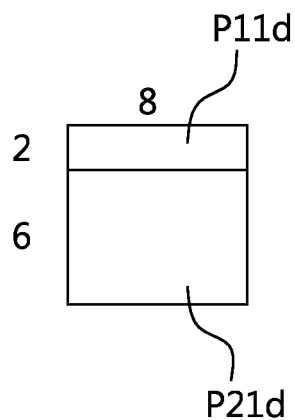

Referring to FIG. 6, in the case of having a size of 8×8, the prediction unit PU may be subjected to horizontal-direction asymmetric partitioning to be split into a partition P11d having a size of 8×2 and a partition P21d having a size of 8×6 or (although not shown in the drawings) into an upper partition having a size 8×6 and a lower partition having a size of 8×2. Further, although not shown in the drawings, the prediction unit PU may be subjected to vertical-direction asymmetric partitioning to be split into a left partition having a size of 2×8 and a right partition having a size of 6×8 or into a left partition having a size of 6×8 and a right partition having a size of 2×8.

Figure 7:
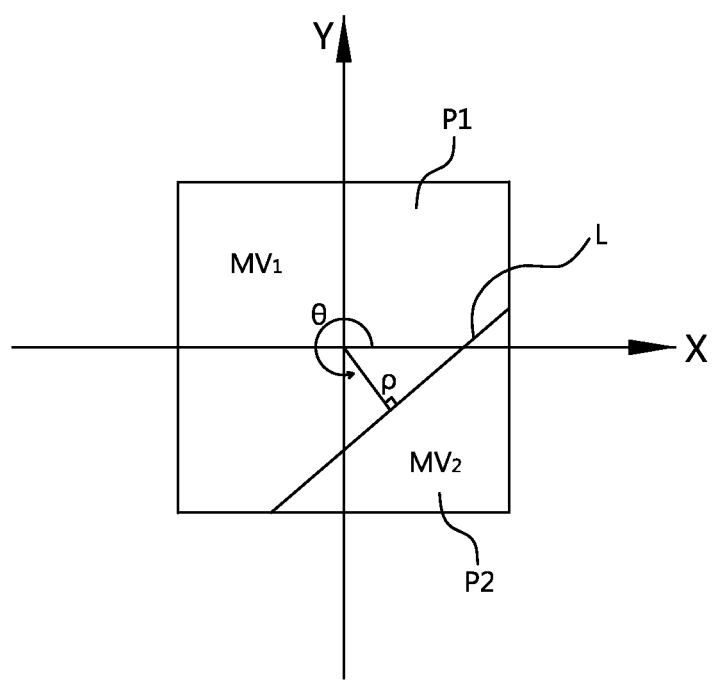
FIGS. 7 to 9 are conceptual views illustrating a geometrical partitioning method according to other embodiments of the present invention.
Figure 8:
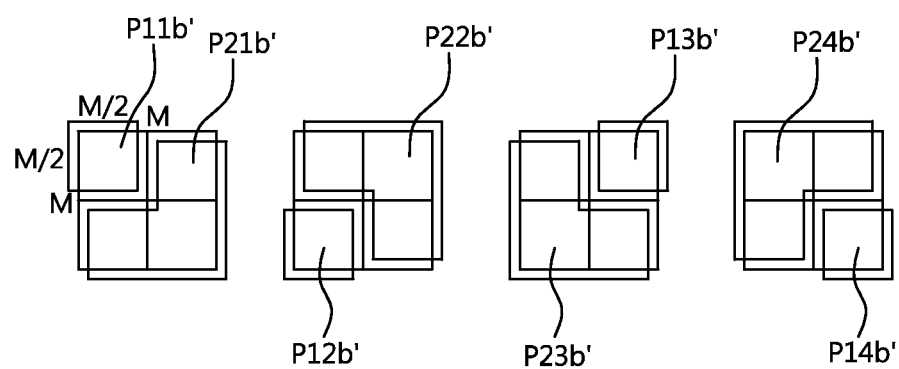
Figure 9:
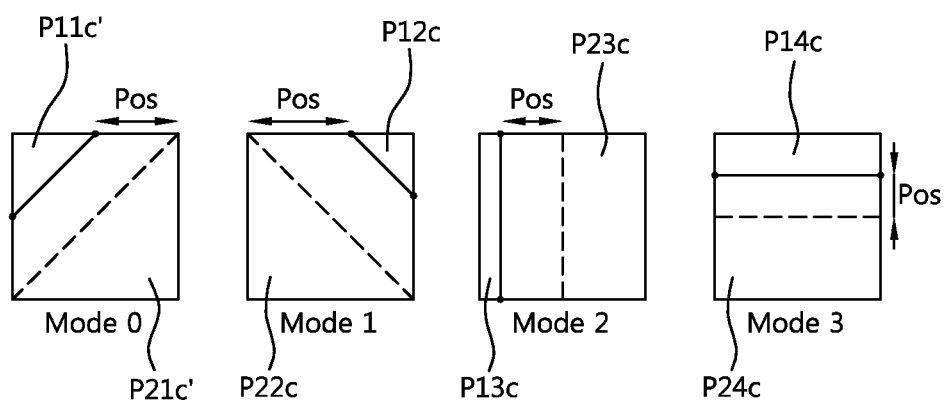

FIGS. 7 to 9 are conceptual views illustrating geometrical partitioning according to another embodiment of the present invention.

FIG. 7 illustrates an example where the prediction unit PU is subjected to geometrical partitioning so that the split partitions have a shape other than square.

Referring to FIG. 7, for the prediction unit, a geometrical boundary line L between partitions may be defined as follows. The prediction unit PU is divided into four quadrants by x and y axes passing through the center O of the prediction unit PU. A vertical line is drawn from the center O to the boundary line L. Then, any possible boundary line L positioned in any direction may be specified by a distance ρ from the center O to the boundary line L and an angle θ from the x axis to the vertical line in a counterclockwise direction.

FIG. 8 illustrates an example where the prediction unit PU is subjected to geometrical partitioning so that each split partition has any shape other than square.

Referring to FIG. 8, for inter or intra prediction, the prediction unit PU is divided into four quadrants with respect to its center. The second quadrant which is the upper and left portion of the prediction unit PU is split into a partition P11b', and the remaining L-shaped quadrants are split into a partition P21b'. As used herein, the "portion" of the prediction unit PU, which corresponds to a split partition or several split partitions, is also called "block". Or, the third quadrant which is the lower and left portion of the prediction unit PU is split into a partition P12b', and the remaining quadrants are split into a partition P22b'. Alternatively, the first quadrant which is the upper and right portion of the prediction unit PU is split into a partition P13b', and the remaining quadrants are split into a partition P23b'. Also, the lower and right portion of the prediction unit PU which corresponds to the fourth quadrant is split into a partition P14b', with the remaining quadrants slit into a partition P23b'. Further, the fourth quadrant, the lower and right portion of the prediction unit PU, is split into a partition P14b', with the remaining quadrants split into a partition P24b'.

As described above, the prediction unit may be split so that a split partition has an L shape. Accordingly, in the case that, upon partitioning, there is a moving object in an edge block, e.g., the upper and left, upper and right, lower and right, or lower and left block, it may provide more effective encoding than when the prediction unit PU is split into four blocks. Depending on the edge block in which the moving object is positioned among the four partitions, the corresponding partition may be selected and used.

FIG. 9 illustrates another example where the prediction unit PU is subjected to geometrical partitioning so that at least one of split partitions has a non-square shape.

Referring to FIG. 9, for inter or intra prediction, the prediction unit PU may be split into two different irregular regions (modes 0 and 1) or into differently sized rectangular regions (modes 2 and 3).

Here, the parameter "pos" is used to indicate a position of a boundary between partitions (shortly "inter-partition boundary). In the case of mode 0 or 1, "pos" denotes a horizontal-direction distance from a diagonal line of the prediction unit PU to the inter-partition boundary, and in the case of mode 2 or 3, "pos" denotes a horizontal-direction distance from a vertical or horizontal bisector to the inter-partition boundary. In FIG. 9, mode information may be transmitted to the decoder. Among the above-mentioned four modes, in terms of RD (Rate Distortion), a mode having the minimum RD cost may be used for inter prediction.

Figure 10:
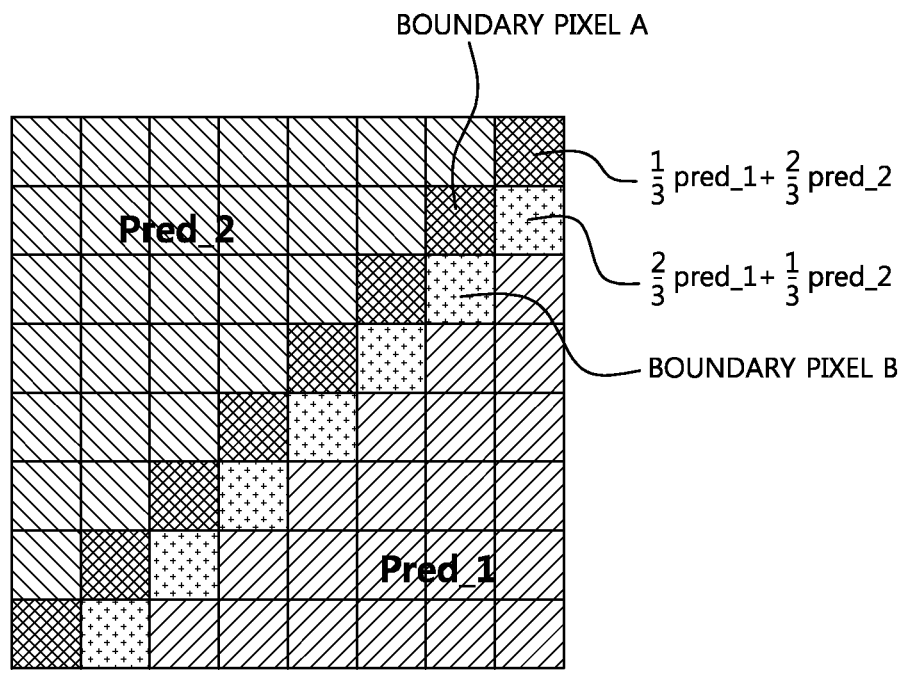
FIG. 10 is a conceptual view illustrating motion compensation for boundary pixels located at a boundary line when geometrical partitioning applies.

FIG. 10 is a conceptual view illustrating motion compensation for boundary pixels positioned along a boundary line in the case of geometrical partitioning. When the prediction unit PU is split into regions 1 and 2 by geometrical partitioning, a motion vector for the region 1 is referred to as MV1, a motion vector for the region 2 as MV2.

When among the specific top, bottom, left, and right pixels positioned in the region 1 (or 2), any one is also positioned in the region 2 (or 1)), it can be deemed a boundary pixel. Referring to FIG. 10, a boundary pixel A belongs to a boundary between the two regions in the region 2, and a boundary pixel B belongs to a boundary between the two regions in the region 1. Pixels other than the boundary pixels are subjected to normal motion compensation using an appropriate motion vector. The boundary pixels undergo motion compensation using a sum of values obtained by multiplying weighted factors by motion prediction values from the motion vectors MV1 and MV2 of the regions 1 and 2, respectively. In the example illustrated in FIG. 10, a weighted factor of ⅔ is used for a region including the boundary pixels, and a weighted factor of ⅓ is used for a region including no boundary pixels.

Figure 11:
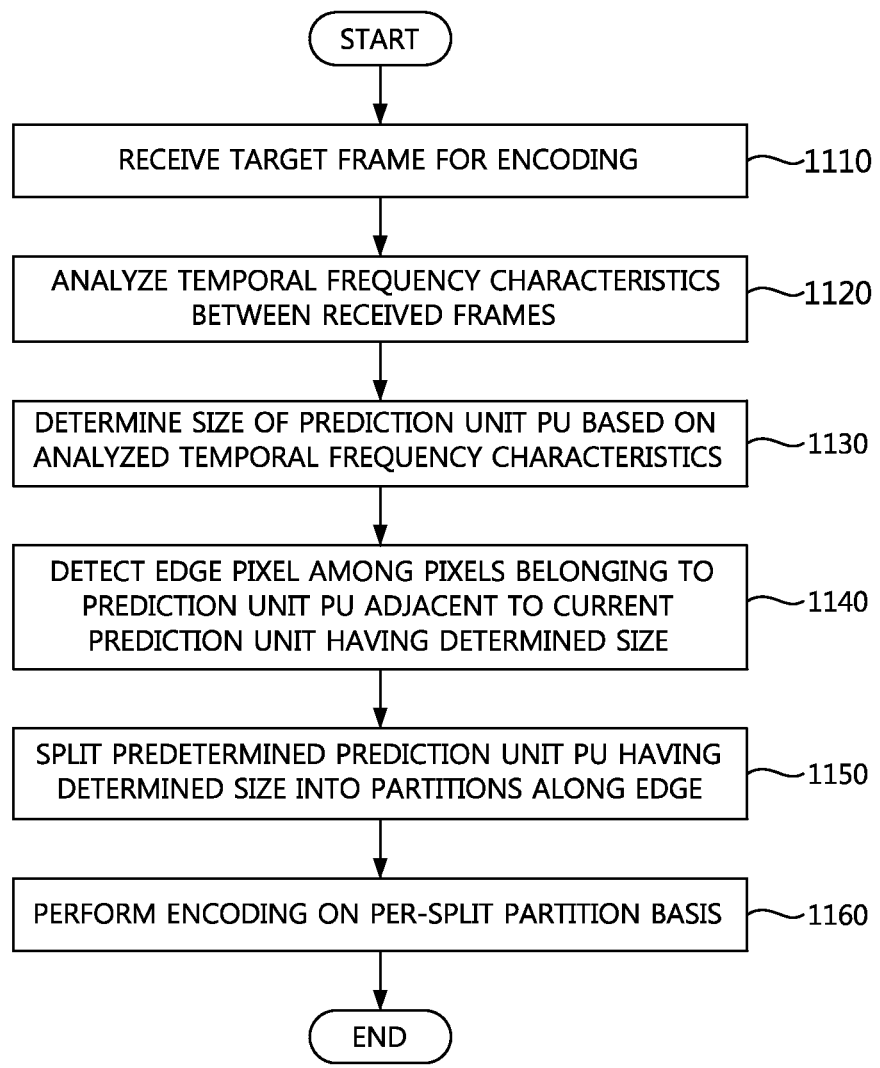
FIG. 11 is a flowchart illustrating an image encoding method according to another embodiment of the present invention.
Figure 12:
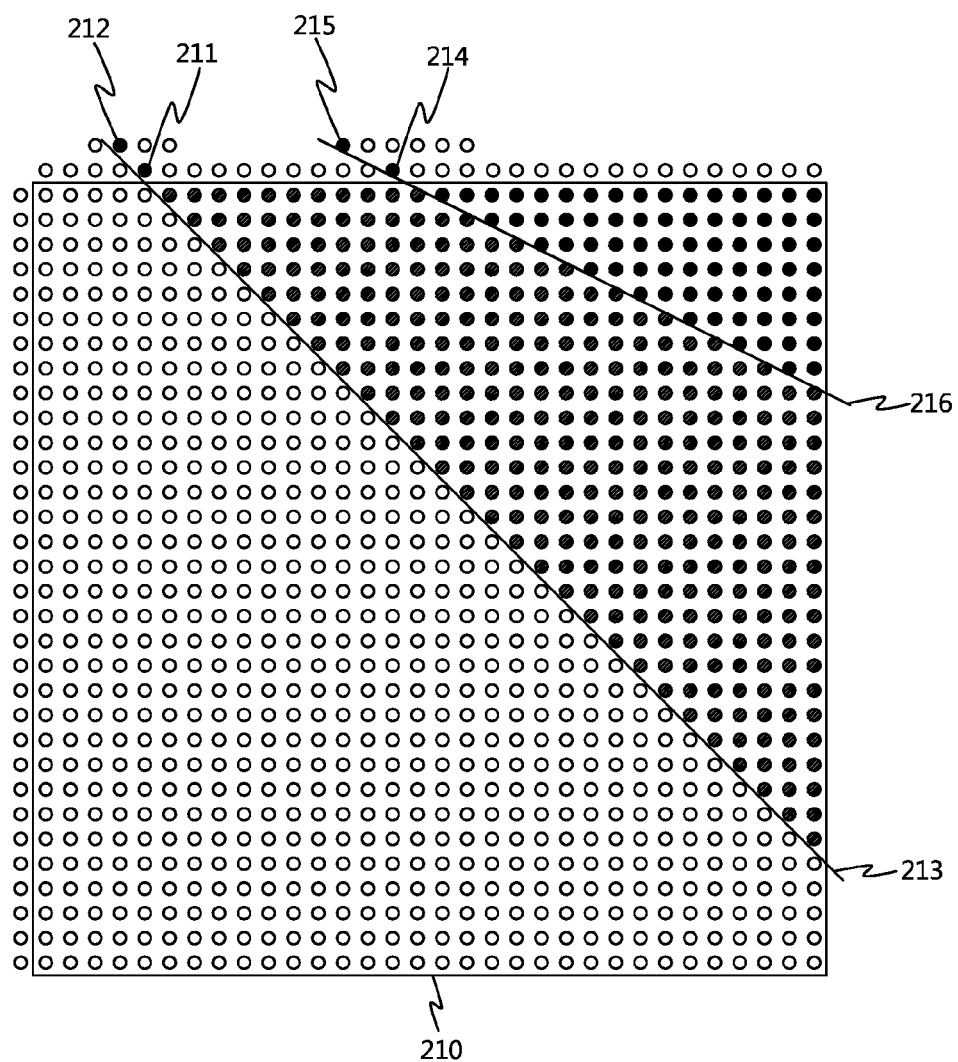
FIG. 12 is a conceptual view illustrating a partitioning process shown in FIG. 11.

FIG. 11 is a flowchart illustrating an image coding method according to another embodiment of the present invention. FIG. 12 is a conceptual view illustrating the partitioning illustrated in FIG. 11.

FIG. 11 illustrates a process in which after the size of the prediction unit PU is determined by the image encoding method shown in FIG. 1, the prediction unit PU is split into partitions considering the edge included in the prediction unit PU, and encoding is then performed for each split partition. An example is described in which the prediction unit PU uses a macro-block whose size is 32×32.

The edge-considered partitioning may apply to intra prediction as well as the inter prediction, and its detailed description will be given below in detail.

Steps S1110 to 1130 in FIG. 11 are substantially the same as steps S110 to S130, respectively, in FIG. 1, and thus detailed description is not repeated.

Referring to FIGS. 11 and 12, the size of the macro-block is determined in steps S1110 to S1130. Then, the encoding apparatus detects pixels belonging to an edge among pixels included in a macro-block adjacent to a current macro-block having the determined size (step S1140).

For detecting the pixels belonging to the edge in step S1140, various known methods may be employed. For example, difference values between the current macro-block and its adjacent pixels may be calculated or "sobel" algorithm or other edge-detection algorithms may be used for edge detection.

Thereafter, the encoding apparatus uses the pixels belonging to the detected edge to split the current macro-block into partitions (step S1150).

For splitting of the current macro-block, the encoding apparatus detects a pixel belonging to the edge among pixels adjacent to an edge pixel, which is determined to belong to the edge among pixels included in blocks adjacent to the current macro-block, and uses a line connecting the detected pixel with the edge pixel.

For example, as shown in FIG. 12, the encoding apparatus detects pixels 211 and 214 belonging to the edge from the closet pixels among pixels belonging to the blocks adjacent the current macro-block having a size of 32×32 pixels. Then, the encoding apparatus detects a pixel 212 belonging to the edge among pixels positioned around the detected pixel 211 and uses an extension line 213 connecting the pixels 211 and 212, thereby splitting the macro-block into partitions.

Or, the encoding apparatus detects a pixel 215 belonging to the edge among pixels adjacent to the detected pixel 214 and uses an extension line connecting the pixels 214 and 215 with each other, thereby partitioning the macro-block.

Further, the encoding apparatus detects, among only the pixels closest to the current macro-block 210 as the ones included in blocks adjacent to the current macro-block 210, pixels belonging to the edge (also referred to as "edge pixel(s)"), and determines the direction of a straight line passing through the edge pixels (this straight line is also referred to as "edge straight line"), thereby partitioning the current macro-block. Here, with respect to the edge straight line, among intra prediction modes for 4×4 blocks according to H.264/AVC standards, such as vertical mode (mode 0), horizontal mode (mode 1), diagonal down-left mode (mode 3), diagonal down-right mode (mode 4), vertical right mode (mode 5), horizontal-down mode (mode 6), vertical left mode (mode 7), and horizontal-up mode (mode 8), any one may be used to partition the current macro-block. Alternatively, partitions split in different directions with respect to the edge pixels are encoded, and considering encoding efficiency, the final direction of the straight line may be then determined. Or, in relation to the direction of the edge straight line, rather than the intra prediction modes for 4×4 blocks based on H.264/AVC standards, various intra predictions modes for blocks having a size larger than 4×4 pixel size are used among which any one is chosen, and the current macro-block may be subjected to partitioning along the direction indicated by the chosen mode. Information on the edge straight line (e.g., directional information) may be included in the partition information and may be transferred together with the partition information.

By the above-described method, the current macro-block is split into at least one partition in step S150. Then, the encoding apparatus performs encoding for each partition (step S1160).

For instance, the encoding apparatus performs motion prediction on each split partition in the current macro-block having a size of 64×64 or 32×32 pixels to obtain a motion vector and performs motion compensation using the obtained motion vector to generate a prediction partition. Then the encoding apparatus conducts transform, quantization, and entropy encoding on a residue which is a difference between the generated prediction partition and the partition of the current macro-block, then transfers the result. The encoding apparatus also performs entropy encoding on information regarding the size, partition information, and motion vector of the determined macro-block and then transfers the result.

The inter prediction using the above-described edge-considered partitioning may be made to be carried out when the prediction mode using the edge-considered partitioning is activated. As described above the edge-considered partitioning may apply to intra prediction as well as the inter prediction. An example of applying to the intra prediction is described with reference to FIG. 13.

Figure 13:
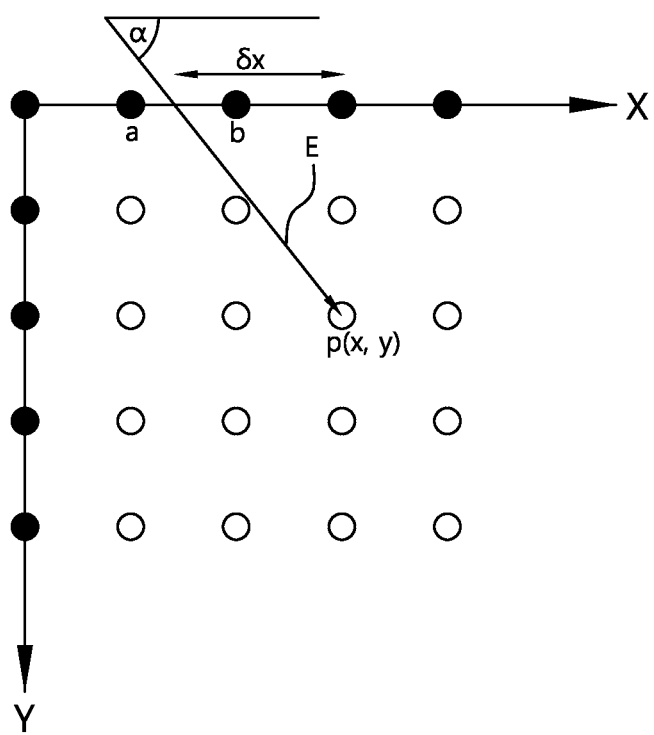
FIG. 13 is a conceptual view illustrating an example of edge-considered partitioning applies to intra prediction.

FIG. 13 is a conceptual view illustrating an example of applying edge-considered partitioning to intra prediction. As shown in FIG. 13, intra prediction using the edge-considered partitioning may be configured to be performed when the prediction mode using the edge-considered partitioning is activated. An edge is detected using the above-mentioned edge detection algorithm, such as sobel algorithm, and reference pixels may be then estimated along the detected edge direction.

Referring to FIG. 13, when a line E is an edge boundary line, pixels a and b are pixels positioned at both sides of the edge boundary line E, and p(x, y) is a reference pixel targeted for intra prediction, p(x, y) may be predicted according to Equation 1:

$$Wa = \delta x - \text{floor}(\delta x)$$

$$Wb = \text{ceil}(\delta x) - \delta x$$

$$P = WaXa + WbXb \qquad \text{[Equation 1]}$$

Here, δx refers to a distance from the x-axis coordinate of reference pixel p(x, y) to the intersection between the edge line E and the x axis, Wa and Wb to weighted factors, floor (δx) returning a largest integer not more than δx—for example, floor(1.7)=1—and ceil(δx) returning a value obtained by rounding off δx—for example, ceil(1.7)=2.

Information (including directional information) on the edge boundary line passing through the pixels included in the edge is included in the partition information and transferred to the decoder.

Figure 14:
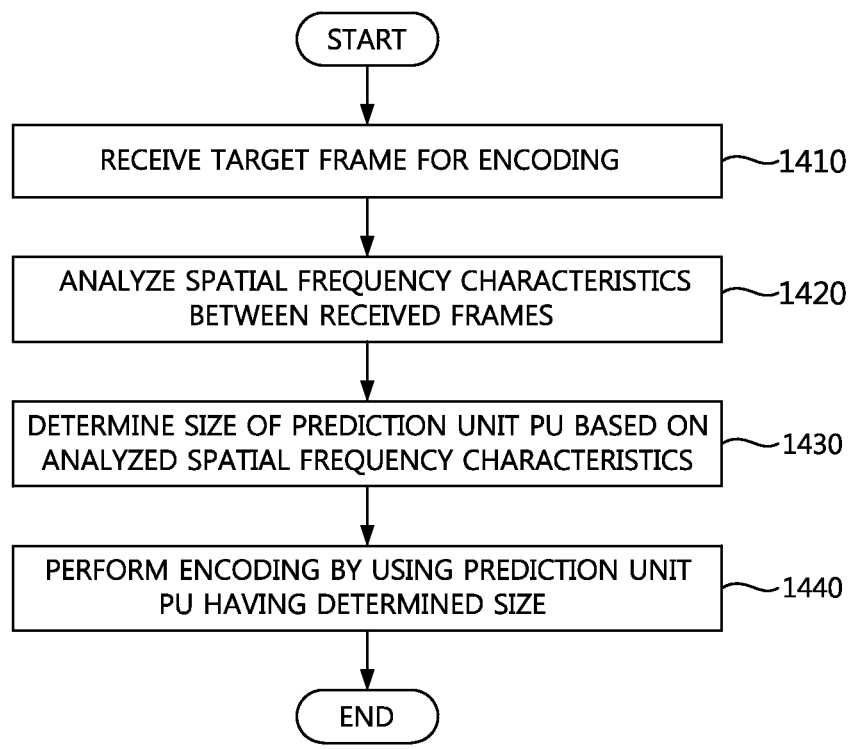
FIG. 14 is a flowchart illustrating an image encoding method according to another embodiment of the present invention.

FIG. 14 is a flowchart illustrating an image encoding method according to another embodiment of the present invention. FIG. 14 illustrates a method of performing motion compensation encoding using a prediction unit PU having a size determined depending on spatial frequency characteristics of an image.

Referring to FIG. 14, the encoding apparatus first receives a target frame (or picture) to be encoded (step S1310). Here, the received target frame may be stored in the buffer which may store a predetermined number of frames. For example, the buffer may store at least four (n−3th, n−2th, n−1th, and nth) frames.

Then, the encoding apparatus analyzes spatial frequency characteristics of each received frame (or picture) (step S1420). For example, the encoding apparatus calculates signal energy of each frame stored in the buffer, analyzes a relationship between the calculated signal energy and the frequency spectrum, and analyze spatial frequency characteristics of each image.

Thereafter, the encoding apparatus determines the size of the prediction unit PU based on the analyzed spatial frequency characteristics. Here, the size of the prediction unit PU may be determined on the basis of each frame stored in the buffer or on the basis of a predetermined number of frames.

For example, the encoding apparatus determines the size of the prediction unit PU to 16×16 pixels or less when the signal energy of the frame (or picture) is less than the third threshold value preset in the frequency spectrum, to 32×32 pixels when the signal energy is equal to or more than the preset third threshold value and less than the fourth threshold value, and to 64×64 pixels when the signal energy is equal to or more than the preset fourth threshold value. Here, the third threshold value refers to when the spatial frequency of the image is higher than that in case of the fourth threshold value.

According to the temporal or spatial frequency characteristics of each received picture, the size of the macro-block is used for encoding by the extended macro-block or prediction unit, so that encoding efficiency may be enhanced. However, according to the resolution (size) of each picture received independently from the temporal or spatial frequency characteristics of each received picture, encoding/decoding may be done using the extended macro-block or prediction unit. In other words, encoding/decoding may be conducted on pictures having a HD or ultra HD or higher resolution by using the extended macro-block or prediction.

If the size of the prediction unit PU is determined in step S1330, the encoding apparatus performs encoding on the basis of the determined size of prediction unit PU (step S1440).

For instance, if the size of the prediction unit PU is determined to 64×64 pixels, the encoding apparatus performs motion prediction on the current prediction unit PU having a size of 64×64 pixels to obtain a motion vector and performs motion compensation based on the obtained motion vector to generate a prediction block. Then, the encoding apparatus conducts transform, quantization, and entropy encoding on a residue which is a difference between the generated prediction block and the current prediction unit PU, and then transfers the result. Further, information on the size of the determined prediction unit PU and information on the motion vector are also subjected to entropy encoding and then transferred.

As shown in FIG. 14, in the image encoding method according to an embodiment, when image homogeneity or uniformity of an input picture is high (that is, when spatial frequency is low—for example, such as a region having the same color or a region whose energy is concentrated toward the lower frequency), the size of the prediction unit PU is set to be larger, e.g., to 32×32 pixels or more, and when the image homogeneity or uniformity of a picture is low (that is, when spatial frequency is high), the size of the prediction unit PU is set to be lower, e.g., to 16×16 pixels or less, thereby enhancing encoding efficiency.

Figure 15:
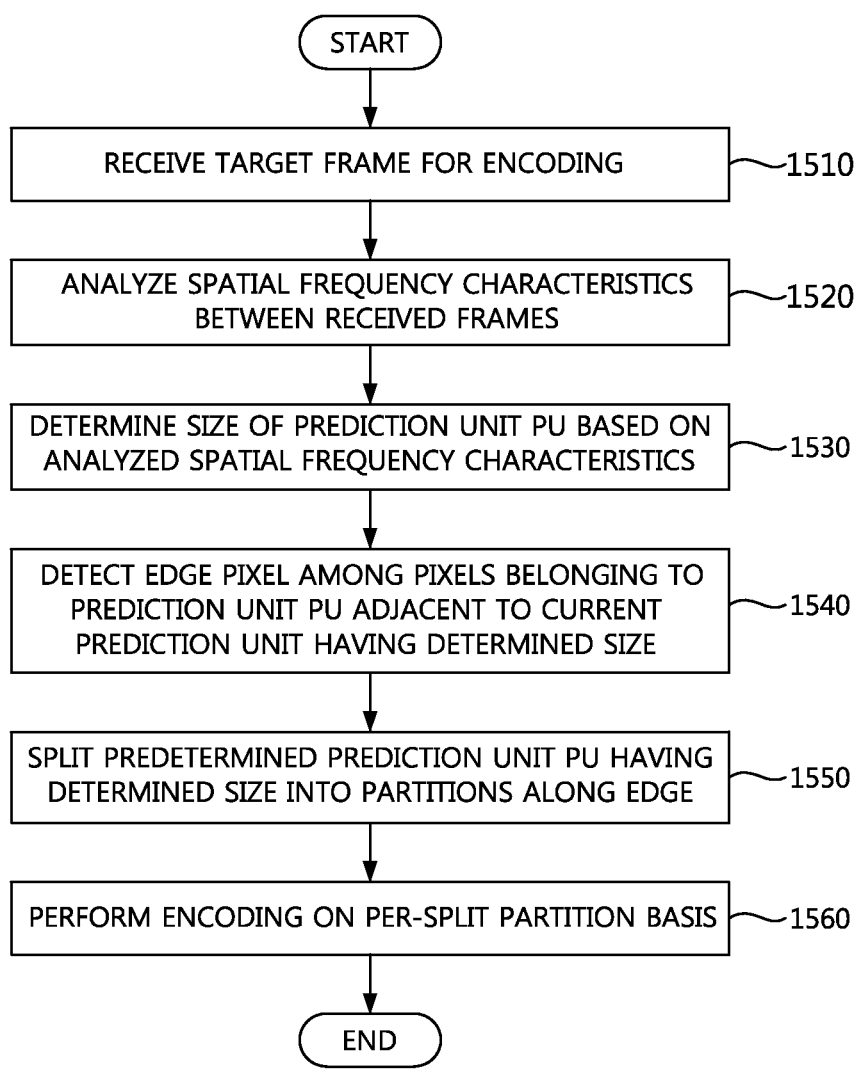
FIG. 15 is a flowchart illustrating an image encoding method according to another embodiment of the present invention.

FIG. 15 is a flowchart illustrating an image encoding method according to another embodiment. FIG. 15 illustrates a process in which after the size of the prediction unit PU is determined according to the image encoding method illustrated in FIG. 14, considering an edge included in the prediction unit PU having the determined size, the prediction unit PU is split to partitions, and for each partition, encoding is fulfilled.

Steps S1510 to S1530 in FIG. 15 are substantially the same as steps S1410 to S1430 in FIG. 14, and thus their description is not repeated.

Referring to FIG. 15, if the size of the prediction unit PU according to the spatial frequency characteristics is determined in steps S1510 to S1530, the encoding apparatus detects pixels belonging to the edge among pixels included in a prediction unit PU adjacent to the current prediction unit having the determined size (step S1540).

The detection of the pixels belonging to the edge in step S1540 may be performed by various known methods. For example, a difference value between the current prediction unit PU and its adjacent pixels may be calculated or an edge may be detected based on an edge detection algorithm, such as, e.g, sobel algorithm.

Thereafter, the encoding apparatus uses the pixels belonging to the detected edge to split the current prediction unit PU into partitions (step S1550).

As shown in FIG. 3, the encoding apparatus, to split the current prediction unit PU, may detect pixels belonging to the edge among pixels adjacent to edge pixels detected from pixels included in a surrounding block adjacent to the current prediction unit PU and may then do partitioning by using a line connecting the pixels adjacent to the detected edge with the edge pixels detected in step S1540.

Or, the encoding apparatus may split the current prediction unit PU by detecting pixels belonging to the edge among only pixels closest to the current prediction unit PU among pixels included in the block adjacent to the current prediction unit PU and then determining the direction of a line passing through the pixels included in the detected edge.

If the current prediction unit PU is split into at least one partition in step S1550 by the above-described method, the encoding apparatus performs encoding for each partition (step S360).

For example, the encoding apparatus performs motion prediction on each partition split in the current prediction unit PU having a size of 64×64 or 32×32 pixels to obtain a motion vector and performs motion compensation using the obtained motion vector to generate a prediction partition. Then the encoding apparatus conducts transform, quantization, and entropy encoding on a residue which is a difference between the generated prediction partition and the partition of the current prediction unit PU, and then transfers the result. Further, information on the size of the determined prediction unit PU, partition information, and information on the motion vector are subjected to entropy encoding and then transferred.

The edge-considered partitioning described in connection with FIG. 15 may apply to intra prediction described in connection with FIG. 13 as well as inter prediction.

Figure 16:
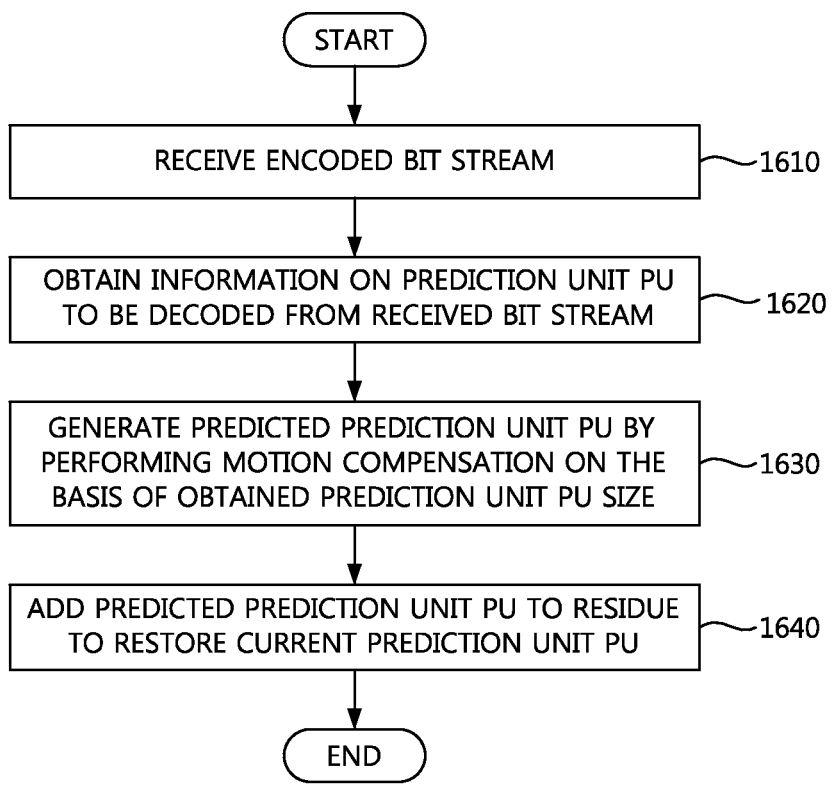
FIG. 16 is a flowchart illustrating an image decoding method according to an embodiment of the present invention.

FIG. 16 is a flowchart illustrating an image decoding method according to an embodiment of the present invention.

Referring to FIG. 16, the decoding apparatus first receives a bit stream from the encoding apparatus (step S1610).

Thereafter, the decoding apparatus performs entropy decoding on the received bit stream to obtain information on the current prediction unit PU to be decoded (step S1620). Here, instead of performing encoding and decoding using the extended macro-block and the size of the extended macro-block, the above-described recursive coding unit CU may be used to do encoding and decoding, in which case, the prediction unit PU information may include the size of the maximum coding unit LCU, the size of the minimum coding unit SCU, the maximally permissible level or level depth, and flag information. Simultaneously, the decoding apparatus obtains a motion vector for motion compensation. Here, the size of the prediction unit PU may be determined according to the temporal or spatial frequency characteristics in the encoding apparatus as illustrated in FIGS. 1 and 14—for example, the size may have 32×32 or 64×64 pixels. A decoding controller (not shown) receives from the encoding apparatus information on the size of the prediction unit PU applied by the encoding apparatus and conducts motion compensation decoding or inverse conversion or inverse quantization based on the size of the prediction unit applied by the encoding apparatus.

The decoding apparatus uses information on the size of the prediction unit PU (e.g., 32×32 or 64×64 pixels) and motion vector information as well as the previously restored picture to generate the predicted prediction unit PU for motion compensation (step S1630).

Then, the decoding apparatus adds the generated predicted prediction unit PU to the residue provided from the encoding apparatus to restore the current prediction unit PU (step S1640). Here, the decoding apparatus conducts entropy decoding, inverse quantization, and inverse transform on the bit stream provided from the encoding apparatus to obtain the residue. The inverse transform process may be also done on the basis of the prediction unit (PU) size (e.g., 32×32 or 64×64 pixels) obtained in step S1620.

Figure 17:
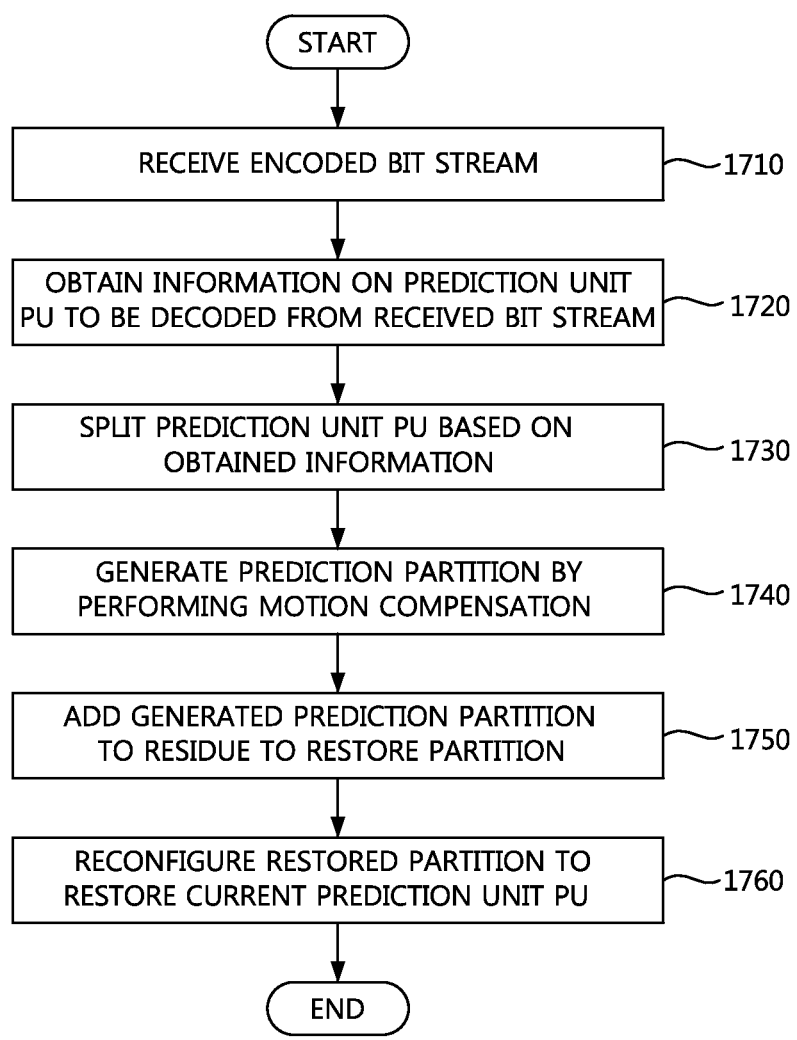
FIG. 17 is a flowchart illustrating an image decoding method according to another embodiment of the present invention.

FIG. 17 is a flowchart illustrating an image decoding method according to another embodiment of the present invention. FIG. 17 illustrates a process in which the macroblock, which has a size determined according to the temporal or spatial frequency characteristics in the image encoding apparatus, is split along the edge thereby decoding the encoded image for each split partition.

Referring to FIG. 17, the decoding apparatus receives a bit stream from the encoding apparatus (step S1710).

Thereafter, the decoding apparatus performs entropy decoding on the received bit stream to obtain the current prediction unit PU information to be decoded and the partition information of the current prediction unit PU (step S1720). The size of the current prediction unit PU may be 32×32 or 64×64 pixels. Simultaneously, the decoding apparatus obtains a motion vector for motion compensation. In the case that, instead of using the extended macro-block and the size of the extended macro-block to perform encoding and decoding, the recursive coding unit CU is used to do encoding and decoding, the prediction unit PU information may include the size of the maximum coding unit LCU, the size of the minimum coding unit SCU, the maximum permissible level or level depth, and flag information. The partition information may include partition information transmitted to the decoder in the case of asymmetric partitioning, geometrical partitioning, and partitioning along the direction of the edge (shortly, referred to as "edge-directional partitioning").

Next, the decoding apparatus uses the obtained prediction unit PU information and the partition information to partition the prediction unit PU (step S1730).

Further, the decoding apparatus generates a prediction partition using the partition information, the motion vector information, and the previously restored picture (step S1740) and adds the generated prediction partition to the residue provided from the encoding apparatus, thereby restoring the current partition (step S1750). Here, the decoding apparatus may obtain the residue by performing entropy decoding, inverse quantization, and inverse transform on the bit stream provided from the encoding apparatus.

Thereafter, the decoding apparatus restores all the partitions included in the block based on the obtained partition information and reconfigures the restored partitions, then restoring the current macro-block (step S1760).

Figure 18:
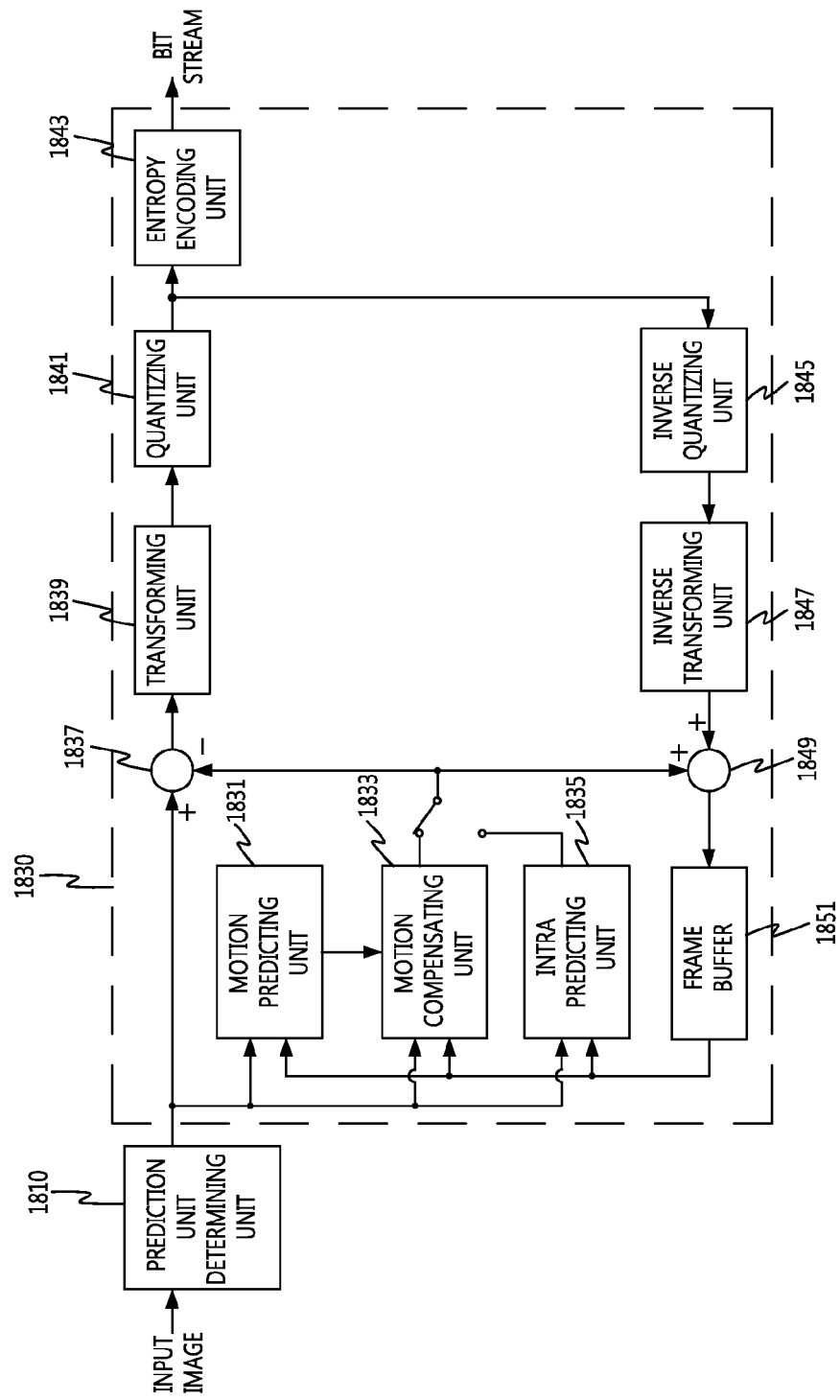
FIG. 18 is a block diagram illustrating a configuration of an image encoding apparatus according to an embodiment of the present invention.

FIG. 18 is a block diagram illustrating a configuration of an image encoding apparatus according to an embodiment of the present invention.

Referring to FIG. 18, the image encoding apparatus may include a prediction unit determining unit 1810 and an encoder 1830. The encoder 1830 may include a motion predicting unit 1831, a motion compensating unit 1833, an intra predicting unit 1835, a subtractor 1837, a transforming unit 1839, a quantizing unit 1841, an entropy encoding unit 1843, an inverse quantizing unit 1845, an inverse transforming unit 1847, an adder 1849, and a frame buffer 1851. The prediction unit determining unit 1810 may be performed in an encoding controller (not shown) that determines the size of the prediction unit applying to inter and intra prediction or may be performed in a separate block outside the encoder. Hereinafter, an example is described in which the prediction unit determining unit 1810 is performed in a separate block outside the encoder.

The prediction unit determining unit 1810 receives a provided input image and stores the image in a buffer (not shown) included in the prediction unit determining unit 1810, then analyzing the temporal frequency characteristics of the stored frame. The buffer may store a predetermined number of frames. For example, the buffer may store at least four (n−3th, n−2th, n−1th, and nth) frames.

The prediction unit determining unit 1810 may detect a variance between the n−3th frame (or picture) and the n−2th frame (or picture), a variance between the n−2th frame (or picture) and the n−1th frame (or picture), and a variance between the n−1th frame (or picture) and the nth frame (or picture) to analyze the temporal frequency characteristics between frames (or pictures) and may compare the analyzed temporal frequency characteristics with a preset threshold value, and based on a result of the comparison, may determine the size of the prediction unit to be encoded.

Here, the prediction unit determining unit 1810 may determine the size of the prediction unit based on a variance between two temporally adjacent frames (for example, n−1th and nth frames) among the frames stored in the buffer or may determine the size of the prediction unit based on characteristics of changes in a predetermined number of frames (for example, n−3th, n2-th, n−1th, and nth frames) to reduce overhead for information on the size of the prediction unit.

For example, the prediction unit determining unit 1810 analyzes the temporal frequency characteristics of the n−1th frame (or picture) and the nth frame (or picture), and if the analyzed temporal frequency characteristic value is less than a preset first threshold value, determines the size of the prediction unit as 64×64 pixels. If the analyzed temporal frequency characteristics value is equal to and more than the preset first threshold value and less than a second threshold value, the size of the prediction unit is determined as 32×32 pixels, and if the analyzed temporal frequency characteristics value is equal to or more than the preset second threshold value, the size of the prediction unit is determined as 16×16 pixels or less. Here, the first threshold value refers to a temporal frequency characteristics value when a variance between frames (or pictures) is smaller than the second threshold value.

The prediction unit determining unit 1810 provides the prediction unit information determined for inter or intra prediction to the entropy encoding unit 1843 and provides it to the encoder 1830 on the basis of the prediction unit having a determined size. Here, the prediction unit information may include information on the size of the prediction unit determined for inter or intra prediction. Specifically, in the case that encoding and decoding are performed using the extended macro-block and the size of the extended macro-block, the prediction block information may include information on the size of the macro-block or the extended macro-block. In the case that the above-mentioned recursive coding unit CU is used to perform encoding and decoding, the prediction unit information may include, instead of the information on the size of the macro-block, information on the size of the maximum coding unit LCU to be used for inter or intra prediction, that is, the size of the prediction unit, and further, the prediction unit information may include the size of the maximum coding unit LCU, the size of the minimum coding unit SCU, the maximum permissible level or level depth, and flag information.

The prediction unit determining unit 1810 may determine the size of the prediction unit by analyzing the temporal frequency characteristics of the provided input frame (or picture) as described above. Also, the prediction unit determining unit 1810 may determine the size of the prediction unit by analyzing the spatial frequency characteristics of the provided input frame (or picture). For example, in the case that the input frame (or picture) has high uniformity or homogeneity, the size of the prediction unit may be set to be large, for example, to 32×32 pixels or more, and in the case that the input frame (or picture) has low uniformity or homogeneity (that is, when spatial frequency is high), the size of the prediction unit may be set to be small, for example, to 16×16 pixels or less.

The encoder 1830 performs encoding on the prediction unit having the size determined by the prediction unit determining unit 1810.

Specifically, the motion predicting unit 1831 predicts motion by comparing the provided current prediction unit with the previous reference frame which has been encoded and stored in the frame buffer 1851, thereby generating a motion vector.

The motion compensating unit 1833 generates a predicted prediction block or prediction unit using the reference frame and the motion vector provided from the motion predicting unit 1831.

The intra predicting unit 1835 uses a pixel correlation between blocks to perform intra-prediction encoding. The intra predicting unit 1835 performs intra prediction that seeks the prediction block of the current prediction unit by predicting a pixel value from previously encoded pixels of the block in the current frame (or picture).

The subtractor 1837 performs subtraction between the predicted prediction unit provided from the motion compensating unit 1833 and the current prediction unit to generate a residue, and the transforming unit 1839 and the quantizing unit 1841 respectively perform DCT (Discrete Cosine Transform) and quantization on the residue. Here, the transforming unit 1839 may perform transform based on the prediction unit size information provided from the prediction unit determining unit 1810. For example, the transforming unit 1839 may conduct transform to a size of 32×32 or 64×64 pixels. Or, the transforming unit 1839 may perform transform on the basis of a separate transform unit TU independently from the prediction unit size information provided from the prediction unit determining unit 1810. For example, the transform unit TU size may have the minimum of 4×4 pixels to the maximum of 64×64 pixels. Or, the maximum size of the transform unit TU may be more than 64×64 pixels—for example, 128×128 pixels. The transform unit size information may be included in the transform unit information and transferred to the decoder.

The entropy encoding unit 1843 performs entropy encoding on header information including quantized DCT coefficients, motion vector, determined prediction unit information, partition information, and transform unit information, thereby generating a bit stream.

The inverse quantizing unit 1845 and the inverse transforming unit 1847 respectively perform inverse quantization and inverse transform on the data quantized by the quantizing unit 1841. The adder 1849 adds the inverse transformed data to the predicted prediction unit provided from the motion compensating unit 1833 to restore the image and provides the restored image to the frame buffer 1851, so that the frame buffer 1851 stores the stored image.

Figure 19:
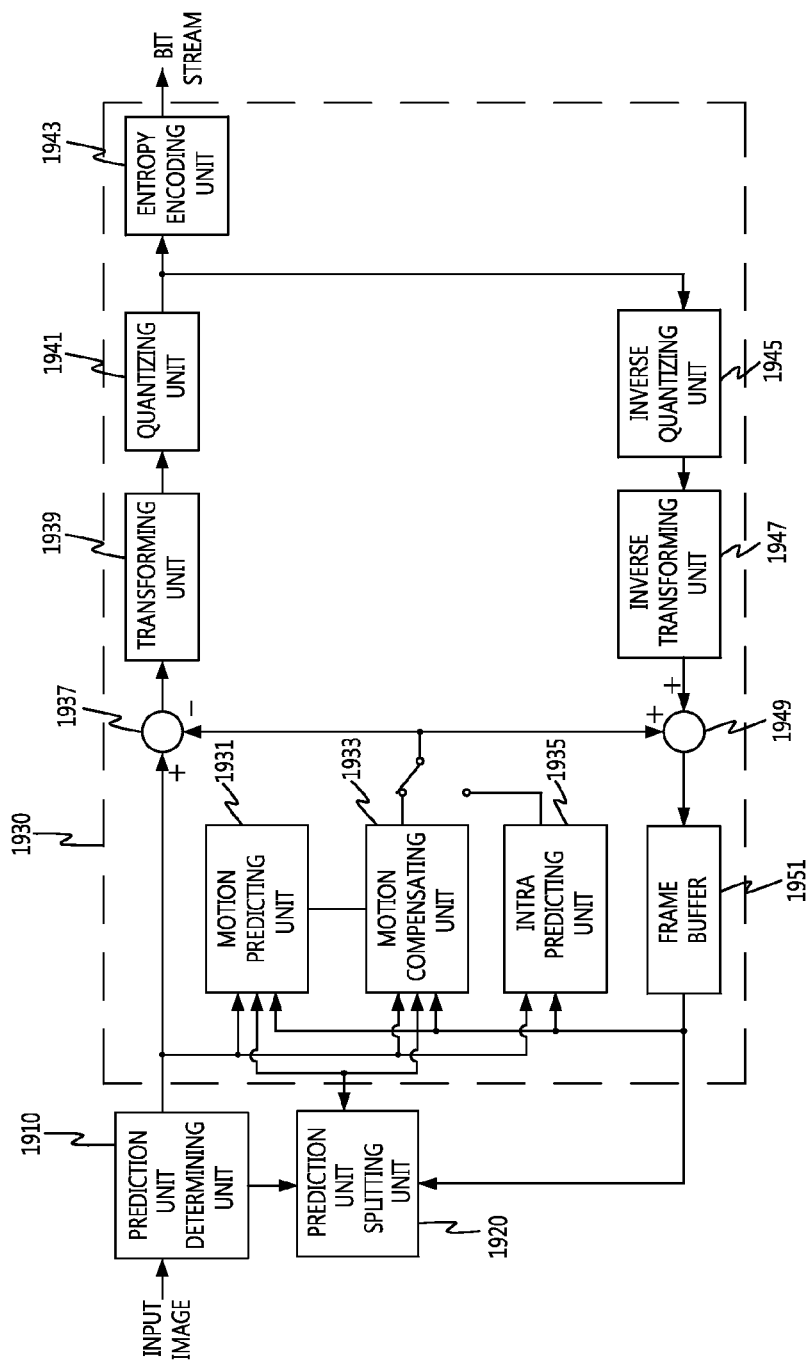
FIG. 19 is a block diagram illustrating a configuration of an image encoding apparatus according to another embodiment of the present invention.

FIG. 19 is a block diagram illustrating a configuration of an image encoding apparatus according to another embodiment of the present invention.

Refer to FIG. 19, the image encoding apparatus may include a prediction unit determining unit 1910, a prediction unit splitting unit 1920, and an encoder 1930. The encoder 1930 may include a motion predicting unit 1931, a motion compensating unit 1933, and intra predicting unit 1935, a subtractor 1937, a transforming unit 1939, a quantizing unit 1941, an entropy encoding unit 1943, an inverse quantizing unit 1945, an inverse transforming unit 1947, an adder 1949, and a frame buffer 1951. Here, the prediction unit determining unit or prediction unit splitting unit used for encoding may be performed in an encoding controller (not shown) for determining the size of the prediction unit applying to inter or intra prediction or may be performed in a separate block outside the encoder as shown. Hereinafter, an example is described in which the prediction unit determining unit or prediction unit splitting unit is performed in a separate block outside the encoder.

The prediction unit determining unit 1910 conducts the same functions as the corresponding component shown in FIG. 18 and thus its detailed description is not repeated.

The prediction unit splitting unit 1920 splits the current prediction unit provided from the prediction unit determining unit 1910 into partitions in consideration of an edge included in blocks adjacent to the current prediction unit and provides the split partitions and partition information to the encoder 1930. The partition information may include partition information for each of asymmetric partitioning, geometrical partitioning, and edge-directional partitioning.

Specifically, the prediction unit splitting unit 1920 reads out of the frame buffer 1951 a prediction unit adjacent to the current prediction unit provided from the prediction unit determining unit 1910, detects, among pixels belonging to the prediction unit adjacent to the current prediction unit, a pixel belonging to the edge (shortly referred to as "edge pixel"), and splits the current prediction unit into partitions using the detected edge pixel.

The prediction unit splitting unit 1920 may detect the edge by calculating difference values between the current prediction unit and its adjacent pixels or by using a known edge detection algorithm such as sobel algorithm.

To partition the current prediction unit as shown in FIG. 3, the prediction unit splitting unit 1920 detects the edge pixels from the pixels adjacent to the detected edge pixels among the pixels included in the block adjacent to the current prediction unit then may do partitioning using a line connecting the detected edge pixel with the pixel adjacent to the detected edge pixel.

Or, the prediction unit splitting unit 1920 may partition the current prediction unit by detecting edge pixels among pixels closest to the current prediction unit, which are included in the block adjacent to the current prediction unit, followed by determining the di reaction of a line passing through the edge pixels. Here, the direction of the line passing through the edge pixels may use one of 4×4 block intra prediction modes according to H.264 standards.

The prediction unit splitting unit 1920, after splitting the current prediction unit into at least one partition, provides the split partition to the motion predicting unit 1931 of the encoder 1930. Further, the prediction unit splitting unit 1920 provides partition information of the prediction unit to the entropy encoding unit 1943.

The encoder 1930 performs encoding on the partition provided from the prediction unit splitting unit 1920.

Specifically, the motion predicting unit 1931 compares the currently provided partition with a previous reference frame which has been encoded and stored in the frame buffer 1951, predicting its motion, thereby to generate a motion vector, and the motion compensating unit 1933 generates a prediction partition using the reference frame and the motion vector provided from the motion predicting unit 1931.

The intra predicting unit 1935 performs intra prediction using a pixel correlation between blocks. The intra predicting unit 1935 performs intra prediction that seeks the prediction block of the current prediction unit by predicting a pixel value from an encoded pixel value in the block in the current frame.

The subtractor 1937 performs subtraction between the prediction partition provided from the motion compensating unit 1933 and the current partition to generate a residue, and the transforming unit 1939 and the quantizing unit 1941 respectively perform DCT (Discrete Cosine Transform) and quantization on the residue. The entropy encoding unit 1943 performs entropy encoding on header information such as quantized DCT coefficients, motion vector, determined prediction unit information, prediction unit partition information, or transform unit information, thereby generating a bit stream.

The inverse quantizing unit 1945 and the inverse transforming unit 1947 respectively perform inverse quantization and inverse transform on the data quantized by the quantizing unit 1941. The adder 1949 adds the inverse transformed data to the prediction partition provided from the motion compensating unit 1933 to restore the image and provides the restored image to the frame buffer 1951, so that the frame buffer 1951 stores the restored image.

Figure 20:
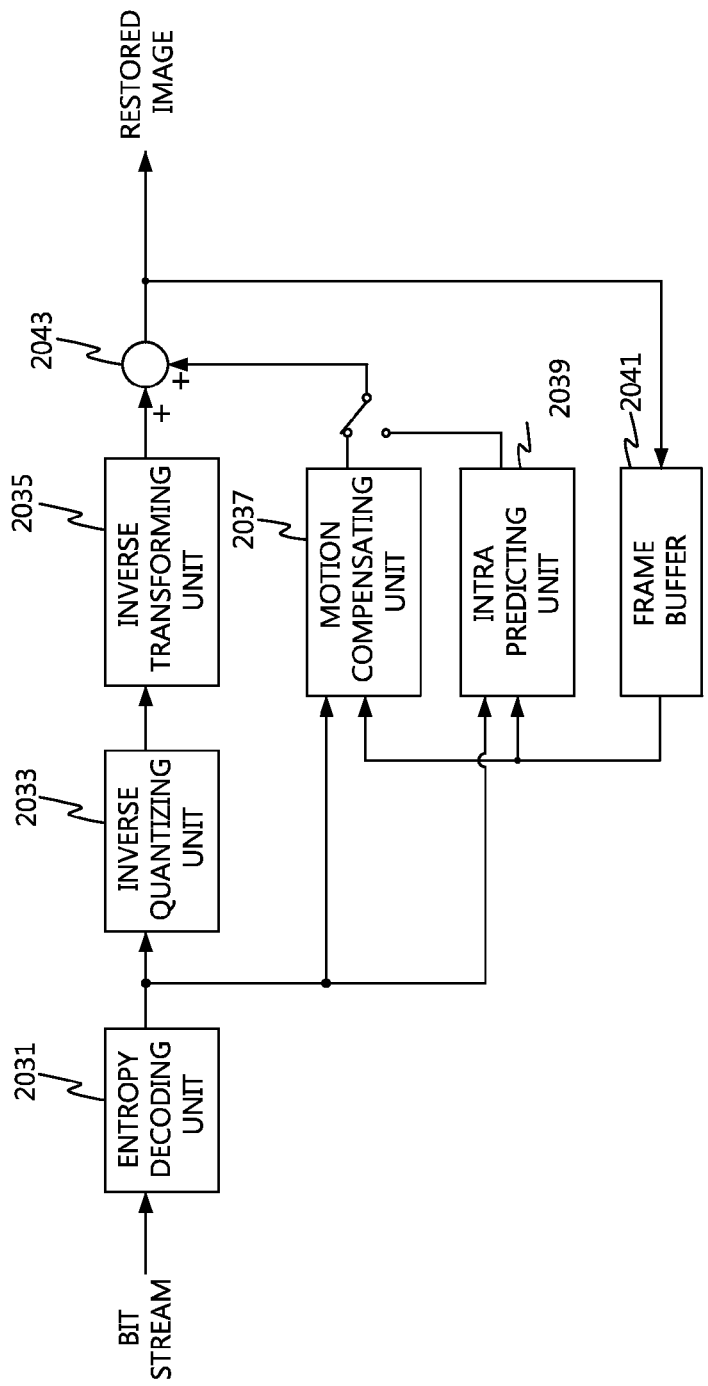
FIG. 20 is a block diagram illustrating a configuration of an image decoding apparatus according to an embodiment of the present invention.

FIG. 20 is a block diagram illustrating a configuration of an image decoding apparatus according to an embodiment of the present invention.

Referring to FIG. 20, the decoding apparatus includes an entropy decoding unit 2031, an inverse quantizing unit 2033, an inverse transforming unit 2035, a motion compensating unit 2037, an intra predicting unit 2039, a frame buffer 2041, and an adder 2043.

The entropy decoding unit 2031 receives a compressed bit stream and performs entropy decoding on the compressed bit stream thereby generating a quantized coefficient. The inverse quantizing unit 2033 and the inverse transforming unit 2035 respectively perform inverse quantization and inverse transform on the quantized coefficient to restore the residue.

The motion compensating unit 2037 performs motion compensation on the prediction unit having the same size of the encoded prediction unit PU using header information decoded from the bit stream by the entropy decoding unit 2031, thereby generating a predicted prediction unit. The decoded header information may include information on the prediction unit size which may be a size of the extended macro-block, such as, for example, 32×32, 64×64, or 128×128 pixels.

In other words, the motion compensating unit 2037 performs motion compensation on the prediction unit having the decoded prediction unit size to generate the predicted prediction unit.

The intra predicting unit 2039 uses a pixel correlation between blocks to perform intra-prediction encoding. The intra predicting unit 2039 performs intra prediction that seeks the prediction block of the current prediction unit by predicting a pixel value from the encoded pixel value in the block in the current frame (or picture).

The adder 2043 adds the residue provided from the inverse transforming unit 2035 to the predicted prediction unit provided from the motion compensating unit 2037 to restore the image and provides the restored image to the frame buffer 2041, so that the frame buffer 2041 stores the restored image.

Figure 21:
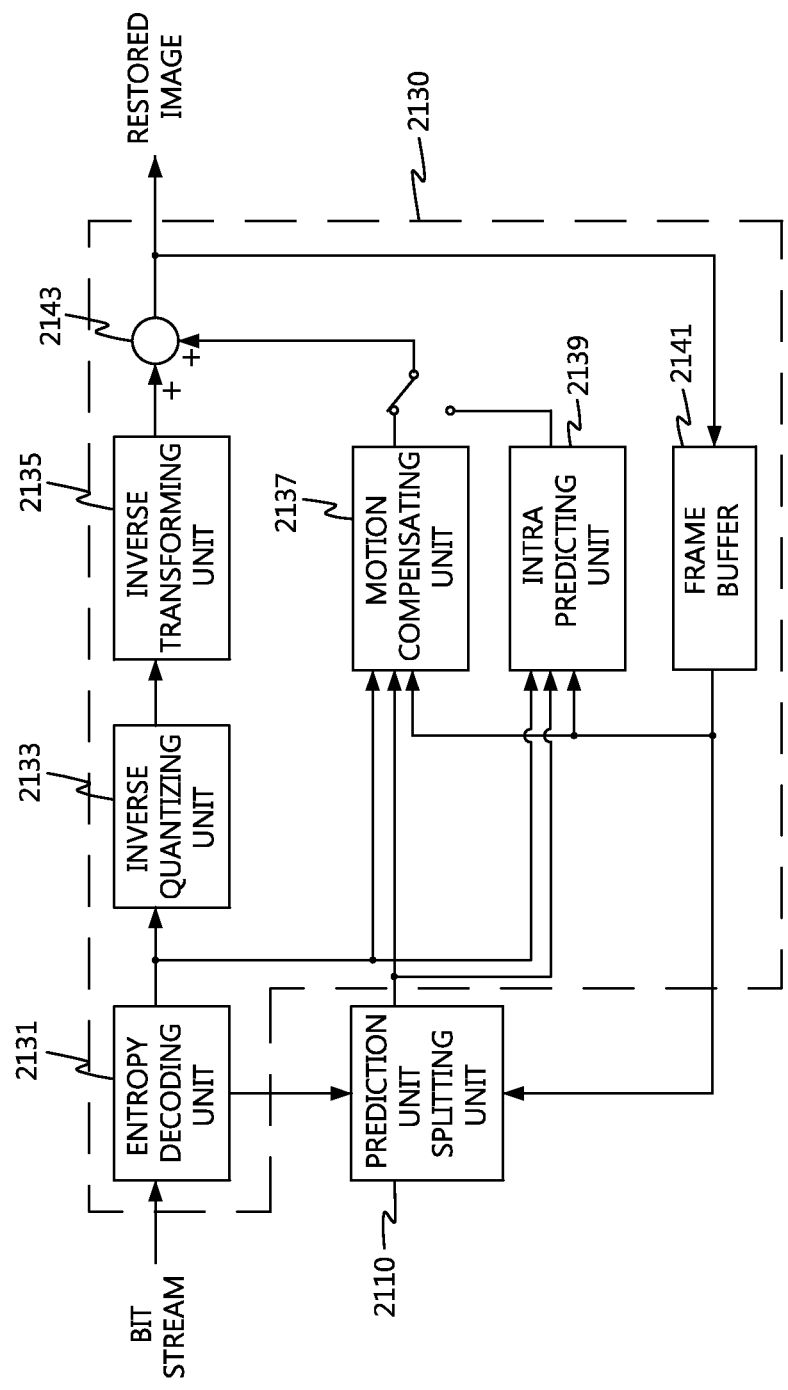
FIG. 21 is a block diagram illustrating a configuration of an image decoding apparatus according to another embodiment of the present invention.

FIG. 21 is a block diagram illustrating a configuration of an image decoding apparatus according to another embodiment of the present invention.

Referring to FIG. 21, the decoding apparatus includes a prediction unit splitting unit 2110 and a decoder 2130, the decoder 2130 including an entropy decoding unit 2131, an inverse quantizing unit 2133, an inverse transforming unit 2135, a motion compensating unit 2137, an intra predicting unit 2139, a frame buffer 2141, and an adder 2143.

The prediction unit splitting unit 2110 obtains header information in which the bit stream has been decoded by the entropy decoding unit 2131 and extracts the prediction unit information and partition information from the obtained header information. Here, the partition information may include information on a line splitting the prediction unit. For example, the partition information may include partition information for each of asymmetric partitioning, geometrical partitioning, and edge-directional partitioning.

Thereafter, the prediction unit splitting unit 2110 uses the extracted partition information to split the prediction unit of the reference frame stored in the frame buffer 2141 into partitions and provided the split partitions to the motion compensating unit 2137.

Here, the prediction unit splitting unit used for decoding may be performed in a decoding controller (not shown) for determining the size of the prediction unit applying to inter or intra prediction or may be performed in a separate block outside the decoder as shown. Hereinafter, an example is described in which the prediction unit splitting unit is performed in a separate block outside the decoder.

The motion compensating unit 2137 performs motion compensation on the partition provided from the prediction unit splitting unit 2110 by using motion vector information included in the decoded header information, thereby generating a prediction partition.

The inverse quantizing unit 2133 and the inverse transforming unit 2135 respectively perform inverse quantization and inverse transform on the coefficient entropy-decoded by the entropy decoding unit 2131 to generate a residue, and the adder 2143 adds the prediction partition provided from the motion compensating unit 2137 to the residue to restore the image, which is then stored in the frame buffer 2141.

In FIG. 21, the size of the decoded macro-block may be, e.g., 32×32, 64×64, or 128×128 pixels, and the prediction unit splitting unit 2110 may perform partitioning based on partition information obtained by extracting from the header information the macro-block having a size of 32×32, 64×64, or 128×128 pixels.

Figure 22:
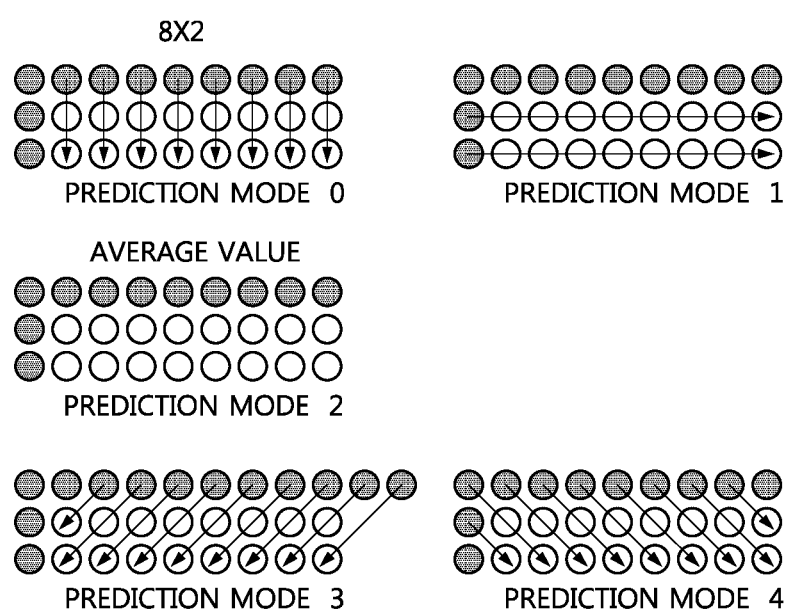
FIG. 22 is a conceptual view illustrating an intra-prediction encoding method using an asymmetrical pixel block according to an embodiment of the present invention.

FIG. 22 is a conceptual view illustrating an intra-prediction encoding method using an asymmetric pixel block according to an embodiment of the present invention.

Figure 23:
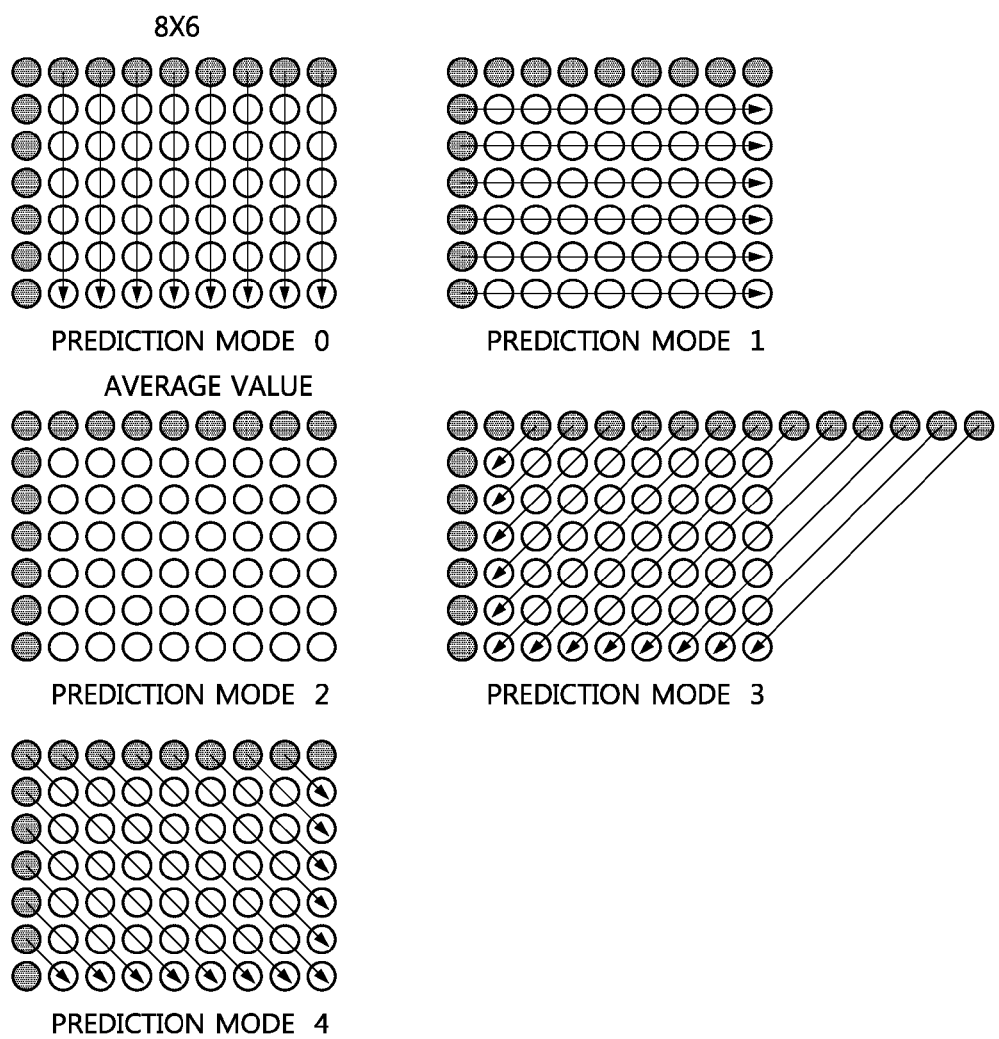
Figure 24:
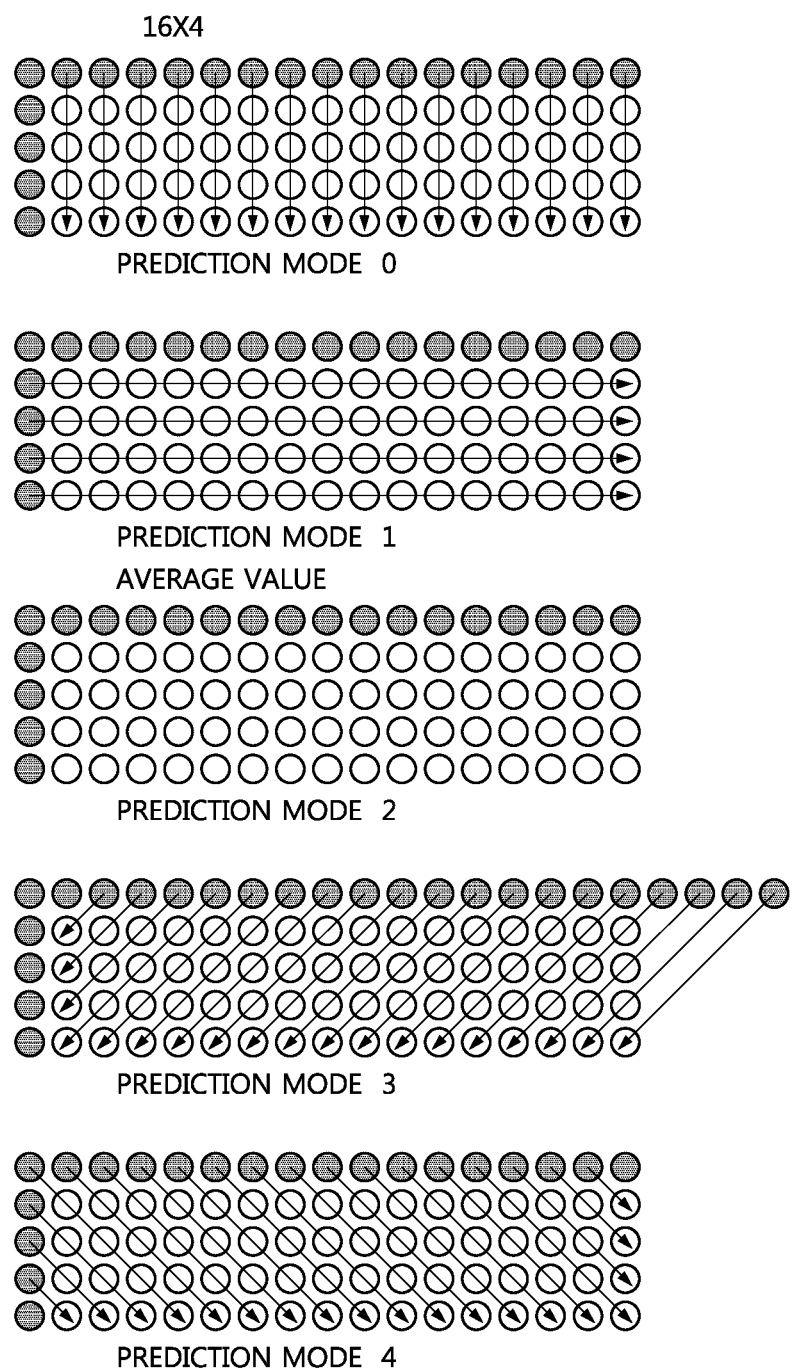

FIGS. 23 to 25 are conceptual views illustrating an intra-prediction encoding method using an asymmetric pixel block according to another embodiment of the present invention. FIGS. 22 to 25 illustrate an example of intra prediction when the asymmetric partitioning described in connection with FIGS. 2 to 6 is used. However, the present invention is not limited thereto. The intra-prediction encoding method illustrated in FIGS. 23 to 25 may also apply to when various types of asymmetric partitioning illustrated in FIGS. 2 to 6 are used.

FIG. 22 is a view for describing a prediction mode to perform intra prediction on partition P11$d$ having a size of 8×2 obtained by performing asymmetric partitioning on the prediction unit PU whose size is 8×8 in a horizontal direction.

Referring to FIG. 22, a pixel value in partition P11$d$ having a size of 8×2 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P11$d$ having a size of 8×2, the pixel value positioned along the vertical direction in the previously encoded upper block is used.

In the case of prediction mode 1, as the prediction pixel value in the partition P11$d$ having a size of 8×2, the pixel value positioned along the horizontal direction in the previously encoded left block is used.

In the case of prediction mode 2, as the prediction pixel value in the partition P11$d$ having a size of 8×2, the average value of the pixels in the previously encoded left and upper blocks is used.

In the case of prediction mode 3, as the prediction pixel value in the partition P11$d$ having a size of 8×2, the pixel value positioned along the diagonal down-right direction in the previously encoded upper block is used. In the case of prediction mode 3, when the pixel in the upper block of the partition P11$d$ is not sufficient, two pixels in the upper and right block may be used to make it up.

In the case of prediction mode 4, as the prediction pixel value in the partition P11*d* having a size of 8×2, the pixel value positioned along the diagonal down-left direction in the previously encoded left and upper block is used.

FIG. 23 illustrates a prediction mode for performing intra prediction on partition P21*d* having a size of 8×6 obtained by performing asymmetric partitioning on the prediction unit PU whose size is 8×8 in the horizontal direction.

Referring to FIG. 23, a pixel value in partition P21*d* having a size of 8×6 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P21*d* having a size of 8×6, the pixel value positioned along the vertical direction in the previously encoded upper block is used.

In the case of prediction mode 1, as the prediction pixel value in the partition P21*d* having a size of 8×6, the pixel value positioned along the horizontal direction in the previously encoded left block is used.

In the case of prediction mode 2, as the prediction pixel value in the partition P21*d* having a size of 8×6, the average value of the pixels in the previously encoded left and upper blocks is used.

In the case of prediction mode 3, as the prediction pixel value in the partition P21*d* having a size of 8×6, the pixel value positioned along the diagonal down-right direction in the previously encoded upper block is used. In the case of prediction mode 3, when the pixel in the upper block of the partition P21*d* is not sufficient, six pixels in the upper and right block may be used to make it up.

In the case of prediction mode 4, as the prediction pixel value in the partition P21*d* having a size of 8×6, the pixel value positioned along the diagonal down-left direction in the previously encoded left and upper block is used.

FIG. 24 illustrates a prediction mode for performing intra prediction on partition P11*c* having a size of 16×4 obtained by performing asymmetric partitioning on the prediction unit PU whose size is 16×16 in the horizontal direction.

Referring to FIG. 24, a pixel value in partition P11*c* having a size of 16×4 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P11*c* having a size of 16×4, the pixel value positioned along the vertical direction in the previously encoded upper block is used.

In the case of prediction mode 1, as the prediction pixel value in the partition P11*c* having a size of 16×4, the pixel value positioned along the horizontal direction in the previously encoded left block is used.

In the case of prediction mode 2, as the prediction pixel value in the partition P11*c* having a size of 16×4, the average value of the pixels in the previously encoded left and upper blocks is used.

In the case of prediction mode 3, as the prediction pixel value in the partition P11*c* having a size of 16×4, the pixel value positioned along the diagonal down-right direction in the previously encoded upper block is used. In the case of prediction mode 3, when the pixel in the upper block of the partition P11*c* is not sufficient, four pixels in the upper and right block may be used to make it up.

In the case of prediction mode 4, as the prediction pixel value in the partition P11*c* having a size of 16×4, the pixel value positioned along the diagonal down-left direction in the previously encoded left and upper block is used.

FIG. 25 illustrates a prediction mode for performing intra prediction on partition P11*b* having a size of 32×8 obtained by performing asymmetric partitioning on the prediction unit PU whose size is 32×32 in the horizontal direction.

Referring to FIG. 24, a pixel value in partition P11*b* having a size of 32×8 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P11*b* having a size of 32×8, the pixel value positioned along the vertical direction in the previously encoded upper block is used.

In the case of prediction mode 1, as the prediction pixel value in the partition P11*b* having a size of 32×8, the pixel value positioned along the horizontal direction in the previously encoded left block is used.

In the case of prediction mode 2, as the prediction pixel value in the partition P11*b* having a size of 32×8, the average value of the pixels in the previously encoded left and upper blocks is used.

In the case of prediction mode 3, as the prediction pixel value in the partition P11*b* having a size of 32×8, the pixel value positioned along the diagonal down-right direction in the previously encoded upper block is used. In the case of prediction mode 3, when the pixel in the upper block of the partition P11*b* is not sufficient, eight pixels in the upper and right block may be used to make it up.

In the case of prediction mode 4, as the prediction pixel value in the partition P11*b* having a size of 32×8, the pixel value positioned along the diagonal down-left direction in the previously encoded left and upper block is used.

FIGS. 22 to 25 illustrate examples of using a predetermined number of prediction modes for each size of the prediction unit for the asymmetric partition block, and prediction modes along the other directions (not shown) for each prediction unit may also be used. For example, the intra prediction may be performed along lines formed at the same predetermined angle (e.g., 22.5° or 11.25°) all over the entire direction within 360° using pixel values in the previously encoded left and upper blocks. Or, any angle may be previously designated by the encoder so that the intra prediction may be performed along a line defined according to the designated angle. To designate the angle, for example, a slope with dx along the horizontal direction and dy along the vertical direction may be defined, and information on dx and dy may be transferred from the encoder to the decoder. Predetermined angle information may also be transferred from the encoder to the decoder.

Figure 26:
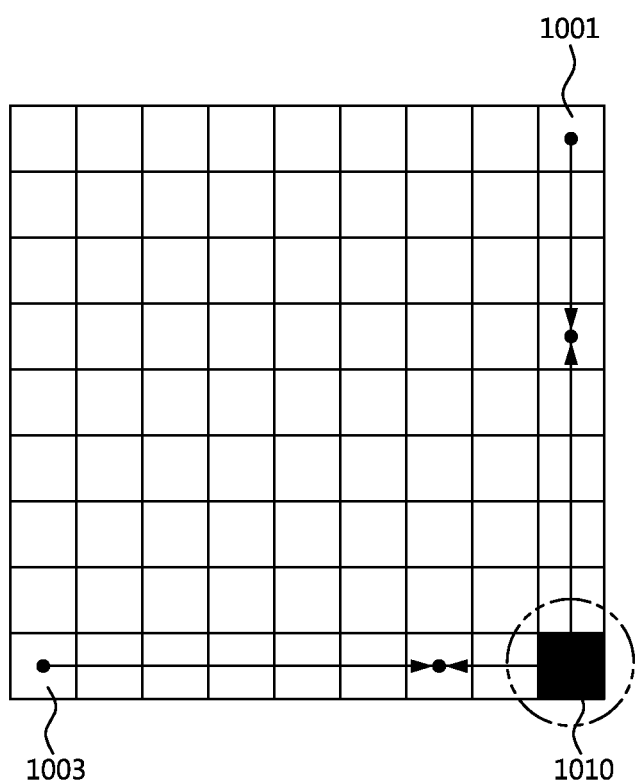
FIG. 26 is a conceptual view illustrating an intra-prediction encoding method based on planar prediction according to another embodiment of the present invention.

FIG. 26 is a concept view illustrating an intra-prediction encoding method based on planar prediction according to another embodiment of the present invention.

In the case that an extended macro-block having a size of 16×16 or more is used to encode a high-resolution image having a HD or higher resolution or the size of the prediction unit is increased to 8×8 or more, if the existing intra prediction mode applies to the rightmost and lowermost pixel value of the prediction unit, distortion is created by the prediction, thus rendering it difficult to smooth the image as a smooth one.

In such case, a separate planar mode may be defined, and when the planar mode flag is activated, the rightmost and lowermost pixel value of the prediction unit may be transferred from the encoder to the decoder. As shown in FIG. 26, the pixel value on the rightmost line may be obtained by linear interpolation using the rightmost and lowermost pixel 1010 and the rightmost and upper pixel 1001 which are transferred from the encoder. As shown in FIG. 26, the pixel value on the lowermost line may be obtained by linear interpolation using the rightmost and lowermost pixel 1010 and the leftmost and lowermost pixel 1003 which are transferred from the encoder.

Or, in the case that the planar mode flag is activated, as shown in FIG. 26, to obtain the prediction pixel value of the rightmost and lowermost pixel 1010 in the prediction unit, vertical- and horizontal-directionally corresponding pixel values 1001 and 1003 in the previously encoded left and upper blocks and/or vertical- and horizontal-directionally corresponding inner pixel values in the prediction block are used to conduct linear interpolation. Further, when the planar mode flag is activated, the prediction pixel value of the inner pixel in the prediction unit may be obtained by performing bilinear interpolation using vertical- and horizontal-directionally corresponding inner boundary pixel values in the prediction unit and/or vertical- and horizontal-directionally corresponding pixel values in the previously encoded left and upper blocks.

Figure 27:
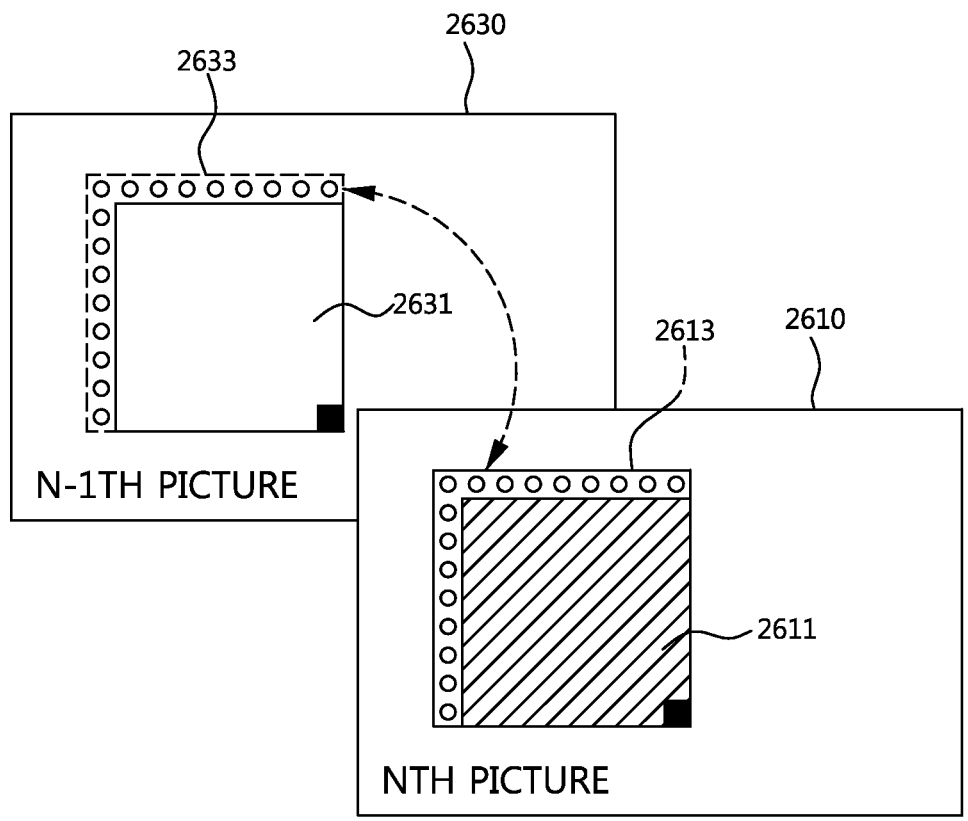
FIG. 27 is a conceptual view illustrating an intra-prediction encoding method based on planar prediction according to another embodiment of the present invention.

FIG. 27 is a conceptual view illustrating an intra-prediction encoding method based on planar prediction according to another embodiment of the present invention.

When the planar prediction mode flag is activated, as shown in FIG. 27, a reference prediction unit for a current prediction unit having a first size—for example, 8×8 pixels in FIG. 27—which is included in the Nth picture which is a current picture to be encoded is determined at the N−1th picture positioned temporarily before the Nth picture. To obtain the prediction pixel value of the rightmost and lowermost pixel in the current prediction unit, not only vertical- and horizontal-directionally corresponding pixel values in the previously encoded left and upper blocks 213, which are adjacent to the current prediction unit, but also vertical- and horizontal-directionally corresponding pixel values in the previously encoded left and upper blocks 233, which are adjacent to the corresponding prediction unit of the N−1th picture are used to calculate their average values or to perform linear interpolation.

Or, to obtain the prediction pixel value of the rightmost and lowermost pixel in the current prediction unit, vertical- and horizontal-directionally corresponding inner pixel values in the current prediction unit of the Nth picture, as well as vertical- and horizontal-directionally corresponding pixel values in the previously encoded left and upper blocks 213, which are adjacent to the current prediction unit, and vertical- and horizontal-directionally corresponding pixel values in the previously encoded left and upper blocks 233, which are adjacent to the corresponding prediction unit of the N−1th picture are used to calculate their average values or to perform linear interpolation.

Further, to obtain the prediction pixel value of the rightmost and lowermost pixel in the current prediction unit, vertical- and horizontal-directionally corresponding inner pixel values of the rightmost and lowermost pixel in the corresponding unit of the N−1th picture, as well as vertical- and horizontal-directionally corresponding inner pixel values in the current prediction unit of the Nth picture, vertical- and horizontal-directionally corresponding pixel values in the previously encoded left and upper blocks 213, which are adjacent to the current prediction unit, and vertical- and horizontal-directionally corresponding pixel values in the previously encoded left and upper blocks 233, which are adjacent to the corresponding prediction unit of the N−1th picture are used to calculate their average values or to perform linear interpolation.

Also, in the case that the planar prediction mode flag is activated, the prediction pixel value of the inner pixel in the prediction unit of the Nth picture may be obtained by performing bilinear interpolation using vertical- and horizontal-directionally corresponding inner boundary pixel values in the corresponding prediction unit of the N−1th picture, vertical- and horizontal-directionally corresponding pixel values in the previously encoded left and upper blocks in the corresponding prediction unit of the N−1th picture, vertical- and horizontal-directionally corresponding inner boundary pixel values in the current prediction unit of the Nth picture and/or vertical- and horizontal-directionally corresponding pixel values in the previously encoded left and upper blocks in the current prediction unit of the Nth picture.

Although FIG. 27 illustrates an example where intra prediction is conducted using the current prediction unit of the Nth picture and a corresponding prediction unit of the N−1th picture, the present invention is not limited thereto. For example, the intra prediction may also be performed using the current prediction unit of the Nth picture and a corresponding prediction unit of the N+1th picture, using the current prediction unit of the Nth picture and corresponding prediction units of the N−1th picture and the N+1th picture, or using the current prediction unit of the Nth picture and corresponding prediction units of the N−2th picture, N−1th picture, N+1th picture, and N+2th picture.

The current prediction unit having the second size may have a square shape with 8×8, 16×16, or 32×32 pixels or may have an asymmetric shape as illustrated in FIGS. 2 to 6. In the case that the current prediction unit has an asymmetric shape as illustrated in FIGS. 2 to 6, the embodiments described in connection with FIGS. 26 and 27 may apply in order to perform inter prediction.

Figure 28:
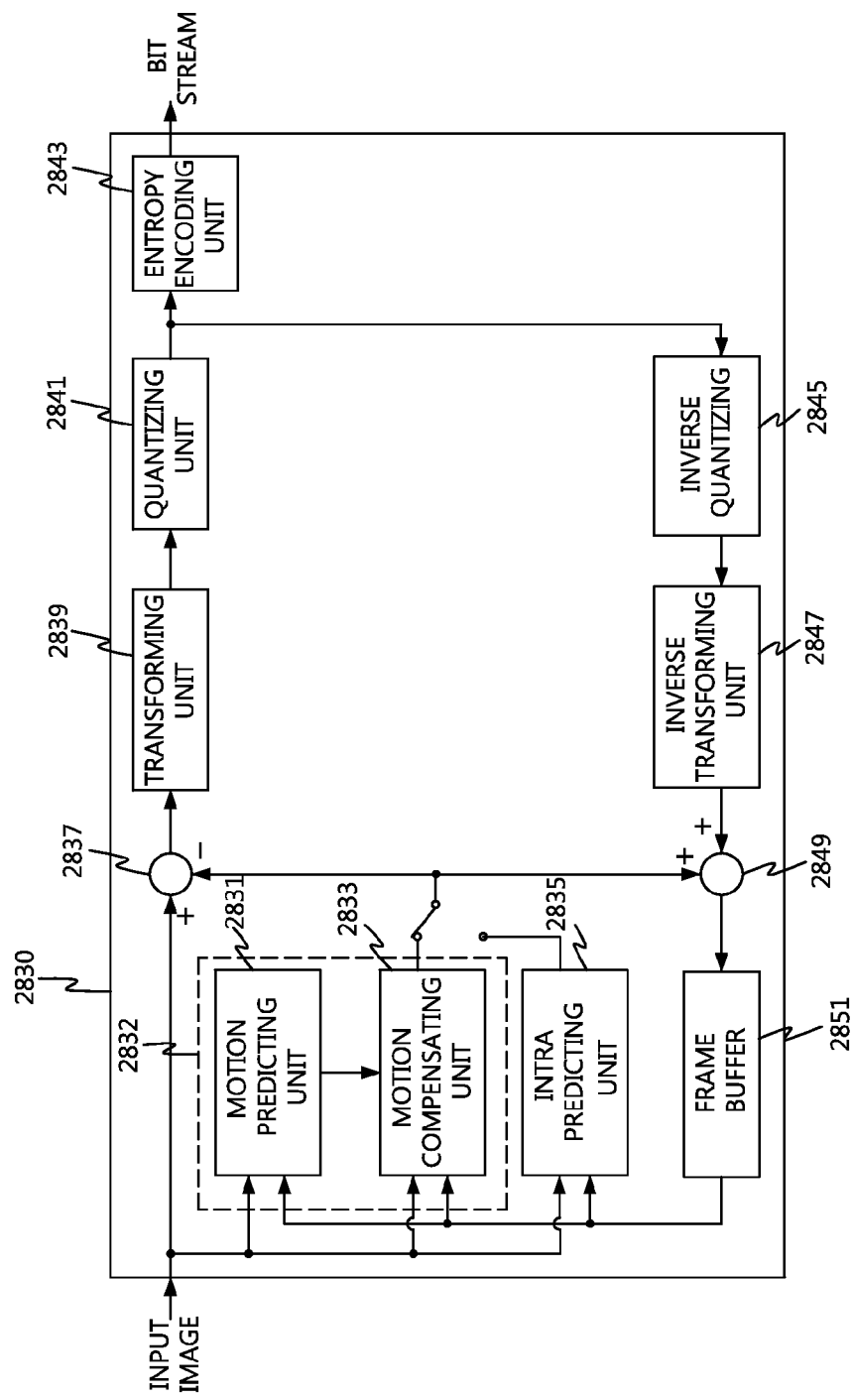
FIG. 28 is a block diagram illustrating a configuration of an image encoding apparatus performing intra-prediction encoding according to an embodiment of the present invention.

FIG. 28 is a block diagram illustrating a configuration of an image encoding apparatus to perform intra-prediction encoding according to an embodiment of the present invention.

Referring to FIG. 28, the image encoding apparatus includes an encoder 2830. The encoder 2830 includes an inter predicting unit 2832, an intra predicting unit 2835, a subtractor 2837, a transforming unit 2839, a quantizing unit 2841, an entropy encoding unit 2843, an inverse quantizing unit 2845, an inverse transforming unit 2847, an adder 2849, and a frame buffer 2851. The inter predicting unit 2832 includes a motion predicting unit 2831 and a motion compensating unit 2833.

The encoder 2830 performs encoding on an input image. The input image may be used on a per-prediction unit PU basis for inter prediction in the inter predicting unit 2832 or for intra prediction in the intra predicting unit 2835.

The size of the prediction unit applying to inter prediction or intra prediction may be determined according to temporal frequency characteristics of a frame (or picture) stored in a buffer (not shown) included in the encoder after the input image is stored in the buffer. For example, the prediction unit determining unit 2810 analyzes the temporal frequency characteristics of the n−1th frame (or picture) and the nth frame (or picture), and if the analyzed temporal frequency characteristics value is less than a preset first threshold value, determines the size of the prediction unit as 64×64 pixels. If the analyzed temporal frequency characteristics value is equal to and more than the preset first threshold value and less than a second threshold value, the size of the prediction unit is determined as 32×32 pixels, and if the analyzed temporal frequency characteristics value is equal to or more than the preset second threshold value, the size of the prediction unit is determined as 16×16 pixels or less. Here, the first threshold value refers to a temporal frequency characteristics value when a variance between frames (or pictures) is smaller than the second threshold value.

The size of the prediction unit applying to inter prediction or intra prediction may be determined according to spatial frequency characteristics of a frame (or picture) stored in a buffer (not shown) included in the encoder after the input image is stored in the buffer. For example, in the case that the input frame (or picture) has high uniformity or homogeneity, the size of the prediction unit may be set to be large, for example, to 32×32 pixels or more, and in the case that the input frame (or picture) has low uniformity or homogeneity (that is, when spatial frequency is high), the size of the prediction unit may be set to be small, for example, to 16×16 pixels or less.

Although not shown in FIG. 28, the operation of determining the size of the prediction unit may be performed by an encoding controller (not shown) receiving the input image or by a separate prediction unit determining unit (not shown) receiving the input image. For example, the size of the prediction unit may be 16×16, 32×32, or 64×64 pixels.

As described above, the prediction unit information including the size of the prediction unit determined for inter or intra prediction is provided to the entropy encoding unit 2843 and provided to the encoder 2830 on the basis of the prediction unit having the determined size. Specifically, in the case that encoding and decoding are performed using the extended macro-block and the size of the extended macro-block, the prediction block information may include information on the size of the macro-block or the extended macro-block. Here, the size of the extended macro-block refers to 32×32 pixels or more, including, for example, 32×32, 64×64, or 128×128 pixels. In the case that the above-mentioned recursive coding unit CU is used to perform encoding and decoding, the prediction unit information may include, instead of the information on the size of the macro-block, information on the size of the maximum coding unit LCU to be used for inter or intra prediction, that is, the size of the prediction unit, and further, the prediction unit information may include the size of the maximum coding unit LCU, the size of the minimum coding unit SCU, the maximum permissible level or level depth, and flag information.

The encoder 2830 performs encoding on the prediction unit having the determined size.

The inter predicting unit 2832 splits the prediction unit to be currently encoded by the above-described asymmetric partitioning or geometrical partitioning and performs motion estimation on a per-split partition basis to generate a motion vector.

The motion predicting unit 2831 splits the provided current prediction unit by various partitioning methods and searches a region similar to the partitioned block to be currently encoded in at least one reference picture (which is encoded and stored in the frame buffer 2851) positioned before and/or behind the currently encoded picture for each partitioned block, thereby generating a motion vector on a per-block basis. The size of the block used for motion estimation may vary, and according to an embodiment, when asymmetric partitioning or geometrical partitioning applies, the shape of the block may have not only the existing square shape but also geometrical shapes, such as a rectangular or other asymmetric shapes, an 'L' shape, or a triangular shape, as shown in FIGS. 2 to 9.

The motion compensating unit 2833 generates a prediction block (or predicted prediction unit) by performing motion compensation using the reference picture and the motion vector generated from the motion predicting unit 2831.

The inter predicting unit 2832 performs block merging on the block and obtains a motion parameter for each merged block. The obtained motion parameter is transferred to the decoder.

The intra predicting unit 2835 may perform intra-prediction encoding using a pixel correlation between blocks. The intra predicting unit 2835 performs intra prediction that seeks the prediction block of the current prediction unit by predicting a pixel value from previously encoded pixel values in the block of the current frame (or picture) according to various embodiments as described in connection with FIGS. 22 to 27.

The subtractor 2837 performs subtraction between the prediction block (or predicted prediction unit) provided from the motion compensating unit 2833 and the current block (or current prediction unit) to generate a residue, and the transforming unit 2839 and the quantizing unit 2841 respectively perform DCT (Discrete Cosine Transform) and quantization on the residue. Here, the transforming unit 2839 may perform transform based on the prediction unit size information provided from the prediction unit determining unit 1810. For example, the transforming unit 2839 may conduct transform to a size of 32×32 or 64×64 pixels. Or, the transforming unit 2839 may perform transform on the basis of a separate transform unit TU independently from the prediction unit size information provided from the prediction unit determining unit 2810. For example, the transform unit TU size may have the minimum of 4×4 pixels to the maximum of 64×64 pixels. Or, the maximum size of the transform unit TU may be more than 64×64 pixels—for example, 128×128 pixels. The transform unit size information may be included in the transform unit information and transferred to the decoder.

The entropy encoding unit 2843 performs entropy encoding on header information including quantized DCT coefficients, motion vector, determined prediction unit information, partition information, and transform unit information, thereby generating a bit stream.

The inverse quantizing unit 2845 and the inverse transforming unit 2847 respectively perform inverse quantization and inverse transform on the data quantized by the quantizing unit 2841. The adder 2849 adds the inverse transformed data to the predicted prediction unit provided from the motion compensating unit 2833 to restore the image and provides the restored image to the frame buffer 2851, so that the frame buffer 2851 stores the stored image.

Figure 29:
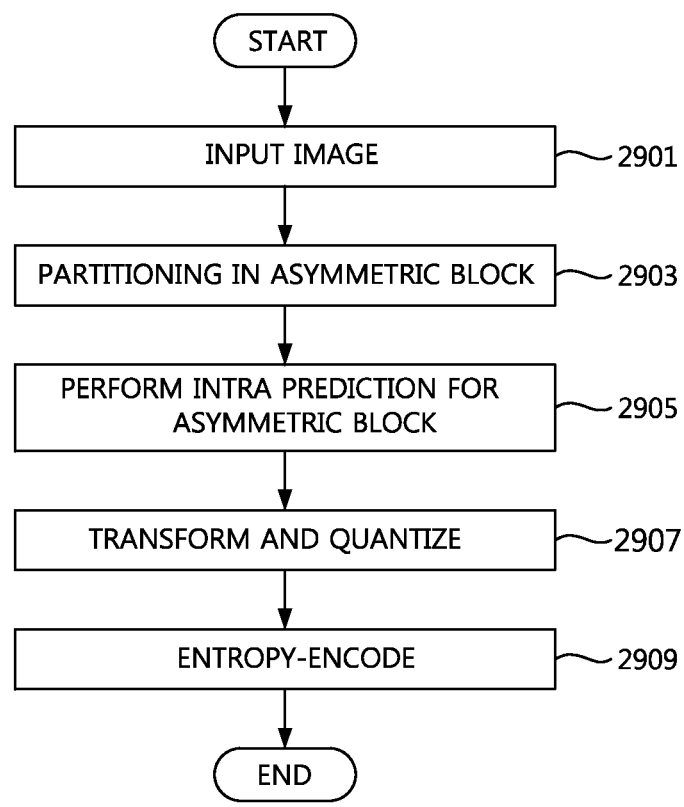
FIG. 29 is a flowchart illustrating an image encoding method applied with intra-prediction encoding according to an embodiment of the present invention.

FIG. 29 is a flowchart illustrating an image encoding method applied with intra-prediction encoding according to an embodiment of the present invention.

Referring to FIG. 29, when an image is input to the encoding apparatus (step S1401), for the input image, the prediction unit for inter or intra prediction is split by the above-described asymmetric or geometrical partitioning method (step S1403).

In the case that the intra prediction mode is activated, the partitioned asymmetric block or geometric block is applied with the intra prediction method described in connection with FIGS. 22 to 27, thereby performing intra prediction (step S1405).

Or, when the inter prediction mode is activated, the prediction block (or predicted prediction unit) is generated by searching a region similar to the partitioned block to be currently encoded in at least one reference picture (which is encoded and stored in the frame buffer 2851) positioned before and/or behind the currently encoded picture for each partitioned block, thereby generating a motion vector on a per-block basis, followed by performing motion compensation using the generated motion vector and picture.

Next, the encoding apparatus obtains a difference between the current prediction unit and the predicted (intra-predicted or inter-predicted) prediction unit to generate a residue, then performing transform and quantization on the generated residue (step S1407). Thereafter, the encoding apparatus entropy-encodes the header information including quantized DCT coefficients and motion parameter and generates a bit stream (step S1409).

Figure 30:
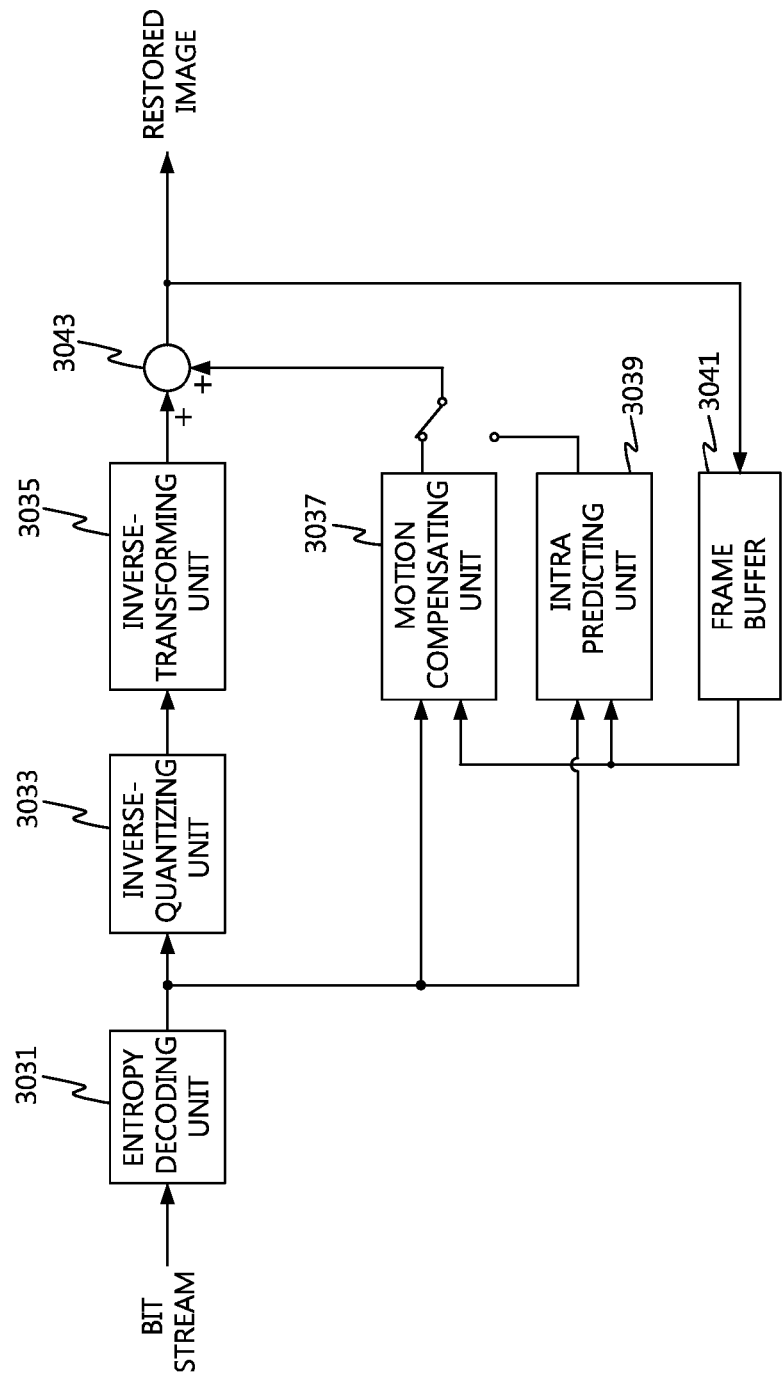
FIG. 30 is a block diagram illustrating a configuration of an image decoding apparatus according to an embodiment of the present invention.

FIG. 30 is a block diagram illustrating a configuration of an image decoding apparatus according to an embodiment of the present invention.

Referring to FIG. 30, the decoding apparatus includes an entropy decoding unit 731, an inverse quantizing unit 733, an inverse transforming unit 735, a motion compensating unit 737, an intra predicting unit 739, a frame buffer 741, and an adder 743.

The entropy decoding unit 731 receives a compressed bit stream and performs entropy decoding on the compressed bit stream thereby generating a quantized coefficient. The inverse quantizing unit 733 and the inverse transforming unit 735 respectively perform inverse quantization and inverse transform on the quantized coefficient to restore the residue.

The header information decoded by the entropy decoding unit 731 may include the prediction unit size information which may include, e.g., 16×16, 32×32, 64×64, or 128×128 pixels of the size of the extended macro-block. Further, the decoded header information includes the motion parameters for motion compensation and prediction. The motion parameter may include the motion parameter transmitted for each block merged by a block merging method according to an embodiment. The decoder header information also includes a flag indicating whether the planar mode is activated and the per-unit prediction mode information having the above-mentioned asymmetric shape.

The motion compensating unit 737 performs motion compensation, using the motion parameter, on the prediction unit having the same size as the prediction unit encoded based on the decoded header information from the bit stream by the entropy decoding unit 731, thereby generating the predicted prediction unit. The motion compensating unit 737 performs motion compensation using the motion parameter transmitted for each block merged by the block merging method according to an embodiment, thereby generating the predicted prediction unit.

The intra predicting unit 739 performs intra-prediction encoding using a pixel correlation between blocks. The intra predicting unit 739 may obtain the prediction pixel value of the current prediction unit by the intra-prediction encoding method described in connection with FIGS. 22 to 27.

The adder 743 adds the residue provided from the inverse transforming unit 735 to the predicted prediction unit provided from the motion compensating unit 737 or the intra predicting unit 739 to restore the image and provides the reside to the frame buffer 741 so that the frame buffer 741 stores the restored image.

Figure 31:
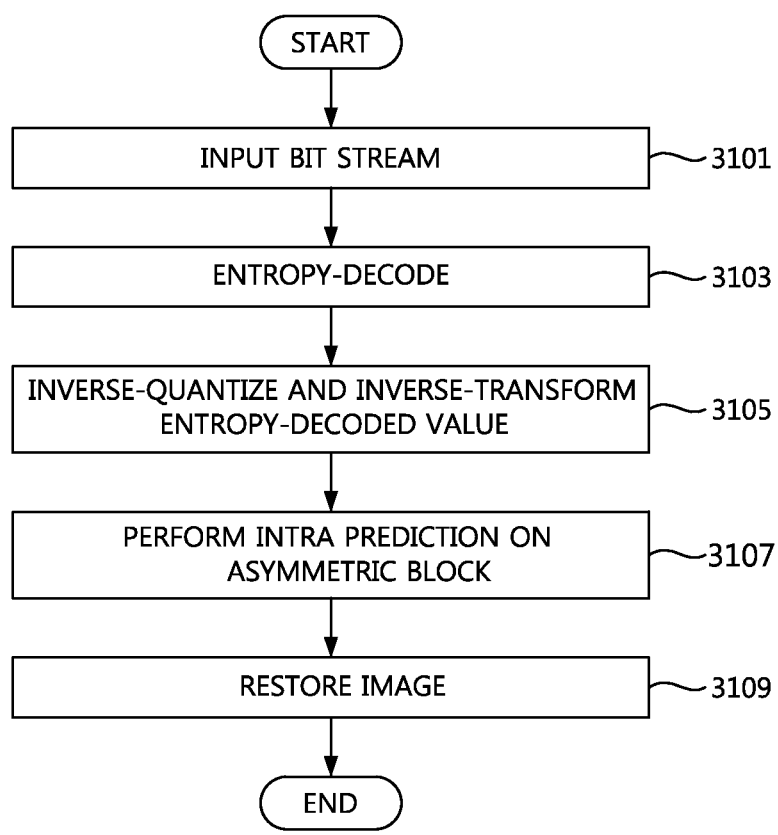
FIG. 31 is a flowchart illustrating an image decoding method according to an embodiment of the present invention.

FIG. 31 is a flowchart illustrating an image decoding method according to an embodiment of the present invention.

Referring to FIG. 31, the decoding apparatus receives the bit stream from the encoding apparatus (step S3101).

Thereafter, the decoding apparatus performs entropy decoding on the received bit stream (step S3103). The data decoded by entropy decoding includes the residue which refers to a difference between the current prediction unit and the predicted prediction unit. The header information decoded by the entropy decoding may include prediction unit information, motion parameters for motion compensation and prediction, a flag indicating whether planar prediction mode is activated, and asymmetric-type per-prediction unit prediction mode information. The prediction unit information may include prediction unit size information.

Here, in the case that, instead of performing encoding and decoding using the extended macro-block and the size of the extended macro-block, the above-mentioned recursive coding unit CU is used for encoding and decoding, the prediction unit PU information may include the sizes of the maximum coding unit LCU and minimum coding unit SCU, the maximum permissible level or level depth, and flag information.

A decoding controller (not shown) may receive from the encoding apparatus the prediction unit PU size information applied in the encoding apparatus and may perform to-be-described motion compensation decoding, intra-prediction encoding, inverse transform, or inverse quantization according to the size of the prediction unit PU applied in the encoding apparatus.

The decoding apparatus inverse-quantizes and inverse-transforms the entropy-encoded residue (step S3105). The inverse transform may be performed on the basis of the prediction unit size (for example, 32×32 or 64×64 pixels).

The decoding apparatus applies inter prediction or intra prediction method to the prediction unit having various shapes, such as the asymmetric or geometrical shapes described in connection with FIGS. 22 to 27, thereby generating the predicted prediction unit (step S3107).

The decoder adds the inverse-quantized, inverse-transformed residue to the prediction unit predicted through the inter or intra prediction, thereby restoring the image (step S3109).

Figure 32:
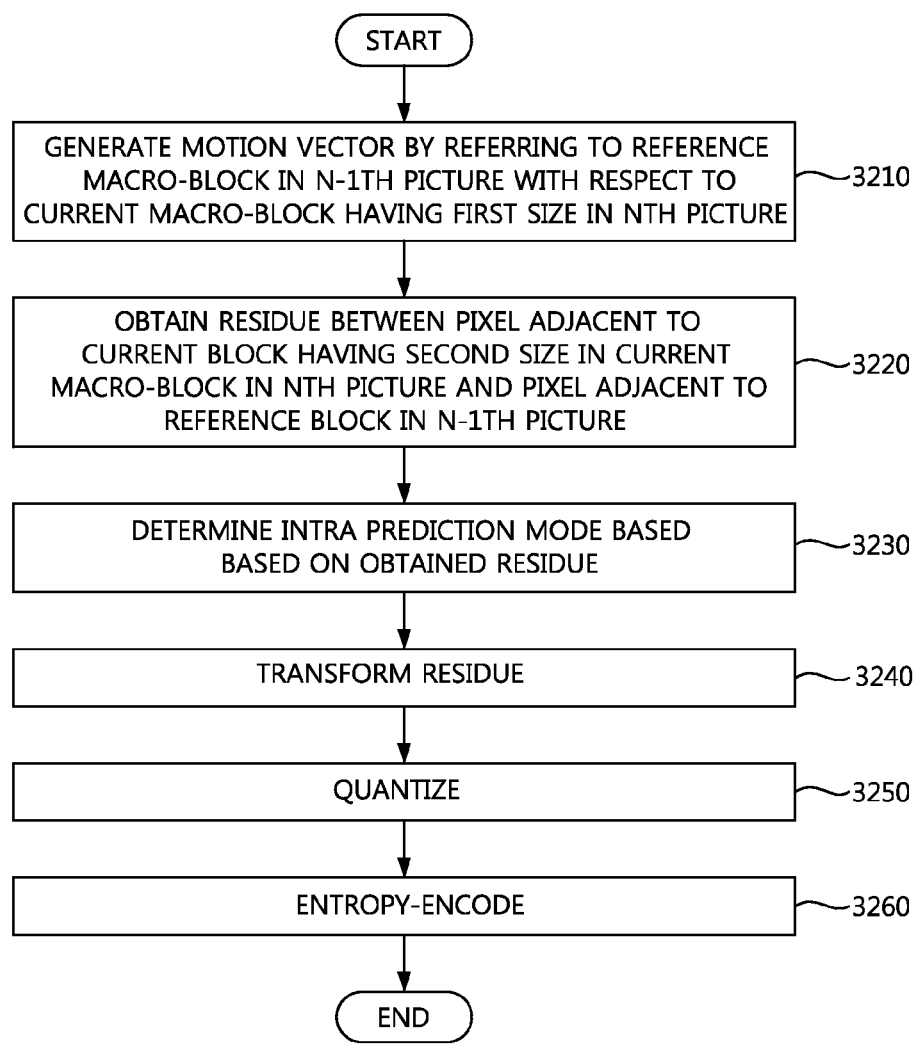
FIG. 32 is a flowchart illustrating an image encoding method according to an embodiment of the present invention.
Figure 33:
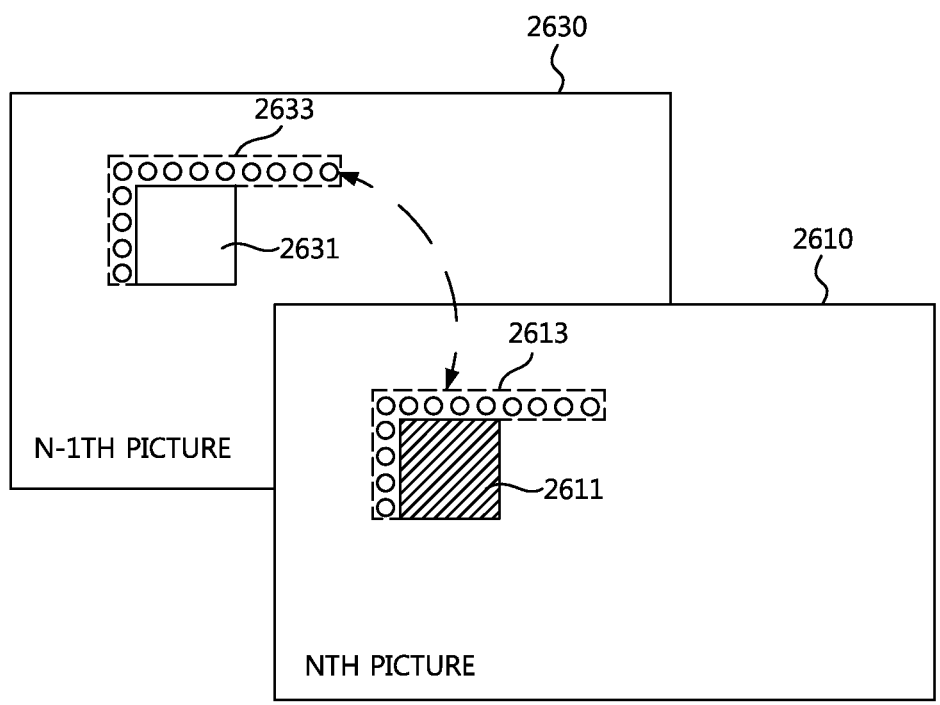
FIG. 33 is a conceptual view illustrating the image encoding method shown in FIG. 32.

FIG. 32 is a flowchart illustrating an image encoding method according to an embodiment of the present invention. FIG. 33 is a conceptual view illustrating the image encoding method shown in FIG. 32.

Referring to FIGS. 32 and 33, the image encoding apparatus determines in the N−1th picture positioned temporally before the Nth picture, which is the current picture, the reference macro-block for the current macro-block having the first size included in the Nth picture, then generating a motion vector (step S3210).

The current macro-block having the first size may have a size of 16×16 pixels or less or may be an extended macro-block having a size of 32×32 or 64×64 pixels or more. The extended macro-block may have a size of 32×32 pixels or more, e.g., 64×64 or 128×128 pixels, to be suited for high resolution such as ultra HD or higher resolution.

Thereafter, the image encoding apparatus splits the current macro-block having the first size into plural current blocks each having a second size and performs inter prediction and intra prediction on each split current block.

Specifically, the image encoding apparatus obtains differences between pixels adjacent to the current block having the second size in the current macro-block and adjacent pixels corresponding to the reference block positioned at a corresponding location of the current block in the reference macro-block of the N−1th picture, thereby obtaining residues between the adjacent pixels (step S3220).

The current block having the second size may have a size of 4×4 or 8×8 pixels, the size determined depending on the size of the current macro-block.

Thereafter, the image encoding apparatus uses the resides between the adjacent pixels obtained in step S120 to determine an intra prediction mode of the current block (step S3230). Here, the image encoding apparatus may determine as the intra prediction mode one of intra prediction modes for 4×4 blocks according to H.264/AVC standards, including vertical mode (mode 0), horizontal mode (mode 1), average value mode (mode 2), diagonal down-left mode (mode 3), diagonal down-right mode (mode 4), vertical right mode (mode 5), horizontal-down mode (mode 6), vertical left mode (mode 7), and horizontal-up mode (mode 8), or may determine the intra prediction mode by considering encoding efficiency together with generating the prediction value by applying each of the nine different modes. Further, among various inter prediction modes for blocks having a size of 4×4 pixels or more rather than the intra prediction modes for 4×4 blocks according to H.264/AVC standards, one may be considered as the intra prediction mode.

For example, the image encoding apparatus may, as shown in FIG. 33, yield differences between pixels 2633 adjacent to the reference block 2631 having the second size in the N−1th picture 2630 and pixels 2613 adjacent to the current block 2611 having the second size in the Nth picture 2610 to obtain residues between respective corresponding pixels, then applying various intra prediction modes to the obtained residues, thereby determining the most optimal intra prediction mode in consideration of encoding efficiency of the result of the application.

Then, the image encoding apparatus transforms the residues obtained in step S3220 (step S3240) and quantizes the transformed data (e.g., DCT coefficients) (step S3250).

The image encoding apparatus entropy-encodes the quantized data, the first size (i.e., the size of the current macro-block), the second size (i.e., the size of the current block), motion vector, intra prediction mode information, and reference picture information, thereby generating a bit stream (step S3260).

To enhance encoding efficiency, instead of encoding the motion vector, the prediction motion vector is generated, and the residues of the prediction motion vector and the motion vector may be then entropy-encoded.

The image encoding method illustrated in FIG. 32, according to an embodiment, is performed on all the blocks included in the macro-block, and the order of encoding the plurality of current blocks is predetermined, with each current block included in the current macro-block encoded according to the same order as the predetermined order also in the decoding process.

Also, in the case that previously encoded current blocks are present at the left and upper sides of the predetermined current block undergoing the inter prediction in the current macro-block in the image encoding method described in connection with FIG. 32, information on adjacent pixels positioned at the left and upper sides of the predetermined current block may be known so that the residues obtained in step S3220 are not provided to the side of decoding.

Further, although in FIG. 32 the image encoding method performs intra prediction by using residues between adjacent pixels in the reference block and adjacent pixels in the current block of the current macro-block, the present invention is not limited thereto. According to an embodiment, the motion vector for the current macro-block may be used to generate the prediction macro-block so that the intra prediction described in connection with steps 3220 and S3230 of FIG. 32 is performed on the residues of the generated prediction macro-block and the current macro-block.

In the following embodiments, image encoding may be done according to the size of the macro-block and the size of the current block included in each macro-block as determined by an encoding controller (not shown) or a decoding controller (not shown), and may apply to all or only at least one of prediction, transform, and quantization. Further, the encoding process may apply likewise to the decoding process in the following embodiments.

Figure 34:
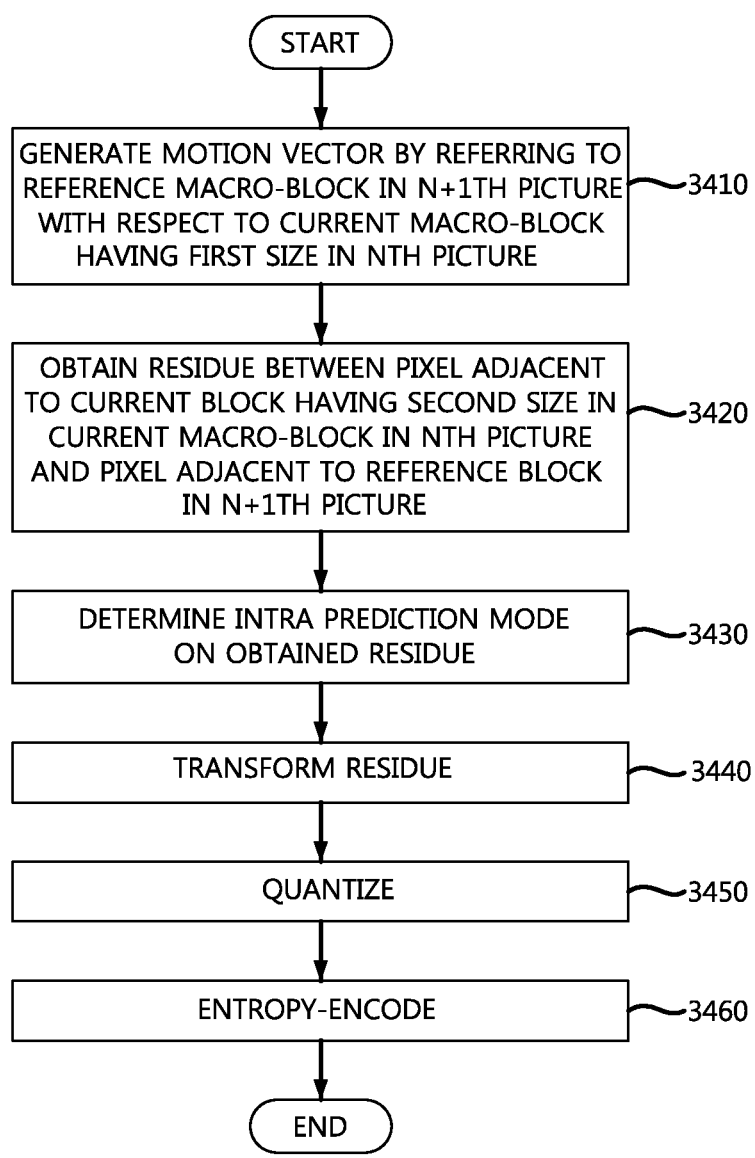
FIG. 34 is a flowchart illustrating an image encoding method according to another embodiment of the present invention.
Figure 35:
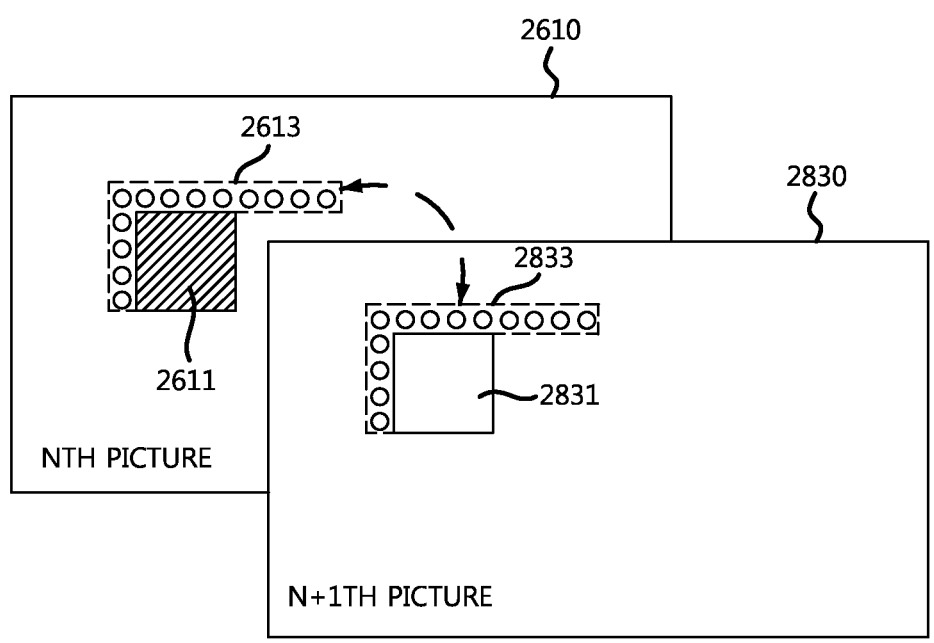
FIG. 35 is a conceptual view illustrating the image encoding method shown in FIG. 34.

FIG. 34 is a flowchart illustrating an image encoding method according to another embodiment of the present invention, and FIG. 35 is a conceptual view illustrating the image encoding method shown in FIG. 34.

Referring to FIGS. 34 and 35, the image encoding apparatus determines in the N−1th picture positioned temporally behind the Nth picture, which is the current picture, the reference macro-block for the current macro-block having the first size included in the Nth picture, then generating a motion vector (step S3411).

The current macro-block having the first size may have a size of 16×16 pixels or less or may be an extended macro-block having a size of 32×32 or 64×64 pixels or more. The extended macro-block may have a size of 32×32 pixels or more, e.g., 64×64 or 128×128 pixels, to be suited for high resolution such as ultra HD or higher resolution.

Thereafter, the image encoding apparatus obtains differences between pixels adjacent to the current block having the second size in the current macro-block of the Nth picture and corresponding adjacent pixels of the reference block positioned to correspond to the current block in the reference macro-block of the N+1th picture, thereby obtaining residues between adjacent pixels (step S3420).

The current block having the second size may have a size of 4×4 or 8×8 pixels, the size determined depending on the size of the current macro-block.

Then, the image encoding apparatus uses the residues between adjacent pixels obtained in step S3420 to determine the intra prediction mode of the current block (step S3430), transforms (step S3440) and quantizes (step S3450) the residues obtained in step S3420, and performs entropy encoding on the quantized data, the first size (i.e., the size of the current macro-block), the second size (i.e., the size of the current block), the motion vector, the intra prediction mode information, and the reference picture information, thereby generating a bit stream (step S3460).

Steps S3430 to S3460 in FIG. 34 are substantially the same as steps S3230 to S3260 in FIG. 32, and thus their detailed description is not repeated.

As shown in FIG. 35, the image encoding method may yield differences between pixels 2833 adjacent to the reference block 2831 having the second size in the N+1th picture 2830 and pixels 2613 adjacent to the current block 2611 having the second size in the Nth picture 2610 to obtain residues between respective corresponding pixels, then applying various intra prediction modes to the obtained residues, thereby determining the most optimal intra prediction mode in consideration of encoding efficiency of the result of the application.

Figure 36:
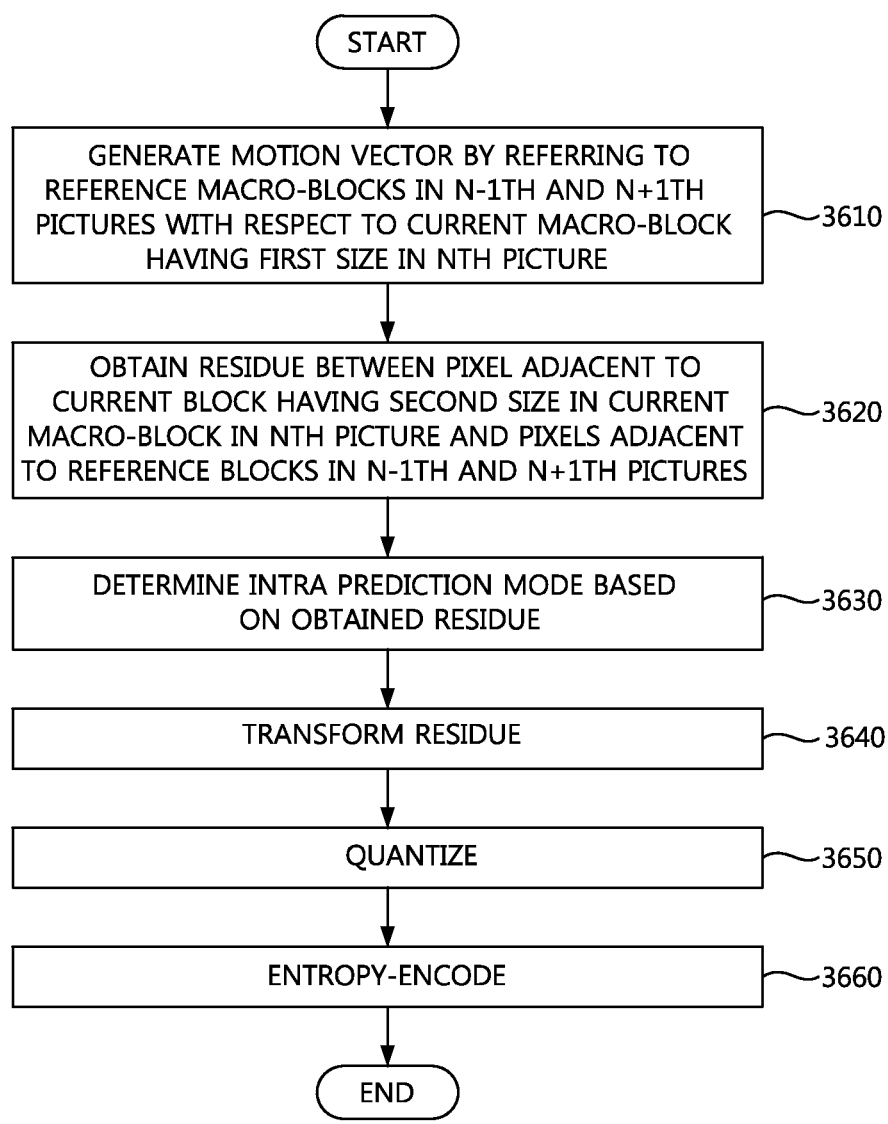
FIG. 36 is a flowchart illustrating an image encoding method according to another embodiment of the present invention.
Figure 37:
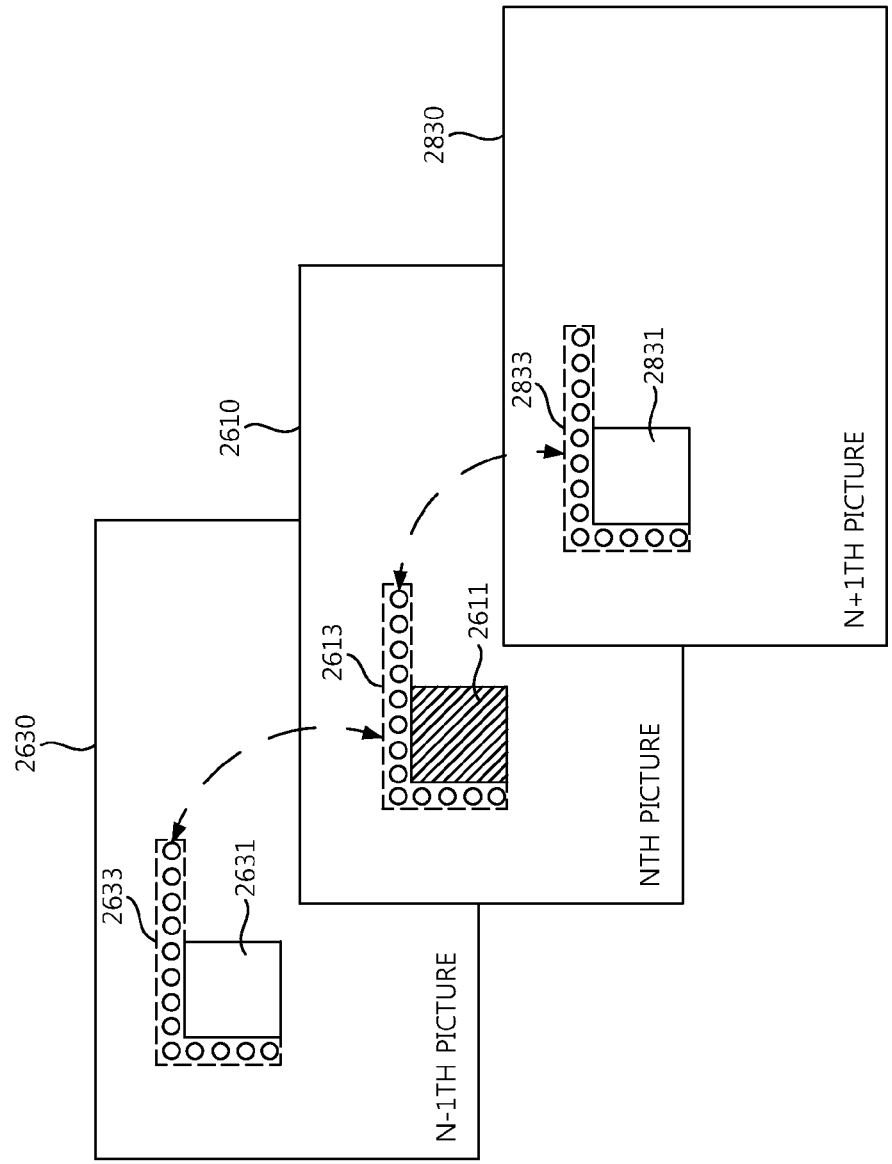
FIG. 37 is a conceptual view illustrating the image encoding method shown in FIG. 36.

FIG. 36 is a flowchart illustrating an image encoding method according to another embodiment of the present invention, and FIG. 37 is a conceptual view illustrating the image encoding method shown in FIG. 36.

Referring to FIGS. 32 and 33, the image encoding apparatus determines in the N−1th picture positioned temporally before the Nth picture, which is the current picture, the reference macro-block for the current macro-block having the first size included in the Nth picture, then generating a forward motion vector, while simultaneously determining the reference macro-block in the N+1th picture positioned temporally behind the Nth picture, thereby generating a reverse motion vector (step S3610).

The current macro-block having the first size may have a size of 16×16 pixels or less or may be an extended macro-block having a size of 32×32 or 64×64 pixels or more. The extended macro-block may have a size of 32×32 pixels or more, e.g., 64×64 or 128×128 pixels, to be suited for high resolution such as ultra HD or higher resolution.

Thereafter, the image encoding apparatus obtains differences between pixels adjacent to the current block having the second size in the current macro-block of the Nth picture and corresponding adjacent pixels of the reference block positioned to correspond to the current block in the reference macro-block of the N−1th picture, thereby obtaining forward residues between adjacent pixels (step S3420) and obtains differences between pixels adjacent to the current block having the second size in the current macro-block of the Nth picture and corresponding adjacent pixels of the reference block positioned to correspond to the current block in the reference macro-block of the N+1th picture, thereby obtaining reverse residues between adjacent pixels, then yielding average values between the forward residues and the reverse residues as the final residues (step S3620).

The current block having the second size may have a size of 4×4 or 8×8 pixels, the size determined depending on the size of the current macro-block.

Then, the image encoding apparatus uses the residues between adjacent pixels obtained in step S3620 to determine the intra prediction mode of the current block (step S3630), transforms (step S3640) and quantizes (step S3650) the residues obtained in step S3620, and performs entropy encoding on the quantized data, the first size (i.e., the size of the current macro-block), the second size (i.e., the size of the current block), the forward and reverse motion vectors, the intra prediction mode information, and the reference picture information, thereby generating a bit stream (step S3660).

Steps S3630 to S3660 in FIG. 36 are substantially the same as steps S3230 to S3260 in FIG. 32, and thus their detailed description is not repeated.

As shown in FIG. 37, the image encoding method may yield differences between pixels 2633 adjacent to the reference block 2631 having the second size in the N−1th picture 2630 and pixels 2613 adjacent to the current block 2611 having the second size in the Nth picture 2610 to obtain forward residues between respective corresponding pixels, while simultaneously yielding differences between pixels 2833 adjacent to the reference block 2831 having the second size in the N+1th picture 2830 and pixels 2613 adjacent to the current block 2611 having the second size in the Nth picture 2610 to obtain reverse residues between respective corresponding pixels, then obtaining average values between the forward and reverse residues as the final residues, applying various intra prediction modes to the obtained residues, thereby determining the most optimal intra prediction mode in consideration of encoding efficiency of the result of the application. The final residue may be the smaller one of the forward and reverse residues.

Although in FIGS. 36 and 37 the image encoding apparatus obtains residues between pixels adjacent to the current block and pixels adjacent to the reference block based on the N−1th picture and the N+1th picture, the present invention is not limited thereto. According to an embodiment, the image encoding apparatus may obtain residues between adjacent pixels based on the N−2th picture positioned temporally before the N−1th picture and the N+2th picture positioned temporally behind the N+1th picture.

In other words, the image encoding apparatus may perform inter prediction and intra prediction by referring to the N−2th, N−1th, N+1th, and N+2th pictures.

Further, the image encoding apparatus may, after buffering the N−2th, N−1th, Nth, N+1th, and N+2th pictures, determine the sizes of the current macro-block and the current block used for inter prediction and intra prediction based on the temporal frequency characteristics between pictures according to the temporal order and based on the degree of changes in the temporal frequency characteristics.

In other words, the image encoding apparatus detects a variance between temporally adjacent two pictures (e.g., N−1th and Nth pictures) among the buffered N−2th, N−1th, Nth, N+1th, and N+2th pictures, compares the detected variance with at least one preset reference value, and depending on the result of the comparison, determines the sizes of blocks used for inter prediction and intra prediction, respectively.

For example, the image encoding apparatus determines the size of the macro-block having the first size as 64×64 pixels and the size of the block having the second size as 8×8 pixels when the detected variance between the temporally adjacent pictures is less than a first reference value, determines the size of the macro-block as 32×32 pixels and the size of the block as 4×4 pixels when the detected variance between the temporally adjacent pictures is equal to or more than the first reference value and less than a second reference value, and determines the size of the macro-block as 16×16 pixels or less and the size of the block as 4×4 pixels when the detected variance between the temporally adjacent pictures is equal to or more than the second reference value.

Figure 38:
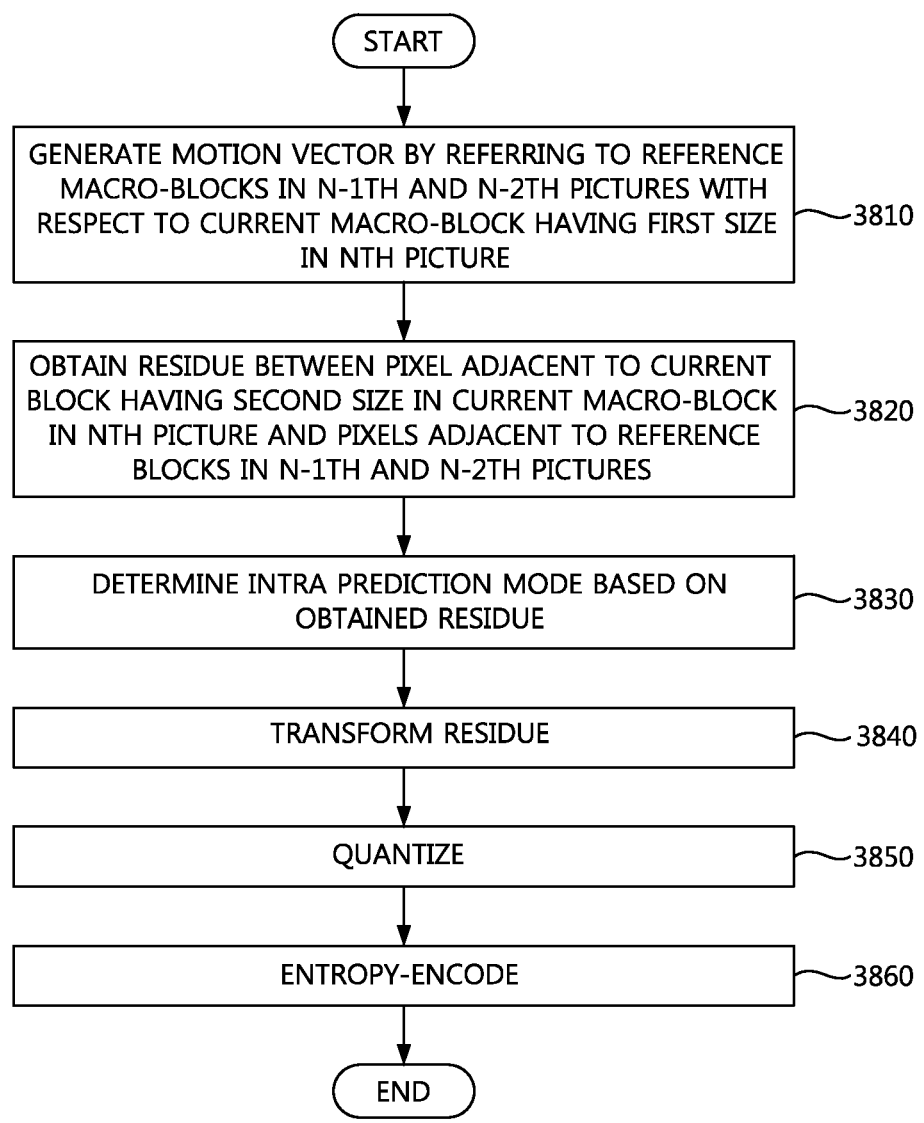
FIG. 38 is a flowchart illustrating an image encoding method according to another embodiment of the present invention.
Figure 39:
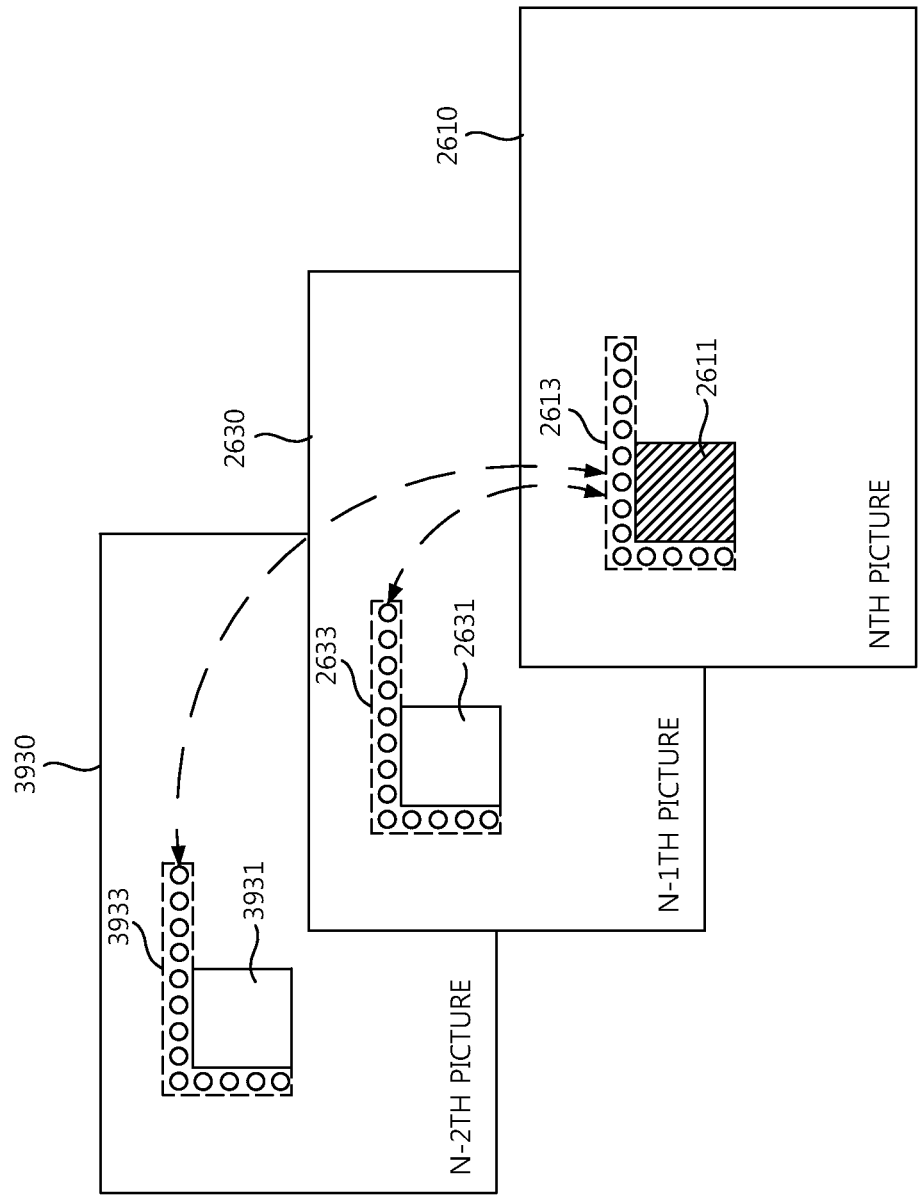
FIG. 39 is a conceptual view illustrating the image encoding method shown in FIG. 38.

FIG. 38 is a flowchart illustrating an image encoding method according to another embodiment of the present invention, and FIG. 39 is a conceptual view illustrating the image encoding method shown in FIG. 38.

Referring to FIGS. 38 and 39, the image encoding apparatus determines in the N−1th picture positioned temporally before the Nth picture, which is the current picture, a reference macro-block for the current macro-block having the first size included in the Nth picture to generate a first motion vector, while simultaneously determining another macro-block in the N−2th picture temporally positioned before the N−1th picture to generate a second motion vector (step S3810).

The current macro-block having the first size may have a size of 16×16 pixels or less or may be an extended macro-block having a size of 32×32 or 64×64 pixels or more. The extended macro-block may have a size of 32×32 pixels or more, e.g., 64×64 or 128×128 pixels, to be suited for high resolution such as ultra HD or higher resolution. Or, the extended macro-block, in case of ultra HD or higher resolution, may be restricted to the maximum of 64×64 pixels in consideration of encoder and decoder complexity.

Thereafter, the image encoding apparatus obtains differences between pixels adjacent to the current block having the second size in the current macro-block of the Nth picture and corresponding adjacent pixels of the reference block positioned to correspond to the current block in the reference macro-block of the N−1th picture, thereby obtaining first residues between adjacent pixels and obtains differences between pixels adjacent to the current block having the second size in the current macro-block of the Nth picture and corresponding adjacent pixels of the reference block positioned to correspond to the current block in the reference macro-block of the N−2th picture, thereby obtaining second residues between adjacent pixels, then yielding the final residues based on the first and second residues (step S3820).

The final residue may be an average value between the first and second residues or the smaller one of the first and second residues. Further, depending on the temporal distance from the current picture, different weighted factors may apply to the first and second residues to determine the final residue.

The current block having the second size may have a size of 4×4 or 8×8 pixels, the size determined depending on the size of the current macro-block.

Then, the image encoding apparatus uses the final residues between adjacent pixels obtained in step S3820 to determine the intra prediction mode of the current block (step S3830), transforms (step S3840) and quantizes (step S3850) the final residues obtained in step S3820, and performs entropy encoding on the quantized data, the first size (i.e., the size of the current macro-block), the second size (i.e., the size of the current block), the first and second motion vectors, the intra prediction mode information, and the reference picture information, thereby generating a bit stream (step S3860).

Steps S3830 to S3860 in FIG. 38 are substantially the same as steps S3230 to S3260 in FIG. 32, and thus their detailed description is not repeated.

As shown in FIG. 39, the image encoding method may yield differences between pixels 2633 adjacent to the reference block 2631 having the second size in the N−1th picture 2630 and pixels 2613 adjacent to the current block 2611 having the second size in the Nth picture 2610 to obtain the first residues, while simultaneously yielding differences between pixels 3933 adjacent to the reference block 3931 having the second size in the N−2th picture 3930 and pixels 2613 adjacent to the current block 2611 having the second size in the Nth picture 2610 to obtain second residues, then obtaining average values between the first and second residues as the final residues, applying various intra prediction modes to the obtained residues, thereby determining the most optimal intra prediction mode in consideration of encoding efficiency of the result of the application. The final residue may be the smaller one of the first and second residues. Further, depending on the temporal distance from the current picture, different weighted factors may apply to the first and second residues to determine the final residue.

Figure 40:
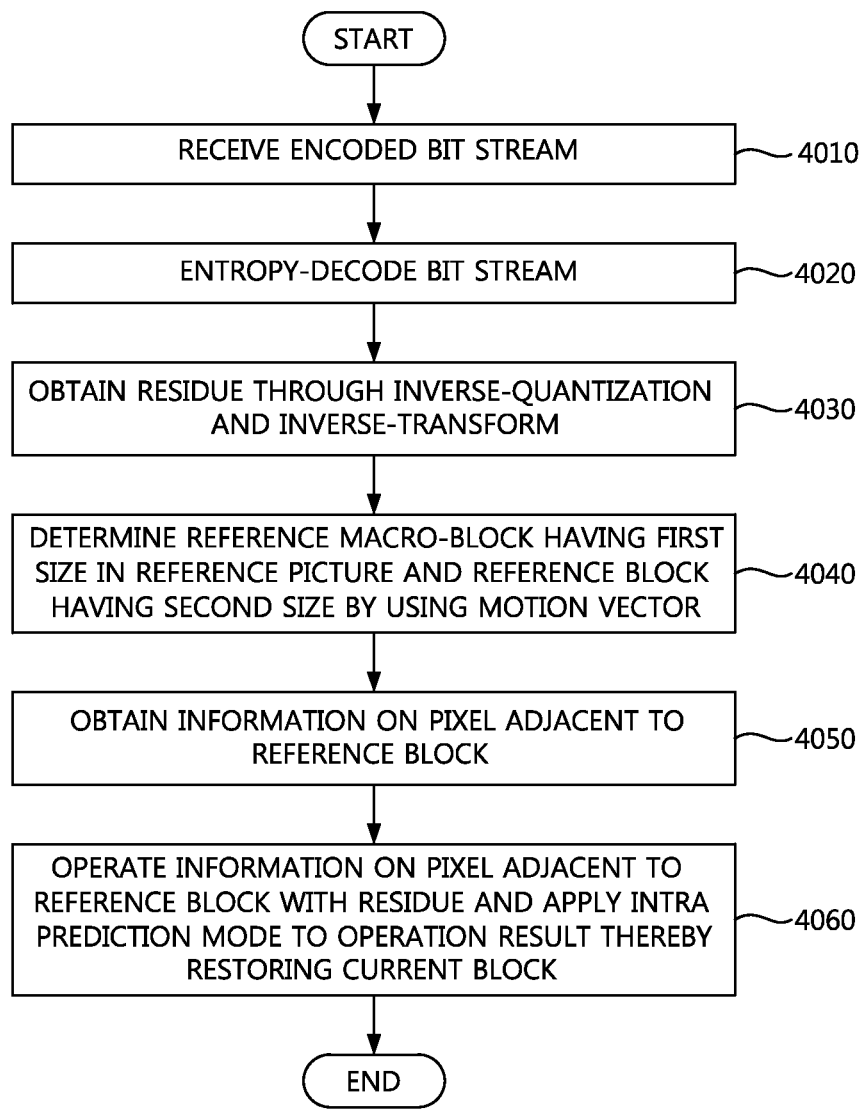
FIG. 40 is a flowchart illustrating an image decoding method according to an embodiment of the present invention.

FIG. 40 is a flowchart illustrating an image decoding method according to an embodiment of the present invention.

Referring to FIG. 40, the image decoding apparatus receives the encoded bit stream (step S4010) and entropy-decodes the received bit stream (step S4020). The entropy-encoded information may include, for example, the motion vector (or residue of the motion vector) of the macro-block, intra prediction mode, size of the macro-block (i.e., first size), size (i.e., second size) of the current block in the macro-block, and reference picture information. According to the above-described image encoding methods, the included information may vary.

Further, the image decoding apparatus performs inverse quantization and inverse transform on the entropy-encoded information to obtain residues between pixels adjacent to the current block and pixels adjacent to the reference block (step S4030).

The image decoding apparatus uses the size of the macro-block, the size of the current block in the macro-block, reference picture information, and motion vector information of the current macro-block as obtained through entropy decoding to determine the reference macro-block having the first size in the reference picture and the reference block having the second size in the reference macro-block (step S4040) and to obtain information on pixels adjacent to the reference block corresponding to the current block to be encoded (step S4050).

Thereafter, the image decoding apparatus performs operation on the obtained adjacent pixel information and the residues to obtain information on pixels adjacent to the current block having the second size and restores the image according to the intra prediction mode information (step S4060).

In the image decoding method illustrated in FIG. 40, in the case that as shown in FIG. 36 the image is encoded using the N−1th picture and the N+1th picture, the image decoding apparatus uses the forward motion vector and the reverse motion vector to determine the reference macro-blocks in the N−1th and N+1th pictures, respectively, obtains information on pixels adjacent to the reference blocks in the respective macro-blocks, and operates the obtained adjacent pixel information with the obtained residues, thereby obtaining information on pixels adjacent to the current block to be restored.

Or, when the N−1th and N−2th pictures are used for image encoding as shown in FIG. 38, the image decoding apparatus determines reference macro-blocks in the N−1th and N−2th pictures, respectively, using the first and second motion vectors, obtains information on pixels adjacent to the reference blocks in the determined respective reference macro-blocks, and operates the obtained adjacent pixel information with the obtained residues, thereby obtaining information on pixels adjacent to the current block to be restored.

Figure 41:
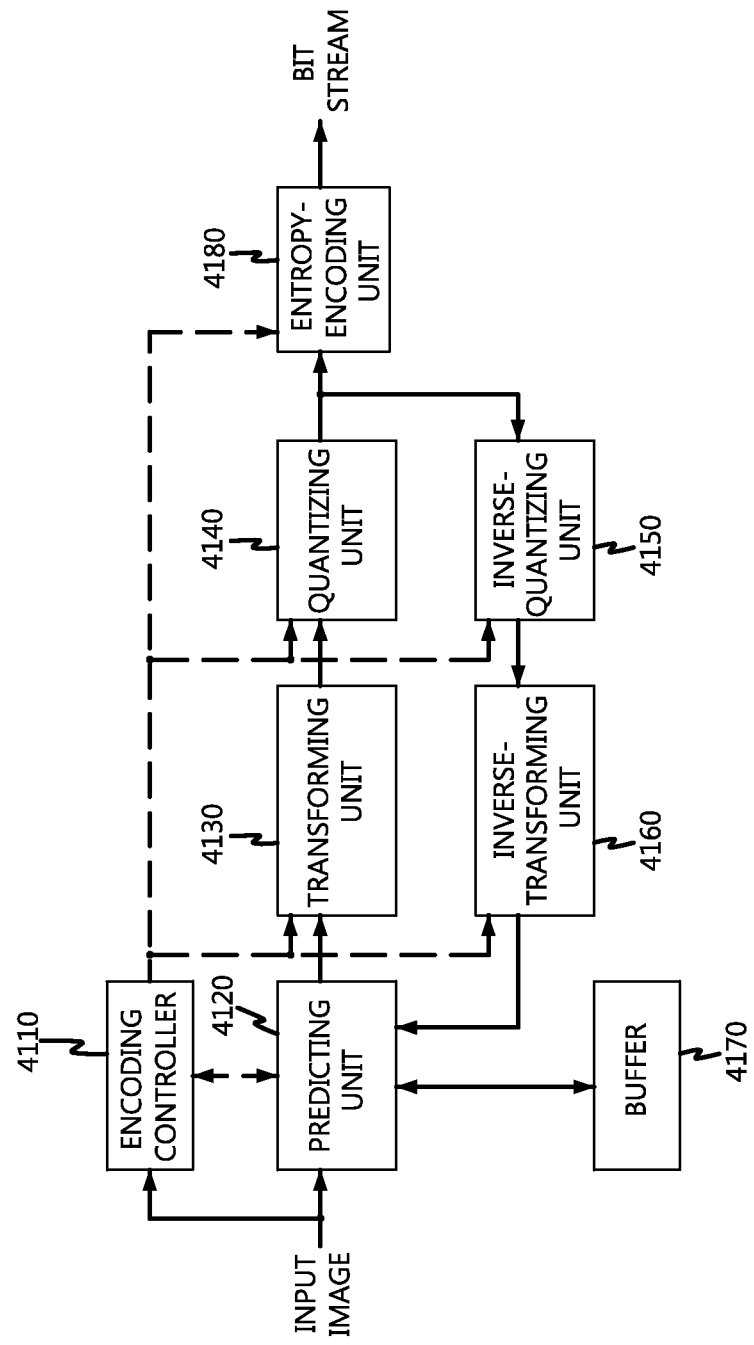
FIG. 41 is a block diagram illustrating a configuration of an image encoding apparatus according to an embodiment of the present invention.

FIG. 41 is a block diagram illustrating a configuration of an image encoding apparatus according to an embodiment of the present invention.

Referring to FIG. 41, the image encoding apparatus may include an encoding controller 4110, a predicting unit 4120, a transforming unit 4130, a quantizing unit 4140, an inverse quantizing unit 4150, an inverse transforming unit 4160, a buffer 4170, and an entropy encoding unit 4180.

The encoding controller 4110 determines the size of the block to be used for inter and intra prediction and controls the predicting unit 4120 so that encoding may be done according to the determined size. Also, the encoding controller 4110 determines the size of the block to be processed by the transforming unit 4130 and the quantizing unit 4140 and controls the transforming unit 4130 and the quantizing unit 4140 so that transform and quantization may be done in accordance with the determined block size.

Further, the encoding controller 4110 determines the picture referred to during the course of inter and intra prediction. For example, the encoding controller 4110 may determine as the reference picture used for intra and inter prediction for the Nth picture which is a picture to be currently encoded one of the N−2th, N−1th, N+1th, and N+2th pictures or may make determination so that one or more pictures may be referred to.

The encoding controller 4110 provides the block size information, used for intra and inter prediction, block size information used for transform and quantization, and reference picture information to the entropy encoding unit 4180.

The predicting unit 4120 determines in the N−1th picture stored in the buffer 4170 the reference macro-block for the current macro-block having the first size included in the Nth picture which is the current picture to be encoded, thereby generating a motion vector, and provides the generated motion vector to the entropy encoding unit 4180.

Further, the predicting unit 4120 performs inter and intra prediction on the current block having the second size in the current macro-block having the first size.

In other words, the predicting unit 4120 obtains differences between pixels adjacent to the current block having the second size and corresponding pixels adjacent to the reference block positioned to correspond to the current block to obtain residues between the adjacent pixels and provides the obtained residues to the transforming unit 4130.

Further, the predicting unit 4120 determines the intra prediction mode using the residues and then provides information on the determined intra prediction mode to the entropy encoding unit 4180. Here, the intra prediction mode may be determined as one of intra prediction modes for 4×4 blocks according to H.264/AVC standards, including vertical mode (mode 0), horizontal mode (mode 1), average value mode (mode 2), diagonal down-left mode (mode 3), diagonal down-right mode (mode 4), vertical right mode (mode 5), horizontal-down mode (mode 6), vertical left mode (mode 7), and horizontal-up mode (mode 8), or may be determined by considering encoding efficiency after generating the prediction value by applying each of the nine different modes. Further, among various inter prediction modes for blocks having a size of 4×4 pixels or more rather than the intra prediction modes for 4×4 blocks according to H.264/AVC standards, one may be considered as the intra prediction mode.

The current macro-block having the first size may have a size of 16×16 pixels or less or may be an extended macro-block having a size of 32×32 or 64×64 pixels or more. The current block having the second size may have, e.g., 4×4 or 8×8 pixels, and the size of the current macro-block and the size of the current block may be determined by the encoding controller 4110.

The predicting unit 4120 obtains information on pixels adjacent to the current block having the second size based on the pixels adjacent to the reference block in the N−1th picture and the residues provided from the inverse transforming unit 4160 and restores the current block according to the intra prediction mode information, then providing the restored current block to the buffer 4170.

The transforming unit 4130 and the quantizing unit 4140 respectively perform DCT and quantization on the residues provided from the predicting unit 4120. The transforming unit 4130 and the quantizing unit 4140 may perform such transform based on the block size information provided from the encoding controller 4110—for example, such transform may be performed to have 32×32 or 64×64 pixels.

The inverse quantizing unit 4150 and the inverse transforming unit 4160 respectively perform inverse quantization and inverse transform on the quantized data provided from the quantizing unit 4140 to obtain the residues which are then provided to the predicting unit 4120.

The buffer 4170 stores at least one or more restored pictures.

The entropy encoding unit 4180 entropy-encodes the quantized residues, motion vector, block size information used for inter and intra prediction, block size information used for transform and quantization, and reference picture information as provided from the quantizing unit 4140, thereby generating a bit stream.

Although in FIG. 41 the image encoding apparatus refers to the N−1th picture for encoding the Nth picture, the present invention is not limited thereto. According to an embodiment, as shown in FIGS. 33 to 39, at least one or more of the N−2th, N−1th, N+1th, and N+2th pictures encoded to encode the Nth picture may be referred to for encoding.

Figure 42:
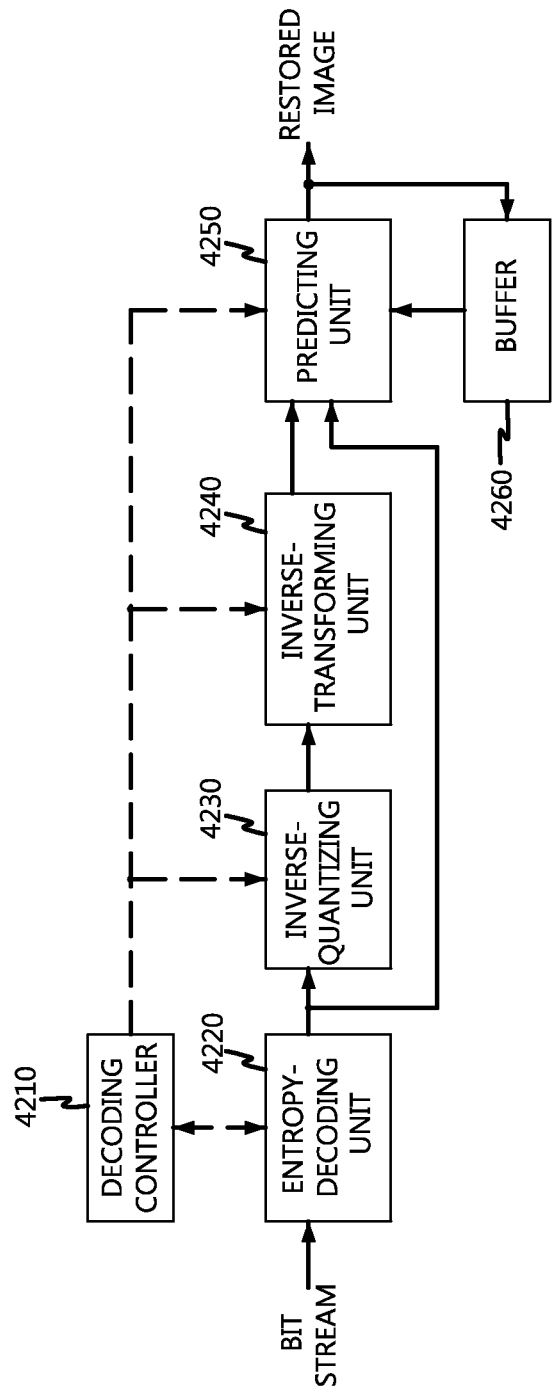
FIG. 42 is a block diagram illustrating a configuration of an image decoding method according to an embodiment of the present invention.

FIG. 42 is a block diagram illustrating a configuration of an image decoding apparatus according to an embodiment of the present invention.

Referring to FIG. 42, the image decoding apparatus may include a controller 4210, an entropy decoding unit 4220, an inverse quantizing unit 4230, an inverse transforming unit 4240, a predicting unit 4250, and a buffer 4260.

The controller 4210 obtains, from the entropy-decoded information, size information of the block used for inter and intra prediction, size information of the block processed during inverse transform, picture information referred to for inter and intra prediction, and intra prediction mode information and performs control for decoding based on the obtained information.

For example, the controller 4210 may control the size of the block processed by the inverse quantizing unit 4230 and the inverse transforming unit 4240 and may control the reference picture referred to upon image decoding by the predicting unit 4250, the size of the macro-block in the reference picture, and the size of the current block in the macro-block.

The entropy decoding unit 4220 performs entropy decoding on the input bit stream. The entropy-decoded residue is provided to the inverse quantizing unit 4230, and the entropy-decoded motion vector is provided to the predicting unit 4250. The size information of the block used for inter and intra prediction, the size information of the block processed during the inverse transform, and the picture information referred to during the inter and intra prediction are provided to the controller 4210.

The inverse quantizing unit 4230 and the inverse transforming unit 4240 respectively inverse-quantizes and inverse-transforms the quantized residue provided from the entropy decoding unit 4220 to generate the residue and provides the generated residue to the predicting unit 4250.

The predicting unit 4250 uses the motion vector provided from the entropy decoding unit 4220, the size of the macro-block provided from the controller 4210, the size of the current block in the macro-block, the reference picture information, and the motion vector provided from the entropy decoding unit 4220 to determine in the corresponding picture stored in the buffer 4260 the to-be-decoded current macro-block having the first size, the reference macro-block corresponding to the current block having the second size in the current macro-block, and the reference block in the reference macro-block and obtains information on pixels adjacent to the reference block. Thereafter, the predicting unit 4250 performs operation on the obtained adjacent pixel information and the residue provided from the inverse transforming unit 4240 to obtain adjacent pixel information of the current block, restores the current block according to the intra prediction mode information provided from the controller 4210, then storing the restored current block in the predicting unit 4250.

As described in connection with FIG. 36, in the case that an image is encoded using the N−1th and N+1th pictures, the predicting unit 4250 uses the forward motion vector and the reverse motion vector provided from the entropy decoding unit 4220 to determine reference macro-blocks in the N−1th and N+1th pictures, respectively, stored in the buffer 4260, obtains information on pixels adjacent to the reference block in each determined reference macro-block, operates the obtained adjacent pixel information with the residue provided from the inverse transforming unit 4240 to obtain information on pixels adjacent to the current block to be restored, and then restores the current block according to the intra prediction mode.

Or, as described in connection with FIG. 38, in the case that an image is encoded using the N−1th and N−2th pictures, the predicting unit 4250 uses the first motion vector and the second motion vector provided from the entropy decoding unit 4220 to determine reference macro-blocks in the N−1th and N−2th pictures, respectively, obtains information on pixels adjacent to the reference block in each determined reference macro-block, operates the obtained adjacent pixel information with the residue provided from the inverse transforming unit 4240 to obtain information on pixels adjacent to the current block to be restored, and then restores the current block according to the intra prediction mode.

The buffer 4260 stores the encoded pictures provided from the predicting unit 4250.

Although the embodiments of the present invention have been described, it will be understood by one of ordinary skill that various modifications can be made to the present invention without departing from the scope of the invention defined by the appended claims.

The invention claimed is:

1. An apparatus for decoding an image comprising:
an inverse-transforming unit configured to restore a residue by entropy-decoding a received bit stream and by performing inverse quantization and inverse transform on the residue;
an intra predicting unit configured to generate a prediction unit by performing intra-prediction that selectively uses one of a plurality of prediction modes on the prediction unit; and
an adder configured to restore the image by adding the residue to the prediction unit,
wherein a coding unit has a recursive tree structure, and
when a planar intra prediction mode is activated, a predicted pixel value of an internal pixel of a current prediction unit is obtained by performing bilinear interpolation using (i) vertically and horizontally directional corresponding internal boundary prediction pixel values in the current prediction unit, and (ii) vertically and horizontally directional corresponding pixel values in previously decoded left side block and upper end block of the current prediction unit.

2. The apparatus of claim 1, wherein a minimum size of the coding unit is included in a sequence parameter set.

3. The apparatus of claim 1, wherein a partition splitting is achieved by an asymmetric partitioning when the prediction unit is split.

4. The apparatus of claim 3, wherein the asymmetric partitioning is conducted along a horizontal direction to split the prediction unit
into a first partition having a size of 64×16 and a second partition having a size of 64×48, or
into a first partition having a size of 64×48 and a second partition having a size of 64×16.

5. The apparatus of claim 3, wherein the asymmetric partitioning is performed along a vertical direction to split the prediction unit
into a first partition having a size of 16×64 and a second partition having 48×64, or
into a first partition having a size of 48×64 and a second partition having a size of 16×64.

6. An apparatus for decoding an image, the apparatus comprising:
an inverse-transforming unit configured to restore a residue by entropy-decoding a received bit stream and by performing inverse quantization and inverse transform on the residue;
an intra predicting unit configured to generate a prediction unit by performing intra-prediction that selectively uses one of a plurality of prediction modes on the prediction unit; and
an adder configured to restore the image by adding the residue to the prediction unit,
wherein a coding unit has a recursive tree structure, and
when a planar intra prediction mode is activated, a predicted pixel value of an internal pixel of a current prediction unit is obtained by performing bilinear interpolation using (i) vertically and horizontally directional corresponding internal boundary prediction pixel values in the current prediction unit and (ii) vertically and horizontally directional corresponding pixel values in previously decoded left side block and upper end block of the current prediction unit, and
wherein the prediction unit includes a block of which size is more than 16×16 pixels and a size of the prediction unit is restricted to no more than 64×64 pixels.

7. The method of claim 6, wherein a minimum size of the coding unit is included in the sequence parameter set.

8. The method of claim 6, wherein a partition splitting is achieved by an asymmetric partitioning method when the coding unit is split.

9. The apparatus of claim 8, wherein the asymmetric partitioning is conducted along a horizontal direction to split the prediction unit
into a first partition having a size of 64×16 and a second partition having a size of 64×48, or
into a first partition having a size of 64×48 and a second partition having a size of 64×16.

10. The apparatus of claim 8, wherein the asymmetric partitioning is performed along a vertical direction to split the prediction unit
into a first partition having a size of 16×64 and a second partition having 48×64, or
into a first partition having a size of 48×64 and a second partition having a size of 16×64.

11. An apparatus for decoding an image, the apparatus comprising:
an inverse-transforming unit configured to restore a residue by entropy-decoding a received bit stream and by performing inverse quantization and inverse transform on the residue;
an intra predicting unit configured to generate a prediction unit by performing intra-prediction that selectively uses one of a plurality of prediction modes on the prediction unit; and
an adder configured to restore the image by adding the residue to the prediction unit,
wherein a coding unit has a recursive tree structure, and
wherein the prediction unit corresponds to a leaf coding unit when the coding unit is split and reaches a maximum permissible depth, and the prediction unit includes a block of which size is more than 16×16 pixels and a size of the prediction unit is restricted to no more than 64×64 pixels.

12. The apparatus of claim 11, wherein a minimum size of the coding unit is included in the sequence parameter set.

13. The apparatus of claim 11, wherein a partition splitting is achieved by an asymmetric partitioning method when the coding unit is split.

14. The apparatus of claim 13, wherein the asymmetric partitioning is conducted along a horizontal direction to split the prediction unit
into a first partition having a size of 64×16 and a second partition having a size of 64×48, or
into a first partition having a size of 64×48 and a second partition having a size of 64×16.

15. The apparatus of claim 13, wherein the asymmetric partitioning is performed along a vertical direction to split the prediction unit
into a first partition having a size of 16×64 and a second partition having 48×64, or
into a first partition having a size of 48×64 and a second partition having a size of 16×64.

16. An apparatus for decoding an image, the apparatus comprising:
- an inverse-transforming unit configured to restore a residue by entropy-decoding a received bit stream and by performing inverse quantization and inverse transform on the residue;
- an intra predicting unit configured to generate a prediction unit by performing intra-prediction that selectively uses one of a plurality of prediction modes on the prediction unit; and
- an adder configured to restore the image by adding the residue to the prediction unit,
- wherein a coding unit has a recursive tree structure, and
- wherein the prediction unit corresponds to a leaf coding unit when the coding unit is split and reaches a maximum permissible depth, and a size of the coding unit is restricted to no more than 64×64 pixels.

17. The apparatus of claim 16, wherein a minimum size of the coding unit is included in the sequence parameter set.

18. The apparatus of claim 11, wherein a partition splitting is achieved by an asymmetric partitioning method when the coding unit is split.

19. The apparatus of claim 13, wherein the asymmetric partitioning is conducted along a horizontal direction to split the prediction unit
- into a first partition having a size of 64×16 and a second partition having a size of 64×48, or
- into a first partition having a size of 64×48 and a second partition having a size of 64×16.

20. The apparatus of claim 13, wherein the asymmetric partitioning is performed along a vertical direction to split the prediction unit
- into a first partition having a size of 16×64 and a second partition having 48×64, or
- into a first partition having a size of 48×64 and a second partition having a size of 16×64.

* * * * *

UNITED STATES PATENT AND TRADEMARK OFFICE
CERTIFICATE OF CORRECTION

PATENT NO. : 8,995,778 B2
APPLICATION NO. : 13/513122
DATED : March 31, 2015
INVENTOR(S) : Alex Chungku Yie et al.

It is certified that error appears in the above-identified patent and that said Letters Patent is hereby corrected as shown below:

In the Claims

Column 44, line 7, "method" should read --apparatus--

Column 44, line 9, "method" should read --apparatus--

Signed and Sealed this
Eighteenth Day of August, 2015

Michelle K. Lee
*Director of the United States Patent and Trademark Office*